(12) United States Patent
Watanabe et al.

(10) Patent No.: US 11,913,836 B2
(45) Date of Patent: Feb. 27, 2024

(54) DISPERSION MEASUREMENT APPARATUS AND DISPERSION MEASUREMENT METHOD

(71) Applicant: HAMAMATSU PHOTONICS K.K., Hamamatsu (JP)

(72) Inventors: Koyo Watanabe, Hamamatsu (JP); Hisanari Takahashi, Hamamatsu (JP); Kyohei Shigematsu, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 90 days.

(21) Appl. No.: 17/488,493

(22) Filed: Sep. 29, 2021

(65) Prior Publication Data

US 2022/0107221 A1    Apr. 7, 2022

(30) Foreign Application Priority Data

Oct. 2, 2020    (JP) ................................ 2020-167851

(51) Int. Cl.
*G01J 3/44* (2006.01)
*G01J 3/02* (2006.01)
*G01J 3/28* (2006.01)

(52) U.S. Cl.
CPC ........... *G01J 3/4412* (2013.01); *G01J 3/0208* (2013.01); *G01J 3/0229* (2013.01); *G01J 3/2823* (2013.01)

(58) Field of Classification Search
CPC ...... G01J 3/4412; G01J 3/0208; G01J 3/0229; G01J 3/2823
See application file for complete search history.

(56) References Cited

U.S. PATENT DOCUMENTS

| 2002/0130245 A1* | 9/2002 | Fujimoto | ............ C03B 33/0222 |
| | | | 250/205 |
| 2006/0088259 A1* | 4/2006 | Weiner | ..................... G01J 11/00 |
| | | | 359/328 |

(Continued)

FOREIGN PATENT DOCUMENTS

| JP | H5-248996 A | 9/1993 |
| JP | 2000-193557 A | 7/2000 |

(Continued)

OTHER PUBLICATIONS

Nakagawa, K. et al., "Sequentially timed all-optical mapping photography (STAMP)," Nature Photonics 8, 2014, pp. 695-700.

(Continued)

*Primary Examiner* — Uzma Alam
*Assistant Examiner* — Huy Phillip Pham
(74) *Attorney, Agent, or Firm* — Faegre Drinker Biddle & Reath LLP

(57) ABSTRACT

A dispersion measurement apparatus includes a pulse forming unit, a correlation optical system, a beam splitter, an operation unit, an imaging unit, a spatial filter unit, and a photodetector. The pulse forming unit forms a light pulse train including light pulses having time differences and different center wavelengths. The beam splitter branches the light pulse train passed through a measurement object. The imaging unit disperses one light pulse train and images each light pulse. The spatial filter unit extracts light of a partial region of the other light pulse train. The correlation optical system outputs correlation light including a cross-correlation or an autocorrelation of the extracted light. The photodetector detects a temporal waveform of the correlation light. The operation unit estimates a wavelength dispersion amount in the measurement object based on a feature value of the temporal waveform.

14 Claims, 36 Drawing Sheets

(56) References Cited

U.S. PATENT DOCUMENTS

2020/0142175 A1   5/2020  Cohen et al.
2022/0178752 A1*  6/2022  Watanabe .......... G01M 11/3163

FOREIGN PATENT DOCUMENTS

| JP | 2017-181259 A | 10/2017 |
| JP | 2017-183994 A | 10/2017 |
| WO | WO-2017/169656 A1 | 10/2017 |
| WO | WO-2017/169788 A1 | 10/2017 |

OTHER PUBLICATIONS

Tamamitsu, Miu et al., "Design for sequentially timed all-optical mapping photography with optimum temporal performance," Optics Letters, 2015, vol. 40, No. 4, pp. 633-636.

Takahashi, Hisanari et al., "Measurement of group refractive indices of glasses by using color-selective multiple-pulses generated with a spatial light modulator," $81^{st}$ Japan Society of Applied Physics Autumn Meeting, Presentation Proceedings 10p-Z19-10, Aug. 26, 2020.

Takahashi, Hisanari et al., "Measurement of group refractive indices of glass using a color-selective multi-pulse generated with a spatial light modulator," Optics Letters, Apr. 1, 2021, vol. 46, No. 7, pp. 1534-1537.

* cited by examiner

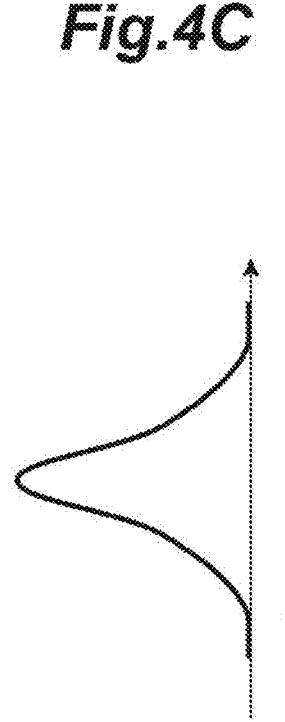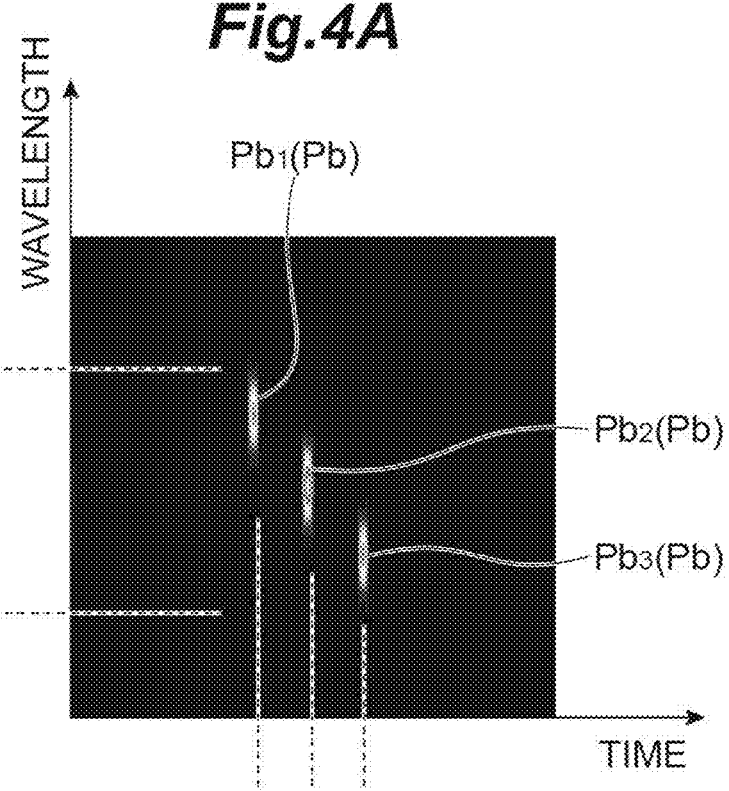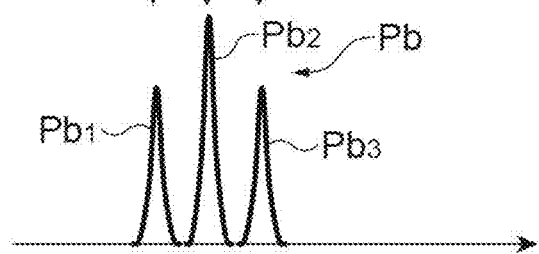

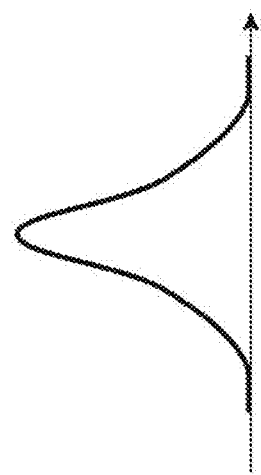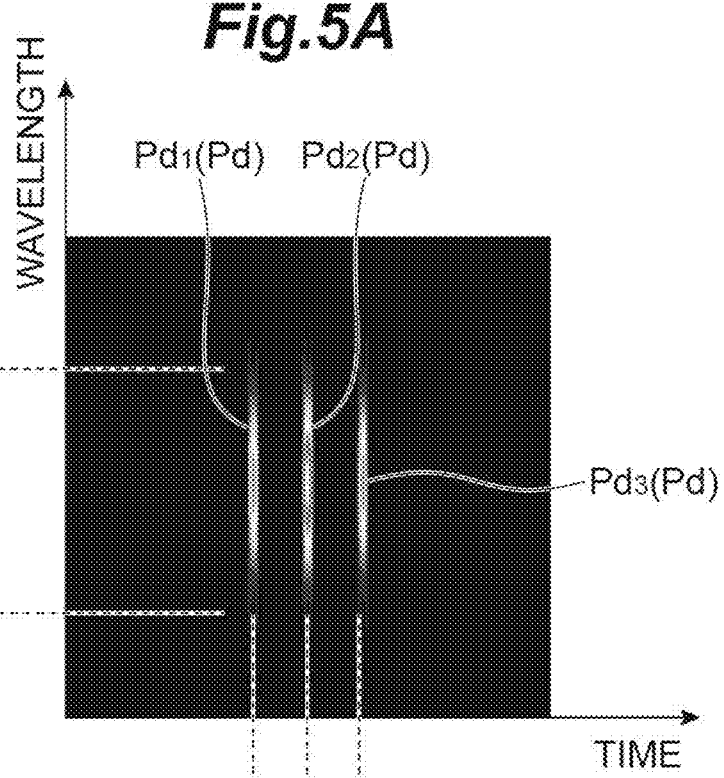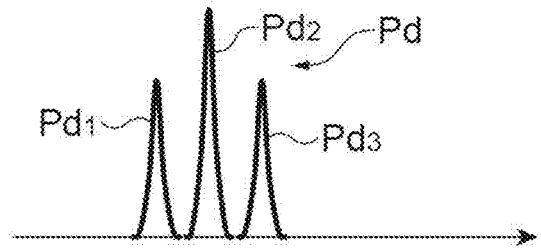

DISPERSION MEASUREMENT APPARATUS AND DISPERSION MEASUREMENT METHOD

TECHNICAL FIELD

The present disclosure relates to a dispersion measurement apparatus and a dispersion measurement method.

BACKGROUND

Non Patent Document 1 and Non Patent Document 2 disclose a technique related to a sequentially timed all-optical mapping photography (STAMP) that enables ultra-high-speed and continuous imaging.

Non Patent Document 1: K. Nakagawa et al., "Sequentially timed all-optical mapping photography (STAMP)", Nature Photonics 8, pp. 695-700, 2014

Non Patent Document 2: M. Tamamitsu et al., "Design for sequentially timed all-optical mapping photography with optimum temporal performance", Optics Letters Vol. 40, pp. 633-636, 2015

SUMMARY

In the STAMP technique, an object is continuously irradiated with a plurality of light pulses having time differences and center wavelengths different from each other, and respective light pulses transmitted through the object are dispersed and imaged in different regions of an image sensor. This enables high-speed imaging exceeding a frame rate of the image sensor.

In the above ultra-high-speed imaging, if the magnitude of wavelength dispersion in the object can be known at the same time, various pieces of additional information such as a refractive index, a reflectance, an absorptance, and a thickness of the object can be easily acquired. Further, in the process of deriving the wavelength dispersion, absorption spectrum information can be obtained by observing a intensity difference of the transmitted light (each light pulse) from the object.

An object of an embodiment is to provide a dispersion measurement apparatus and a dispersion measurement method capable of knowing a magnitude of wavelength dispersion in an object simultaneously with high-speed imaging.

An embodiment is a dispersion measurement apparatus. The dispersion measurement apparatus includes a pulse forming unit configured to form a light pulse train including a plurality of second light pulses having time differences and center wavelengths different from each other from a first light pulse output from a light source; an optical branching unit configured to branch the light pulse train output from the pulse forming unit and passed through a measurement object; an imaging unit configured to disperse and image one light pulse train branched by the optical branching unit, and generate imaging data for each second light pulse included in the one light pulse train; a spatial filter unit configured to receive the other light pulse train branched by the optical branching unit, and extract light of one or a plurality of partial regions in a cross section intersecting with a traveling direction of the other light pulse train; a correlation optical system configured to output correlation light including a cross-correlation or an autocorrelation of the light of the one or plurality of partial regions extracted by the spatial filter unit; a photodetector configured to detect a temporal waveform of the correlation light output from the correlation optical system; and a processor configured to estimate a wavelength dispersion amount in the measurement object based on a feature value of the temporal waveform, and in the spatial filter unit, a spatial position of the partial region in the cross section is changeable.

An embodiment is a dispersion measurement method. The dispersion measurement method includes performing a pulse forming of forming a light pulse train including a plurality of second light pulses having time differences and center wavelengths different from each other from a first light pulse output from a light source; performing an optical branching of branching the light pulse train passed through a measurement object; performing an imaging of dispersing and imaging one light pulse train branched by the optical branching, and generating imaging data for each second light pulse included in the one light pulse train; performing a spatial filter of extracting light of one or a plurality of partial regions in a cross section intersecting with a traveling direction of the other light pulse train branched by the optical branching; performing a correlation light generation of generating correlation light including a cross-correlation or an autocorrelation of the light of the one or plurality of partial regions; performing a photodetection of detecting a temporal waveform of the correlation light; and performing an operation of estimating a wavelength dispersion amount in the measurement object based on a feature value of the temporal waveform, and the pulse forming, the optical branching, the imaging, the spatial filter, the correlation light generation, the photodetection, and the operation are repeatedly performed while changing a spatial position of the partial region in the cross section.

In the above apparatus and method, in the pulse forming unit (pulse forming step), the light pulse train including the plurality of second light pulses having time differences and center wavelengths different from each other is generated from the first light pulse. Further, the light pulse train is branched after passing through the measurement object. The respective second light pulses of the one light pulse train after the branching are spatially separated from each other by being spectrally dispersed, and the second light pulse is individually imaged and converted into the imaging data. In this way, by dispersing the light pulse train and performing imaging for each second light pulse, it is possible to perform imaging at a higher speed than the frame rate of the imaging device.

Further, the other light pulse train after the branching is converted into the correlation light including the cross-correlation or the autocorrelation, and then the temporal waveform of the correlation light is detected. For example, when the correlation light including the cross-correlation or the autocorrelation of the light pulse train is generated using a nonlinear optical crystal or the like, various feature values (for example, pulse interval, peak intensity, pulse width, and the like) in the temporal waveform of the correlation light have significant correlation with the wavelength dispersion amount of the measurement object. Therefore, according to the above configuration, the wavelength dispersion amount in the measurement object can be accurately estimated based on the feature value of the detected temporal waveform.

In addition, when the temporal waveform is detected, the temporal waveform of the correlation light corresponding to the light pulse train of the one or plurality of partial regions in the cross section intersecting with the traveling direction of the light pulse train is detected. In this case, the temporal waveform of the correlation light including the high-speed light pulses can be preferably detected by, for example, a photodiode. Further, the spatial position of the partial region can be changed, and thus, the magnitude of the local wavelength dispersion at the desired position in the measurement object can be accurately known.

In this way, by using the above apparatus and method, the magnitude of the wavelength dispersion in the object can be known simultaneously with high-speed imaging.

According to the dispersion measurement apparatus and the dispersion measurement method of the embodiments, a magnitude of wavelength dispersion in an object can be known simultaneously with high-speed imaging.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4A to FIG. 4C are (A) a spectrogram showing an example of a multi pulse with band control, (B) a diagram showing a temporal waveform of a light pulse train, and (C) a diagram showing a spectrum obtained by combining three light pulses $Pb_1$ to $Pb_3$.

FIG. 5A to FIG. 5C are (A) a spectrogram showing an example of a multi pulse without band control, (B) a diagram showing a temporal waveform of a light pulse train, and (C) a diagram showing a spectrum obtained by combining three light pulses $Pd_1$ to $Pd_3$.

DETAILED DESCRIPTION

Hereinafter, embodiments of a dispersion measurement apparatus and a dispersion measurement method will be described in detail with reference to the accompanying drawings. In the description of the drawings, the same elements will be denoted by the same reference signs, and redundant description will be omitted. The present invention is not limited to these examples.

Figure 1:
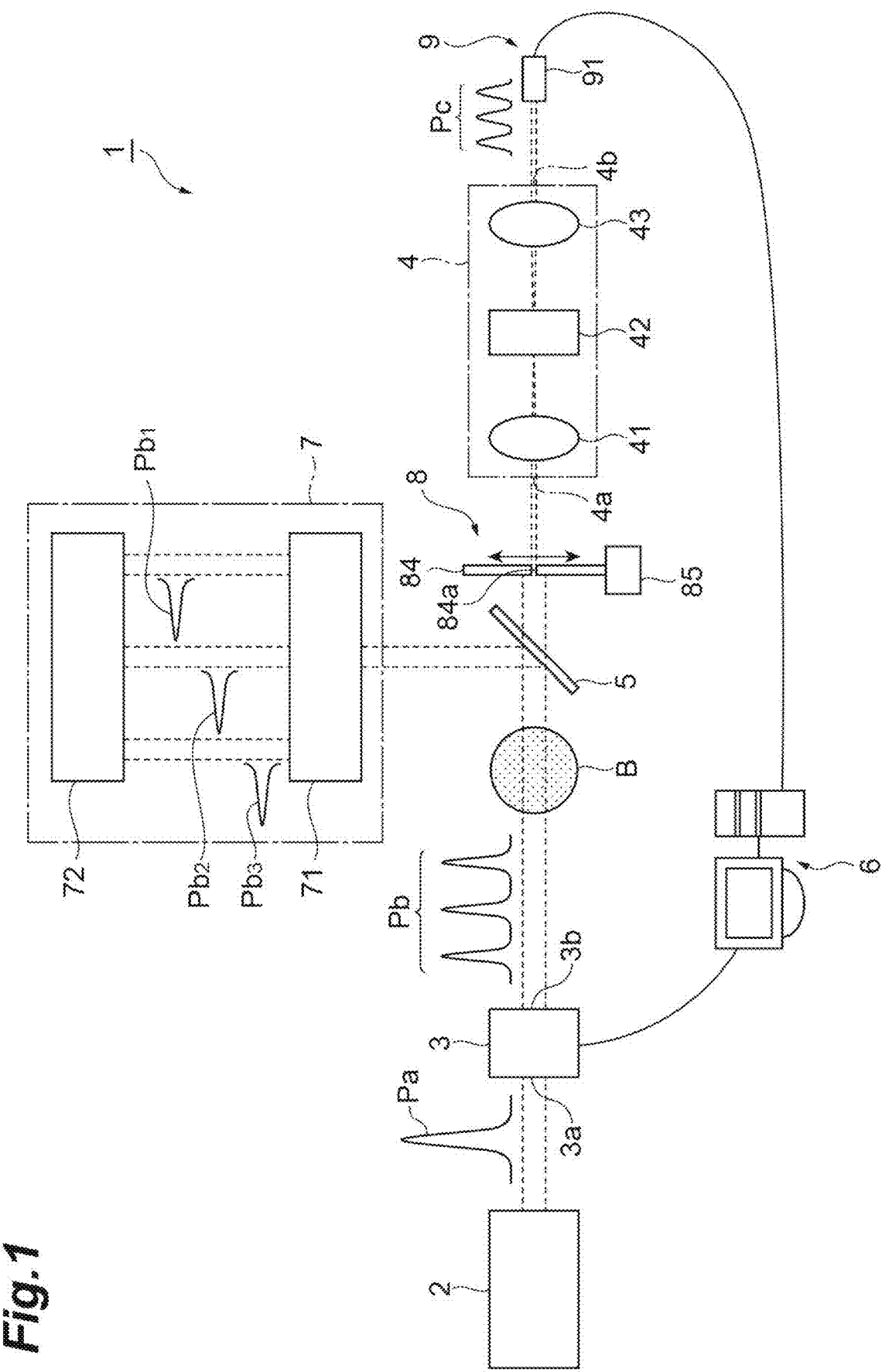
FIG. 1 is a diagram schematically illustrating a configuration of a dispersion measurement apparatus according to an embodiment.

FIG. 1 is a diagram schematically illustrating a configuration of a dispersion measurement apparatus according to an embodiment. The dispersion measurement apparatus 1 is an apparatus for capturing a transmission image of a measurement object B, and further, measuring a wavelength dispersion of the measurement object B. The dispersion measurement apparatus 1 includes a pulsed laser light source 2, a pulse forming unit 3, a correlation optical system 4, a beam splitter 5, an operation unit 6, an imaging unit 7, a spatial filter unit 8, and a photodetection unit 9.

A light input end 3a of the pulse forming unit 3 is optically coupled to the pulsed laser light source 2 spatially or via an optical waveguide such as an optical fiber. The beam splitter 5 is optically coupled to a light output end 3b of the pulse forming unit 3 spatially or via an optical waveguide such as an optical fiber. The measurement object B is disposed on an optical path between the pulse forming unit 3 and the beam splitter 5.

A light input end 4a of the correlation optical system 4 is optically coupled to one of a front surface and a rear surface of the beam splitter 5 spatially or via an optical waveguide such as an optical fiber. The spatial filter unit 8 is disposed on an optical path between the beam splitter 5 and the correlation optical system 4.

The photodetection unit 9 is optically coupled to a light output end 4b of the correlation optical system 4 spatially or via an optical waveguide such as an optical fiber. The imaging unit 7 is optically coupled to the other of the front surface and the rear surface of the beam splitter 5 spatially or via an optical waveguide such as an optical fiber. The operation unit 6 is electrically coupled to the pulse forming unit 3, the imaging unit 7, the spatial filter unit 8, and the photodetection unit 9.

The pulsed laser light source 2 outputs a coherent light pulse Pa. The pulsed laser light source 2 is, for example, a femtosecond laser, and in one example, a solid-state laser light source such as an LD direct excitation type Yb:YAG pulsed laser. The light pulse Pa is an example of a first light pulse in the present embodiment, and a temporal waveform is, for example, a Gaussian function shape. A full width at half maximum (FWHM) of the light pulse Pa is, for example, in the range of 10 to 10000 fs, and is 100 fs in one example. The light pulse Pa is a light pulse having a certain bandwidth, and includes a plurality of continuous wavelength components. In one example, the bandwidth of the light pulse Pa is 10 nm, and the center wavelength of the light pulse Pa is 1030 nm.

The pulse forming unit 3 is a unit for forming a light pulse train Pb including a plurality of light pulses (second light pulses) from the light pulse Pa. The light pulse train Pb is a single pulse group generated by dividing the spectrum constituting the light pulse Pa into a plurality of wavelength bands and using respective wavelength bands. In addition, there may be portions overlapping each other at the boundaries of the plurality of wavelength bands. In the following description, the light pulse train Pb may be referred to as a "multi pulse with band control".

Figure 2:
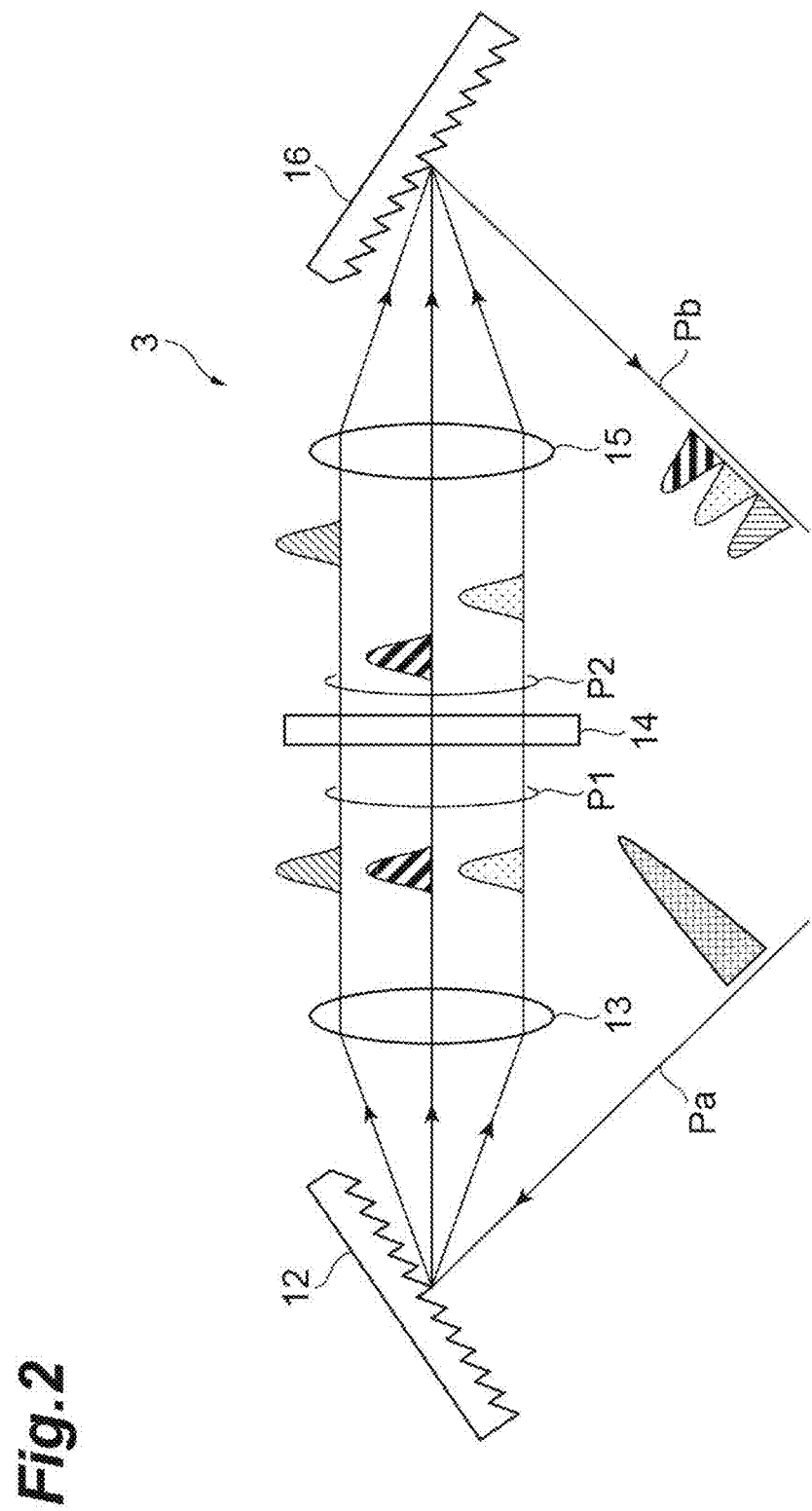
FIG. 2 is a diagram illustrating a configuration example of a pulse forming unit.

FIG. 2 is a diagram illustrating a configuration example of the pulse forming unit 3. The pulse forming unit 3 includes a diffraction grating 12, a lens 13, a spatial light modulator (SLM) 14, a lens 15, and a diffraction grating 16. The diffraction grating 12 is a dispersive element in the present embodiment, and is optically coupled to the pulsed laser light source 2. The SLM 14 is optically coupled to the diffraction grating 12 via the lens 13. The diffraction grating 12 spatially separates the plurality of wavelength components included in the light pulse Pa for each wavelength. In addition, as the dispersive element, another optical component such as a prism may be used instead of the diffraction grating 12.

The light pulse Pa is obliquely incident on the diffraction grating 12, and is spectrally dispersed into the plurality of wavelength components. The light P1 including the plurality of wavelength components is focused by the lens 13 for each wavelength component, and forms an image on a modulation plane of the SLM 14. The lens 13 may be a convex lens made of a light transmitting member or a concave mirror having a concave light reflection surface.

The SLM 14 shifts phases of the plurality of wavelength components output from the diffraction grating 12 for converting the light pulse Pa into the light pulse train Pb. For the above, the SLM 14 receives a control signal from the operation unit 6 (see FIG. 1), and simultaneously performs a phase modulation and an intensity modulation of the light P1. In addition, the SLM 14 may perform only a phase modulation or only an intensity modulation. The SLM 14 is, for example, of a phase modulation type. In one example, the SLM 14 is of a liquid crystal on silicon (LCOS) type. In addition, the SLM 14 of a transmission type is illustrated in the diagram, and the SLM 14 may be of a reflection type.

Figure 3:
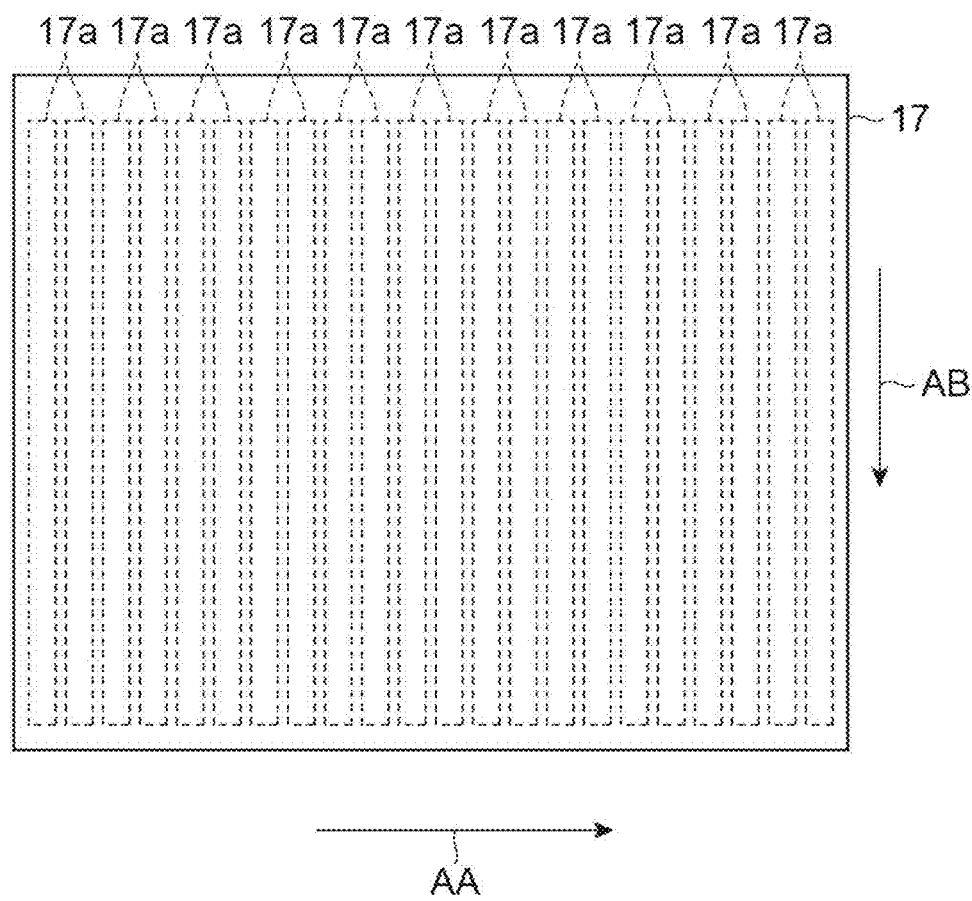
FIG. 3 is a diagram illustrating a modulation plane of a spatial light modulator.

FIG. 3 is a diagram illustrating a modulation plane 17 of the SLM 14. As illustrated in FIG. 3, in the modulation plane 17, a plurality of modulation regions 17a are arranged along a certain direction AA, and each modulation region 17a extends in a direction AB intersecting with the direction AA. The direction AA is a dispersing direction by the diffraction grating 12. The modulation plane 17 functions as a Fourier transform plane, and each corresponding wavelength component after the dispersion is incident on each of the plurality of modulation regions 17a. The SLM 14 modulates a phase and an intensity of each incident wavelength component, independently from the other wavelength components, in each modulation region 17a. In addition, since the SLM 14 in the present embodiment is of the phase modulation type, the intensity modulation is realized by a phase pattern (phase image) presented on the modulation plane 17.

Each wavelength component of modulated light P2 modulated by the SLM 14 is focused at a point on the diffraction grating 16 by the lens 15. At this time, the lens 15 functions as a focusing optical system for focusing the modulated light P2. The lens 15 may be a convex lens made of a light transmitting member or a concave mirror having a concave light reflection surface. Further, the diffraction grating 16 functions as a combining optical system, and combines the respective wavelength components after the modulation. That is, by the lens 15 and the diffraction grating 16, the plurality of wavelength components of the modulated light P2 are focused and combined to form the multi pulse with band control (light pulse train Pb).

FIG. 4A to FIG. 4C are diagrams illustrating an example of the multi pulse with band control. In this example, a light pulse train Pb including three light pulses $Pb_1$ to $Pb_3$ is illustrated. FIG. 4A is a spectrogram showing the time on the horizontal axis and the wavelength on the vertical axis, and the light intensity is represented by light and shade of color. FIG. 4B shows a temporal waveform of the light pulse train Pb. The temporal waveforms of the light pulses $Pb_1$ to $Pb_3$ are, for example, Gaussian function shapes.

As shown in FIG. 4A and FIG. 4B, the peaks of the three light pulses $Pb_1$ to $Pb_3$ are temporally separated from each other, and the propagation timings of the three light pulses $Pb_1$ to $Pb_3$ are shifted from each other. In other words, with respect to one light pulse $Pb_1$, another light pulse $Pb_2$ has a time delay, and with respect to the other light pulse $Pb_2$, yet another light pulse $Pb_3$ has a time delay. In addition, the foot portions of the adjacent light pulses $Pb_1$ and $Pb_2$ (or $Pb_2$ and $Pb_3$) may overlap each other. The time interval (peak interval) between the adjacent light pulses $Pb_1$ and $Pb_2$ (or $Pb_2$ and $Pb_3$) is, for example, in the range of 10 to 10000 fs, and is 2000 fs in one example. Further, the FWHM of each of the light pulses $Pb_1$ to $Pb_3$ is, for example, in the range of 10 to 5000 fs, and is 300 fs in one example.

FIG. 4C shows a spectrum obtained by combining the three light pulses $Pb_1$ to $Pb_3$. As shown in FIG. 4C, the spectrum obtained by combining the three light pulses $Pb_1$ to $Pb_3$ has a single peak, and with reference to FIG. 4A, the center wavelengths of the three light pulses $Pb_1$ to $Pb_3$ are shifted from each other. The spectrum including the single peak shown in FIG. 4C is approximately equal to the spectrum of the light pulse Pa.

The peak wavelength interval of the adjacent light pulses $Pb_1$ and $Pb_2$ (or $Pb_2$ and $Pb_3$) is determined by the spectrum bandwidth of the light pulse Pa, and is, in general, within the range of two times the full width at half maximum. In one example, when the spectrum bandwidth of the light pulse Pa is 10 nm, the peak wavelength interval is 5 nm. As a specific example, when the center wavelength of the light pulse Pa is 1030 nm, the peak wavelengths of the three light pulses $Pb_1$ to $Pb_3$ may be 1025 nm, 1030 nm, and 1035 nm, respectively.

FIG. 5A to FIG. 5C are diagrams illustrating an example of the multi pulse without band control as a comparative example. In this example, a light pulse train Pd including three light pulses $Pd_1$ to $Pd_3$ is illustrated. FIG. 5A is a spectrogram, similar to FIG. 4A, showing the time on the horizontal axis and the wavelength on the vertical axis, and the light intensity is represented by light and shade of color. FIG. 5B shows a temporal waveform of the light pulse train Pd. FIG. 5C shows a spectrum obtained by combining the three light pulses $Pd_1$ to $Pd_3$.

As shown in FIG. 5A to FIG. 5C, the peaks of the three light pulses $Pd_1$ to $Pd_3$ are temporally separated from each other, and the center wavelengths of the three light pulses $Pd_1$ to $Pd_3$ coincide with each other. The pulse forming unit 3 of the present embodiment does not generate such light pulse train Pd, but generates the light pulse train Pb having different center wavelengths as shown in FIG. 4A to FIG. 4C.

Referring again to FIG. 1. The beam splitter 5 is an example of an optical branching unit in the present embodiment, and branches the light pulse train Pb output from the pulse forming unit 3 and then passed through the measurement object B into two beams. The beam splitter 5 may include, for example, a light transmissive substrate in a wavelength range including the wavelength of the light pulse train Pb and a dielectric multilayer film formed on a front surface of the substrate. The front surface of the substrate forms an angle larger than 0° and smaller than 90° (in one example, 45°) with respect to the optical path of the light pulse train Pb.

A part of the light pulse train Pb incident on the front surface of the beam splitter 5 is reflected by the dielectric multilayer film and travels in a direction intersecting with the traveling direction of the light pulse train Pb before being incident on the beam splitter 5. The remaining part of the light pulse train Pb incident on the front surface of the beam splitter 5 passes through the dielectric multilayer film and travels in the same direction as the traveling direction of the light pulse train Pb before being incident on the beam splitter 5. The branching ratio of the beam splitter 5 is, for example, 1:1.

The imaging unit 7 disperses and then images one light pulse train Pb in the two light pulse trains Pb branched by the beam splitter 5, and generates imaging data for each light pulse included in the one light pulse train Pb. Specifically, the imaging unit 7 includes a spectrometer 71 and an image sensor 72.

The spectrometer 71 is optically coupled to the front surface of the beam splitter 5 and receives the one light pulse train Pb. The spectrometer 71 spatially disperses the light pulse train Pb according to the wavelength. That is, the spectrometer 71 outputs the plurality of light pulses $Pb_1$, $Pb_2$, and $Pb_3$ included in the light pulse train Pb and having different wavelengths to different spatial positions.

The image sensor 72 has a light receiving plane opposed to a light output plane of the spectrometer 71. The image sensor 72 images the light pulses $Pb_1$, $Pb_2$, and $Pb_3$ incident on the respective regions in the light receiving plane, and generates a plurality of imaging data corresponding to the light pulses $Pb_1$, $Pb_2$, and $Pb_3$. As described above, by spectrally dispersing the light pulse train Pb and imaging each of the light pulses $Pb_1$, $Pb_2$, and $Pb_3$, it is possible to perform higher-speed imaging than the frame rate of the image sensor 72 (specifically, imaging at the same speed as the time interval of the light pulses $Pb_1$, $Pb_2$, and $Pb_3$). The plurality of imaging data obtained in this manner are sent to the operation unit.

Figure 6:
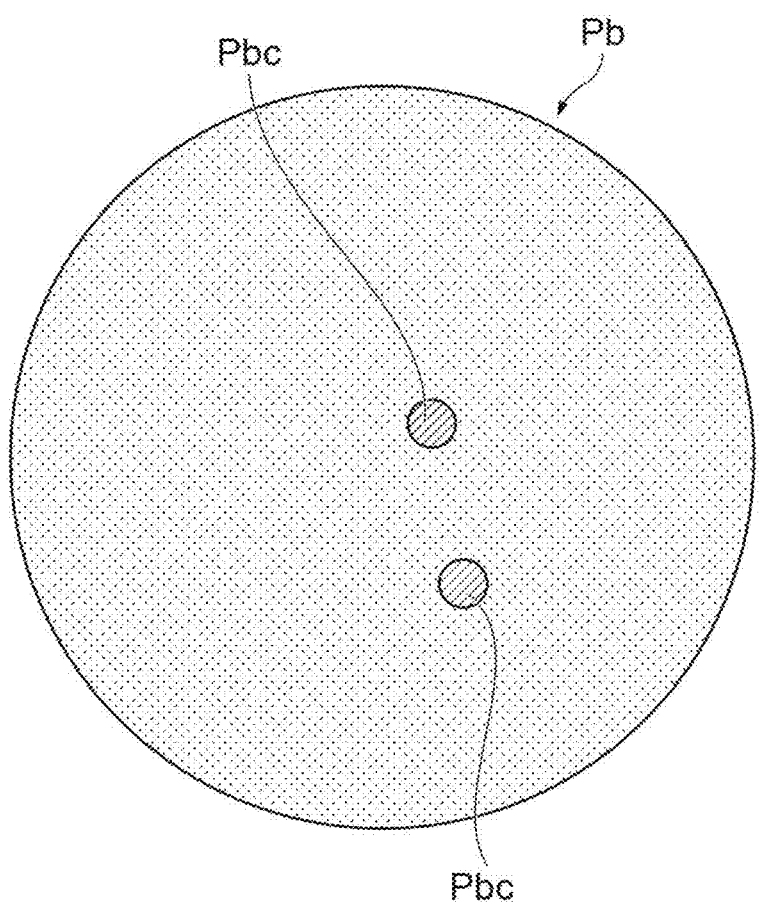
FIG. 6 is a diagram schematically illustrating a cross section intersecting with a traveling direction of the light pulse train.

The spatial filter unit 8 receives the other light pulse train Pb branched by the beam splitter 5. FIG. 6 is a diagram schematically illustrating a cross section intersecting with the traveling direction of the light pulse train Pb. The spatial filter unit 8 extracts one or a plurality of partial regions Pbc in the cross section intersecting with (for example, perpendicular to) the traveling direction of the light pulse train Pb. For this purpose, the spatial filter unit 8 of the present embodiment includes a spatial filter 84.

The spatial filter 84 is disposed on the optical path of the light pulse train Pb between the beam splitter 5 and the correlation optical system 4. The spatial filter 84 passes the light of the one or plurality of partial regions Pbc in the light pulse train Pb output from the beam splitter 5, and blocks the remaining light. In one example, the spatial filter 84 includes a pinhole 84a configured to pass only the light in the partial region Pbc.

The position of the partial region Pbc in the spatial filter 84 is changeable. For this purpose, the dispersion measurement apparatus 1 includes an actuator 85 as means for changing the spatial position of the partial region Pbc in the cross section intersecting with the traveling direction of the light pulse train Pb. The actuator 85 may form a part of the spatial filter unit 8.

The actuator 85 is attached to the spatial filter 84, and changes the position of the pinhole 84a in a plane intersecting with the traveling direction of the light pulse train Pb by moving the position of the spatial filter 84 in the plane. In addition, the means for changing the spatial position of the partial region Pbc is not limited to the above, and for example, a plate whose light transmittance can be controlled by an applied voltage may be used to change the position of the pinhole 84a by changing the position to which the voltage is applied.

The correlation optical system 4 receives the light of the one or plurality of partial regions Pbc extracted by the spatial filter unit 8 in the other light pulse train Pb branched by the beam splitter 5, and outputs correlation light Pc including a cross-correlation or an autocorrelation of the light. In the present embodiment, the correlation optical system 4 includes a lens 41, an optical element 42, and a lens 43. The lens 41 is provided on an optical path between the pulse forming unit 3 and the optical element 42, and focuses the light of the partial region Pbc extracted by the spatial filter unit 8 on the optical element 42.

The optical element 42 is, for example, an emission material including at least one of a nonlinear optical crystal that generates a second harmonic (SHG) and a fluorescent material. Examples of the nonlinear optical crystal include KTP (KTiOPO$_4$) crystal, LBO (LiB$_3$O$_5$) crystal, and BBO (β-BaB$_2$O$_4$) crystal. Examples of the fluorescent material include coumarin, stilbene, and rhodamine. The optical element 42 inputs the light of the partial region Pbc extracted from the light pulse train Pb, and generates the correlation light Pc including the cross-correlation or the autocorrelation of the light. The lens 43 collimates or focuses the correlation light Pc output from the optical element 42.

Figure 7:
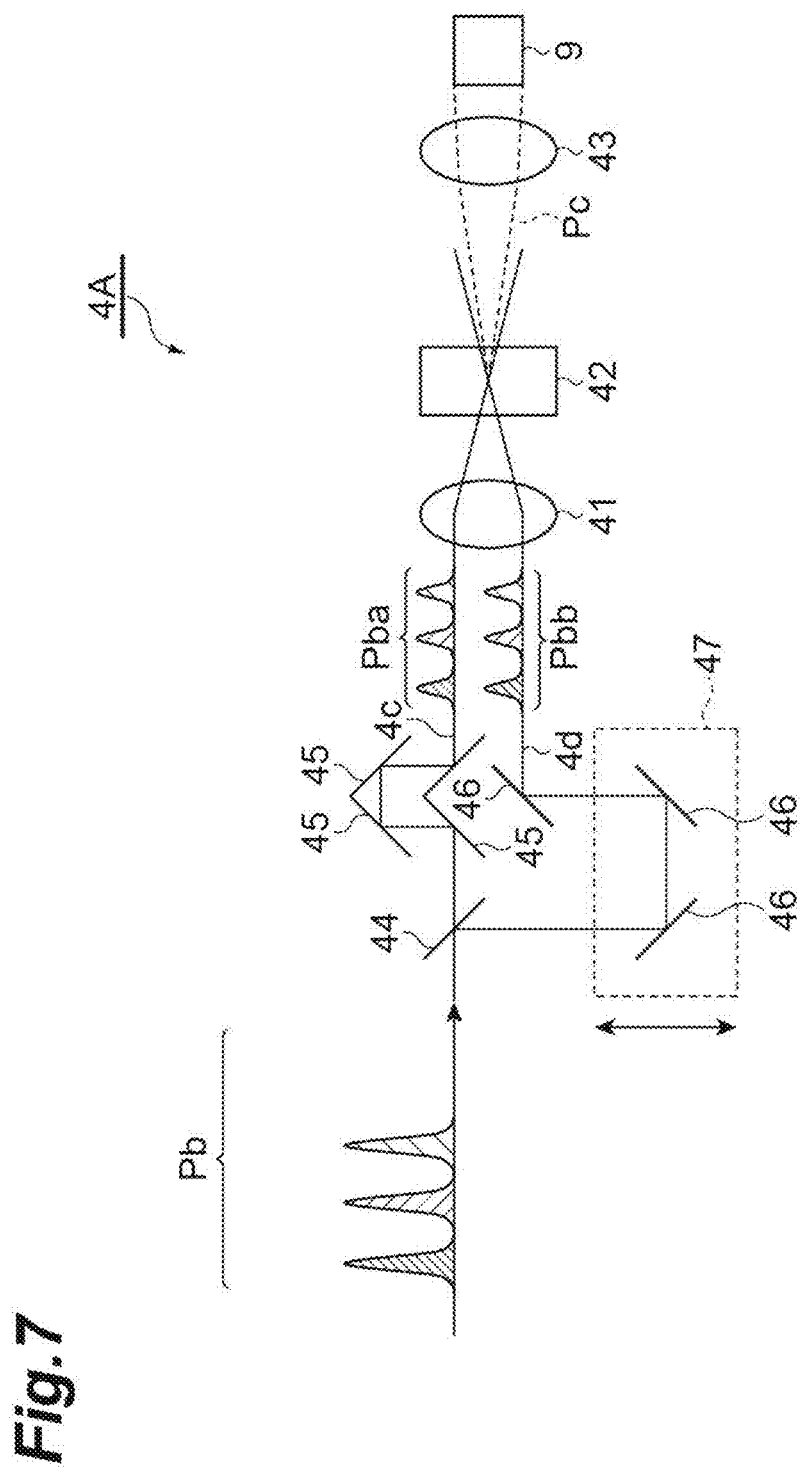
FIG. 7 is a diagram schematically illustrating a configuration example of a correlation optical system for generating correlation light including an autocorrelation of the light pulse train.

In addition, a configuration example of the correlation optical system 4 will be described in detail. FIG. 7 is a diagram schematically illustrating a correlation optical system 4A for generating the correlation light Pc including the autocorrelation of the light pulse train Pb passed through the spatial filter unit 8 as a configuration example of the correlation optical system 4. The correlation optical system 4A includes a beam splitter 44 as an optical branching component for branching the light pulse train Pb into two beams. The beam splitter 44 is optically coupled to the beam splitter 5 illustrated in FIG. 1 via the spatial filter unit 8, and transmits a part of the light pulse train Pb passed through the spatial filter unit 8 and reflects the remaining part. The branching ratio of the beam splitter 44 is, for example, 1:1.

One light pulse train Pba branched by the beam splitter 44 reaches the lens 41 through an optical path 4c including a plurality of mirrors 45. The other light pulse train Pbb branched by the beam splitter 44 reaches the lens 41 through an optical path 4d including a plurality of mirrors 46. The optical length of the optical path 4c is different from the optical length of the optical path 4d. Therefore, the plurality of mirrors 45 and the plurality of mirrors 46 constitute a delay optical system for providing a time difference between the one light pulse train Pba and the other light pulse train Pbb branched by the beam splitter 44. Further, at least part of the plurality of mirrors 46 are mounted on a movable stage 47, and the optical length of the optical path 4d is variable. Therefore, in this configuration, the time difference between the light pulse train Pba and the light pulse train Pbb can be made variable.

In this example, the optical element 42 includes a nonlinear optical crystal. The lens 41 focuses the light pulse trains Pba and Pbb toward the optical element 42, and causes the optical axes of the light pulse trains Pba and Pbb to intersect with each other at a predetermined angle in the optical element 42. As a result, in the optical element 42 being the nonlinear optical crystal, a second harmonic is generated starting from the intersection of the light pulse trains Pba and Pbb. The second harmonic is the correlation light Pc, and includes the autocorrelation of the light pulse train Pb. The correlation light Pc is collimated or focused by the lens 43, and then input to the photodetection unit 9.

Figure 8:
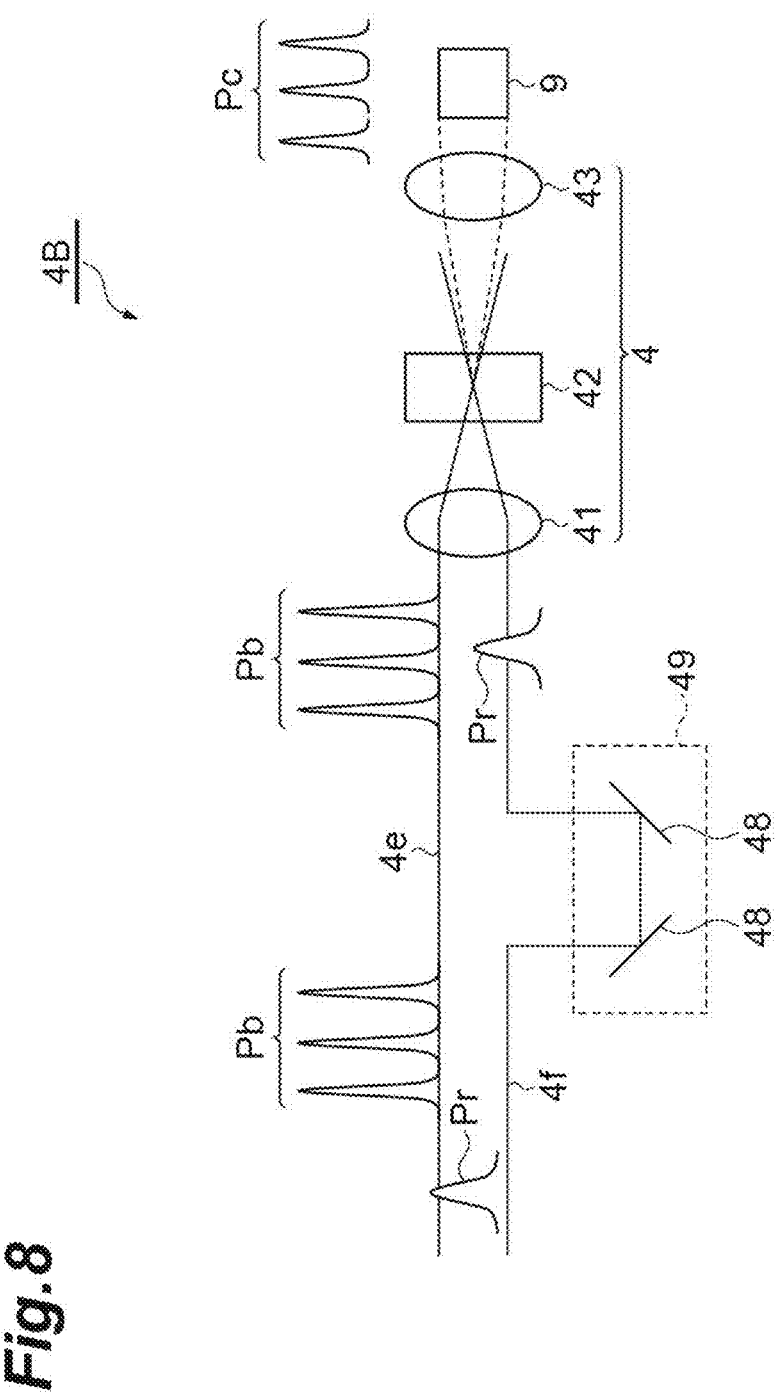
FIG. 8 is a diagram schematically illustrating another configuration example of the correlation optical system for generating correlation light including a cross-correlation of the light pulse train.

FIG. 8 is a diagram schematically illustrating a correlation optical system 4B for generating the correlation light Pc including the cross-correlation of the light pulse train Pb passed through the spatial filter unit 8 as another configuration example of the correlation optical system 4. In this correlation optical system 4B, the light pulse train Pb passed through the spatial filter unit 8 reaches the lens 41 through an optical path 4e, and a reference light pulse Pr being a single pulse reaches the lens 41 through an optical path 4f.

The optical path 4f includes a plurality of mirrors 48, and is curved in a U-shape. Further, at least part of the plurality of mirrors 48 are mounted on a movable stage 49, and the optical length of the optical path 4f is variable. Therefore, in this configuration, the time difference (timing difference reaching the lens 41) between the light pulse train Pb and the reference light pulse Pr can be made variable.

In this example also, the optical element 42 includes a nonlinear optical crystal. The lens 41 focuses the light pulse train Pb and the reference light pulse Pr toward the optical element 42, and causes the optical axis of the light pulse train Pb and the optical axis of the reference light pulse Pr to intersect with each other at a predetermined angle in the optical element 42. As a result, in the optical element 42 being the nonlinear optical crystal, a second harmonic is generated starting from the intersection of the light pulse train Pb and the reference light pulse Pr. The second harmonic is the correlation light Pc, and includes the cross-correlation of the light pulse train Pb. The correlation light Pc is collimated or focused by the lens 43, and then input to the photodetection unit 9.

Figure 9:
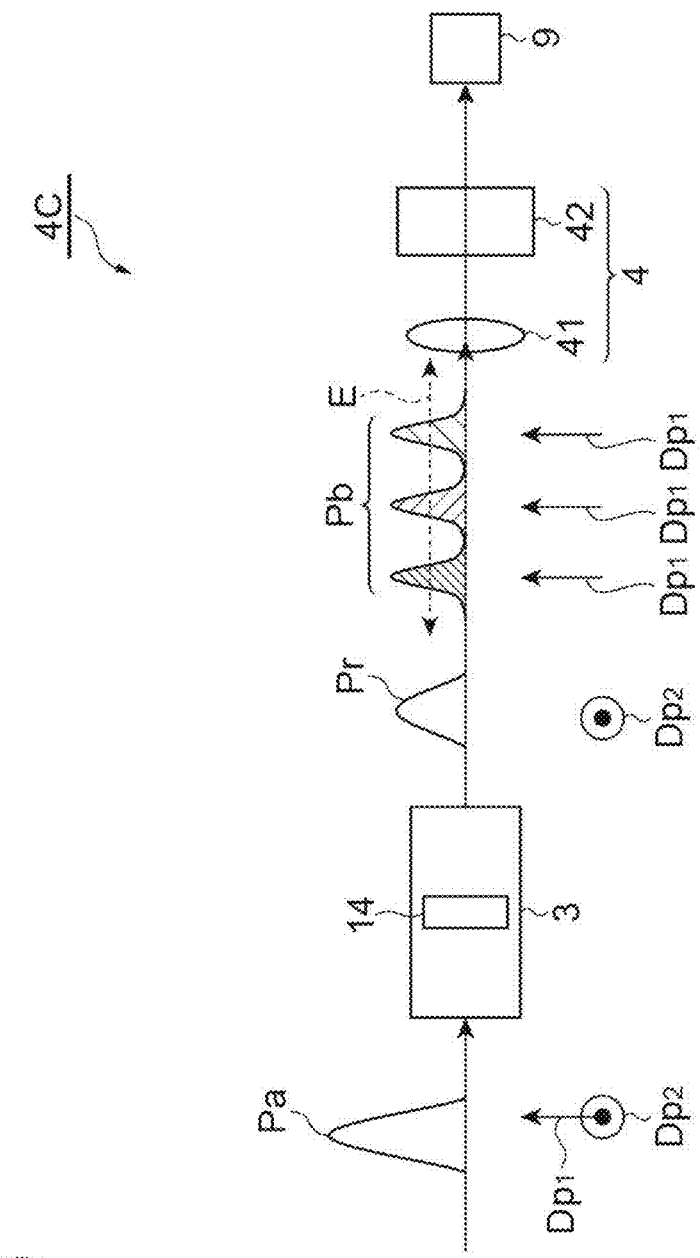
FIG. 9 is a diagram schematically illustrating still another configuration example of the correlation optical system for generating correlation light including a cross-correlation of the light pulse train.

FIG. 9 is a diagram schematically illustrating a correlation optical system 4C for generating the correlation light Pc including the cross-correlation of the light pulse train Pb passed through the spatial filter unit 8 as still another configuration example of the correlation optical system 4. In this example, the SLM 14 of the pulse forming unit 3 is a polarization dependent type spatial light modulator having a modulation function in a first polarization direction. On the other hand, a polarization plane of the light pulse Pa input to the pulse forming unit 3 is inclined with respect to the polarization direction in which the SLM 14 has the modulation function, and the light pulse Pa includes a polarization component (arrow $Dp_1$ in the drawing) in the first polarization direction and a polarization component (symbol $Dp_2$ in the drawing) in a second polarization direction orthogonal to the first polarization direction. Further, the polarization of the light pulse Pa may be not only the above-described polarization (inclined linear polarization) but also elliptical polarization.

The polarization component of the first polarization direction in the light pulse Pa is modulated by the SLM 14, and output from the pulse forming unit 3 as the light pulse train Pb. On the other hand, the polarization component of the second polarization direction in the light pulse Pa is not modulated by the SLM 14, and output from the pulse forming unit 3 without change. The unmodulated polarization component is provided to the correlation optical system 4C coaxially with the light pulse train Pb as a reference light pulse Pr being a single pulse.

The correlation optical system 4C generates the correlation light Pc including the cross-correlation of the light pulse train Pb from the light pulse train Pb passed through the spatial filter unit 8 and the reference light pulse Pr. In this configuration example, by providing the delay to the light pulse train Pb by the SLM 14 and making the delay time variable (arrow E in the drawing), the time difference (timing difference reaching the lens 41) between the light pulse train Pb and the reference light pulse Pr can be made variable, and the correlation light Pc including the cross-correlation of the light pulse train Pb can be preferably generated in the correlation optical system 4.

Figure 10A:
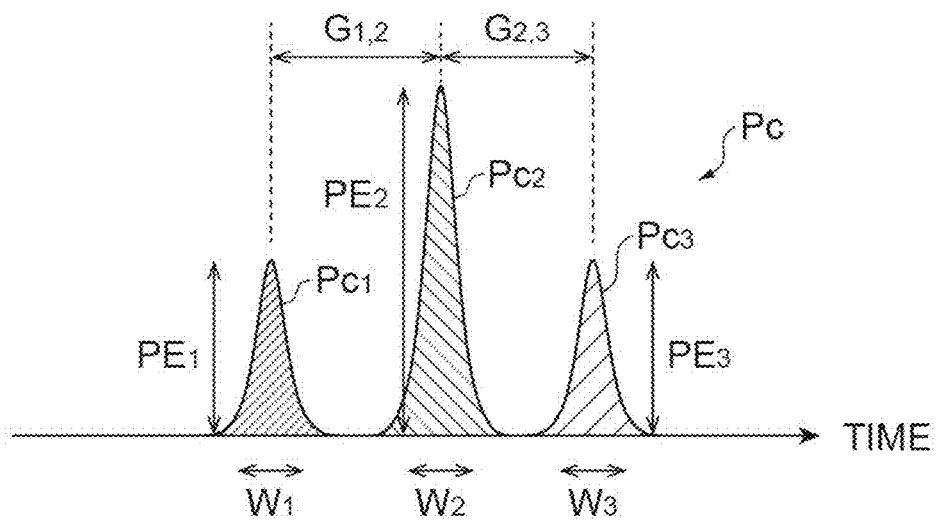
FIG. 10A and FIG. 10B are (A) a diagram showing an example of a temporal waveform of the correlation light when a measurement object has no wavelength dispersion (wavelength dispersion is zero), and (B) a diagram showing an example of a temporal waveform of the correlation light when the measurement object has a wavelength dispersion (wavelength dispersion is not zero).
Figure 10B:
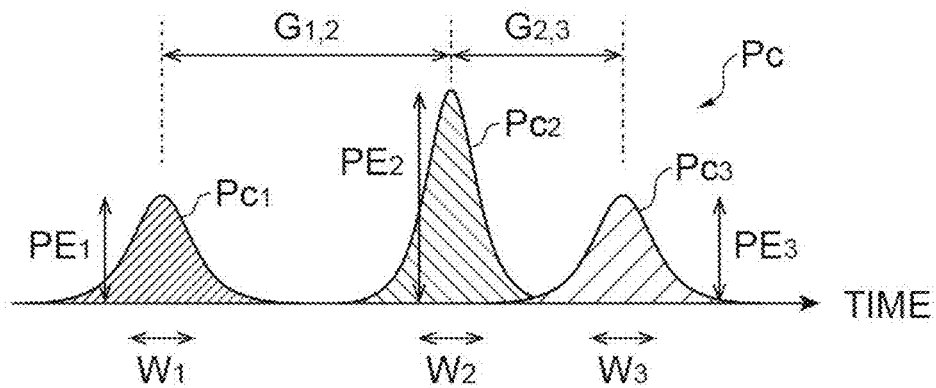

FIG. 10A and FIG. 10B are diagrams for conceptually describing a feature value of the correlation light Pc. FIG. 10A shows an example of a temporal waveform of the correlation light Pc when the measurement object B has no wavelength dispersion (wavelength dispersion is zero). FIG. 10B shows an example of a temporal waveform of the correlation light Pc when the measurement object B has a wavelength dispersion (wavelength dispersion is not zero).

In addition, in these examples, the light pulse train Pb input to the correlation optical system 4 includes the three light pulses $Pb_1$ to $Pb_3$ shown in FIG. 4B. In this case, the correlation light Pc includes three light pulses $Pc_1$ to $Pc_3$ corresponding to the light pulses $Pb_1$ to $Pb_3$, respectively. Further, it is assumed that the peak intensities of the light pulses $Pc_1$ to $Pc_3$ are $PE_1$ to $PE_3$, the full widths at half maximum (FWHMs) of the light pulses $Pc_1$ to $Pc_3$ are $W_1$ to $W_3$, the peak time interval (pulse interval) between the light pulses $Pc_1$ and $Pc_2$ is $G_{1,2}$, and the peak time interval between the light pulses $Pc_2$ and $Pc_3$ is $G_{2,3}$.

As shown in FIG. 10A, when the measurement object B has no wavelength dispersion, the temporal waveform of the correlation light Pc is substantially the same as the temporal waveform of the light pulse train Pb. In this example, for the peak intensities, $PE_2$ is larger than $PE_1$ and $PE_3$, and $PE_1$ and $PE_3$ are substantially equal. Further, for the full widths at half maximum, $W_1$, $W_2$, and $W_3$ are substantially equal to each other. For the peak time intervals, $G_{1,2}$ and $G_{2,3}$ are substantially equal.

On the other hand, as shown in FIG. 10B, when the measurement object B has a wavelength dispersion, the temporal waveform of the correlation light Pc greatly changes from the temporal waveform of the light pulse train Pb. In this example, the peak intensities $PE_1$ to $PE_3$ of the light pulses $Pc_1$ to $Pc_3$ are significantly decreased as compared with FIG. 10A, and the full widths at half maximum $W_1$ to $W_3$ of the light pulses $Pc_1$ to $Pc_3$ are significantly increased as compared with FIG. 10A. Further, the peak time interval $G_{1,2}$ is much longer than that in FIG. 10A.

As described above, when the measurement object B has the wavelength dispersion, the feature values (peak intensities $PE_1$ to $PE_3$, full widths at half maximum $W_1$ to $W_3$, peak time intervals $G_{1,2}$ and $G_{2,3}$) of the temporal waveform of the correlation light Pc are significantly changed as compared with the case where the measurement object B does not have the wavelength dispersion. Further, the amount of change depends on the wavelength dispersion amount of the measurement object B. Therefore, the wavelength dispersion amount of the measurement object B can be accurately and easily known by observing the change in the feature value of the temporal waveform of the correlation light Pc.

Referring again to FIG. 1. The photodetection unit 9 is a unit for receiving the correlation light Pc output from the correlation optical system 4 and detecting the temporal waveform of the correlation light Pc. For this purpose, the photodetection unit 9 of the present embodiment includes a photodetector 91 such as a photodiode. The photodetector 91 detects the temporal waveform of the correlation light Pc by converting the intensity of the correlation light Pc output from the correlation optical system 4 into an electric signal. When there are a plurality of partial regions Pbc in the spatial filter unit 8, the photodetector 91 is provided for each partial region Pbc. The electric signal as the detection result is provided from the photodetector 91 to the operation unit 6.

The operation unit 6 estimates the partial wavelength dispersion amount (that is, of a portion through which the partial region Pbc has passed) in the measurement object B based on the feature value of the temporal waveform of the correlation light Pc provided from the photodetector 91. As described above, when the correlation light Pc including the cross-correlation or the autocorrelation of the light pulse train Pb is generated, various feature values (for example, pulse interval, peak intensity, pulse width, and the like) in the temporal waveform of the correlation light Pc have significant correlation with the wavelength dispersion amount of the measurement object B. Therefore, the operation unit 6 can accurately estimate the wavelength dispersion amount of a part of the measurement object B by evaluating the feature value of the temporal waveform of the correlation light Pc corresponding to the partial region Pbc of the light pulse train Pb.

Further, the operation unit 6 may calculate at least one value of a refractive index, a reflectance, an absorptance, and a thickness of the part of the measurement object B based on the estimated wavelength dispersion amount. The wavelength dispersion amount of the measurement object B is a physical quantity indicating how much refractive index difference the measurement object B has for each wavelength.

In order to obtain the refractive index for each wavelength, thickness information of the measurement object B is required in addition to the wavelength dispersion amount. On the other hand, when there is refractive index information, the thickness can be estimated from the wavelength dispersion amount. Further, the reflectance of the measurement object B can be estimated from the refractive index at the boundary with the substance. The absorptance (absorption spectrum) of the measurement object B can be estimated from the intensity changes of the light pulses $Pb_1$ to $Pb_3$ transmitted through the measurement object B (that is, the intensity changes of the light pulses $Pc_1$ to $Pc_3$).

Figure 11:
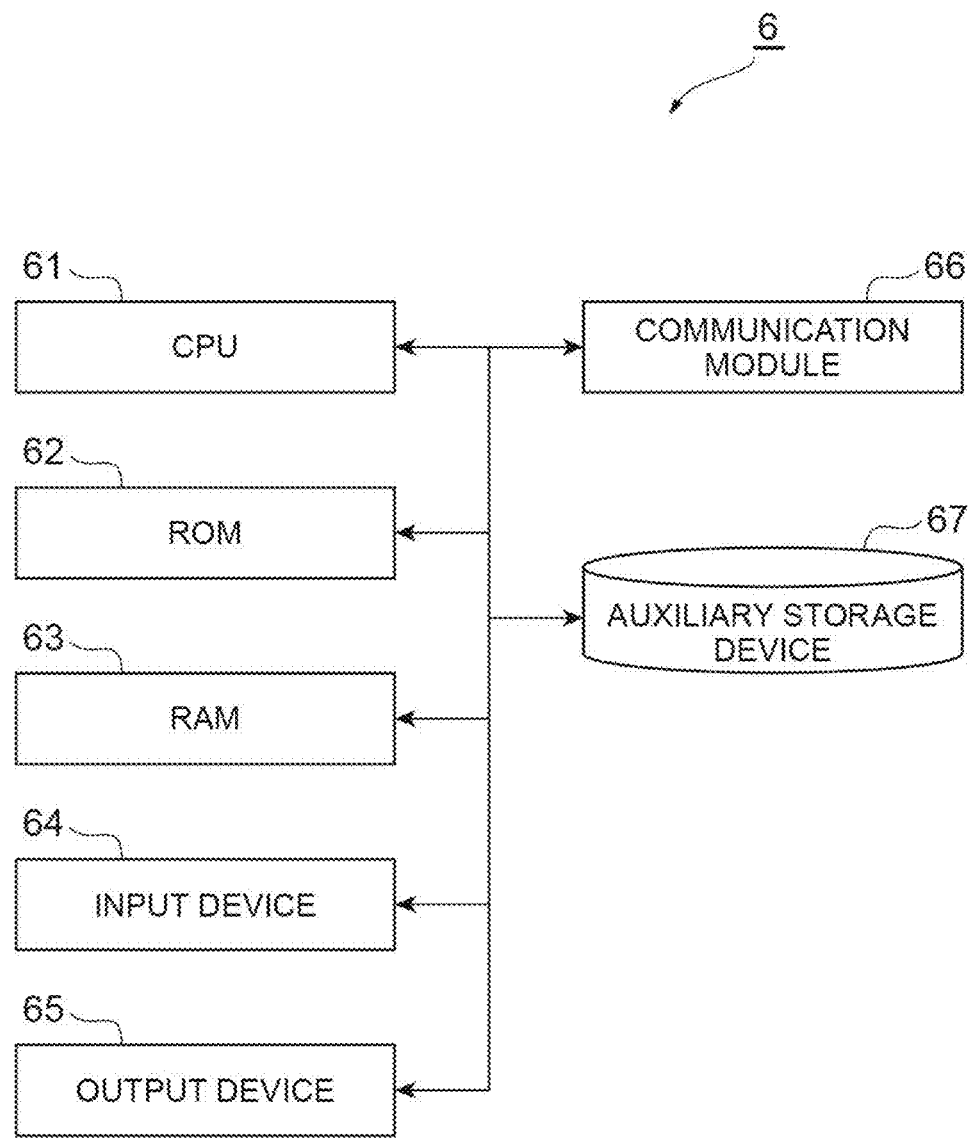
FIG. 11 is a diagram schematically illustrating a hardware configuration example of an operation unit.

FIG. 11 is a diagram schematically illustrating a hardware configuration example of the operation unit 6. As illustrated in FIG. 11, the operation unit 6 may be physically configured as a normal computer including a processor (CPU) 61, a main storage device such as a ROM 62 and a RAM 63, an input device 64 such as a keyboard, a mouse, and a touch screen, an output device 65 such as a display (including a touch screen), a communication module 66 such as a network card for transmitting/receiving data to/from other devices, an auxiliary storage device 67 such as a hard disk, and the like.

The processor 61 of the computer can implement the above function of the operation unit 6 by a wavelength dispersion amount calculation program. In other words, the wavelength dispersion amount calculation program causes the processor 61 of the computer to operate as the operation unit 6. The wavelength dispersion amount calculation program is stored in a storage device (storage medium) inside or outside the computer, for example, the auxiliary storage device 67. The storage device may be a non-transitory recording medium. Examples of the recording medium include a recording medium such as a flexible disk, a CD, and a DVD, a recording medium such as a ROM, a semiconductor memory, a cloud server, and the like.

The auxiliary storage device 67 stores the feature value of the temporal waveform of the correlation light Pc theoretically calculated in advance on the assumption that the wavelength dispersion of the measurement object B is zero. By comparing this feature value with the feature value of the temporal waveform detected by the photodetection unit 9, it is possible to know how much the feature value of the correlation light Pc has changed due to the wavelength dispersion in the measurement object B. Therefore, the operation unit 6 can estimate the wavelength dispersion amount of the measurement object B by comparing the feature value stored in the auxiliary storage device 67 and the feature value of the temporal waveform detected by the photodetection unit 9.

Figure 12:
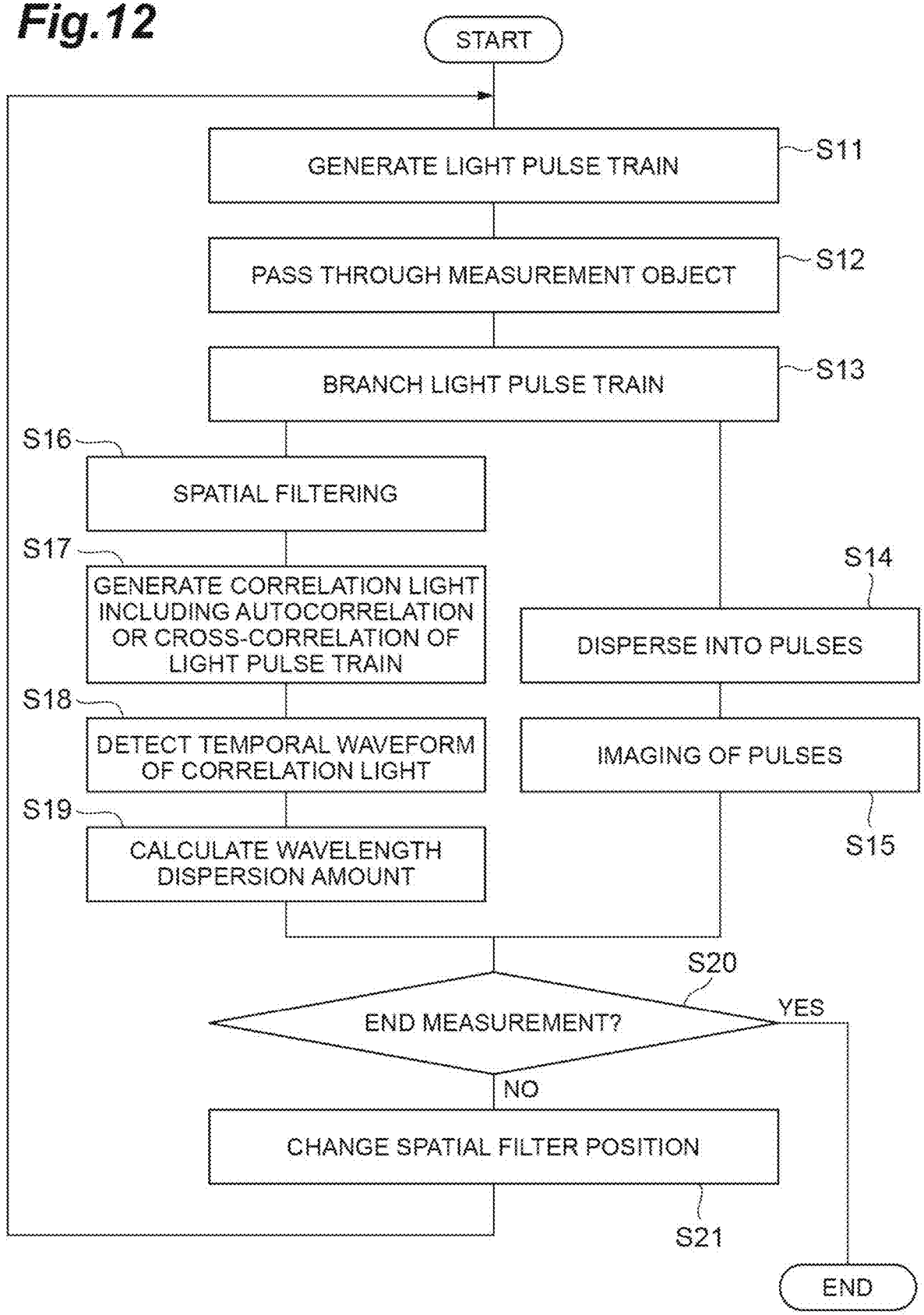
FIG. 12 is a flowchart illustrating a dispersion measurement method.

FIG. 12 is a flowchart illustrating a dispersion measurement method using the dispersion measurement apparatus 1 having the above configuration. In this method, first, in a pulse forming step S11, design information necessary for forming the light pulse train Pb is prepared. The design information includes, for example, a peak time interval, a peak intensity, a full width at half maximum, a pulse number, a band control amount, and the like, when it is assumed that the wavelength dispersion of the measurement object B is zero.

Then, from the light pulse Pa output from the pulsed laser light source 2, the light pulse train Pb including the plurality of light pulses $Pb_1$ to $Pb_3$ having time differences and center wavelengths different from each other is formed. For example, a plurality of wavelength components included in the light pulse Pa are spatially separated for each wavelength, the phases of the plurality of wavelength components are shifted from each other using the SLM 14, and then the plurality of wavelength components are focused. Thus, the light pulse train Pb can be easily generated. In a subsequent step S12, the light pulse train Pb passes (transmits) through the measurement object B.

Subsequently, in an optical branching step S13, the light pulse train Pb is branched into two beams. The beam splitter 5 described above is used for branching the light pulse train Pb. After the branching, a dispersing step S14 and an imaging data generation step S15, and a spatial filter step S16, a correlation light generation step S17, a photodetection step S18, and an operation step S19 are performed in parallel.

In the dispersing step S14, the one light pulse train Pb branched in the optical branching step S13 is dispersed by the spectrometer 71, and the light pulses $Pb_1$ to $Pb_3$ are output to spatially different positions. In the imaging data generation step S15, the light pulses $Pb_1$ to $Pb_3$ are imaged individually by the image sensor 72 to generate respective imaging data. Further, the dispersing step S14 and the imaging data generation step S15 constitute an imaging step in the present embodiment.

The spatial filter step S16 is performed after branching the light pulse train Pb in the optical branching step S13 and before generating the correlation light Pc in the correlation light generation step S17. In the spatial filter step S16, the light of the one or plurality of partial regions Pbc in the cross section intersecting with the traveling direction of the light pulse train Pb is passed, and the light of the partial regions Pbc in the cross section is extracted from the light pulse train Pb. In the spatial filter step S16, for example, the light of the partial region Pbc is extracted by using the spatial filter 84 having the pinhole 84a configured to pass only the light of the partial region Pbc.

In the correlation light generation step S17, the correlation light Pc including the cross-correlation or the autocorrelation of the light of the partial region Pbc in the light pulse train Pb is generated using the optical element 42 including at least one of a nonlinear optical crystal and a fluorescent material. For example, as shown in FIG. 7, the light pulse train Pb is branched into two beams, the one branched light pulse train Pbb is time-delayed with respect to the other light pulse train Pba, and the correlation light Pc including the autocorrelation of the light of the partial region Pbc in the light pulse train Pb is generated from the one time-delayed light pulse train Pbb and the other light pulse train Pba.

Subsequently, after detecting the temporal waveform of the correlation light Pc of the partial region Pbc in the light pulse train Pb in the photodetection step S18, the partial wavelength dispersion amount in the measurement object B is estimated in the operation step S19 based on the feature value of the temporal waveform. For example, the wavelength dispersion amount of a part of the measurement object B is estimated based on at least one of the peak intensities $E_1$ to $E_3$, the full widths at half maximum $W_1$ to $W_3$, and the peak time intervals $G_{1,2}$ and $G_{2,3}$ of the correlation light Pc.

Further, the feature value of the temporal waveform of the correlation light Pc theoretically calculated in advance on the assumption that the wavelength dispersion of the measurement object B is zero is compared with the feature value of the temporal waveform detected in the photodetection step S18 to estimate the wavelength dispersion amount of the measurement object B. In addition, the feature value used in the design of the light pulse train Pb may be used as the feature value of the temporal waveform of the correlation light Pc on the assumption that the wavelength dispersion of the measurement object B is zero. Further, in the operation step S19, at least one value of the refractive index, reflectance, absorptance, and thickness of the part of the measurement object B may be calculated based on the estimated wavelength dispersion amount.

As described with reference to FIG. 9, the SLM 14 may be the polarization dependent type SLM 14 having the modulation function in the first polarization direction. In this case, in the pulse forming step S11, the light pulse Pa including both the component of the first polarization direction and the component of the second polarization direction orthogonal to the first polarization direction may be input, the component of the first polarization direction in the light pulse Pa may be modulated by the SLM 14 to be set as the light pulse train Pb, and the component of the second polarization direction in the light pulse Pa may be set as the reference light pulse Pr without being modulated by the SLM 14. Then, in the correlation light generation step S17, the correlation light Pc including the cross-correlation of the light pulse train Pb may be generated from the light pulse train Pb having the first polarization direction and the reference light pulse Pr having the second polarization direction.

After the steps S14 to S19, it is determined whether or not to end the measurement (step S20). When the measurement is continued (step S20: NO), the spatial position of the partial region Pbc in the spatial filter 84 is changed using the actuator 85 (step S21), and the steps S11 to S19 are repeated again. When the measurement is ended (step S20: YES), the measurement is ended without repeating the steps S11 to S19.

In addition, the phase modulation for generating the multi pulse with band control in the SLM 14 of the pulse forming unit 3 illustrated in FIG. 2 will be described in detail. A region (spectral domain) before the lens 15 and a region (time domain) after the diffraction grating 16 are in a Fourier transform relation with each other, and the phase modulation in the spectral domain affects the temporal intensity waveform in the time domain. Therefore, the output light from the pulse forming unit 3 may have various temporal intensity waveforms different from that of the light pulse Pa according to the modulation pattern of the SLM 14.

Figure 13A:
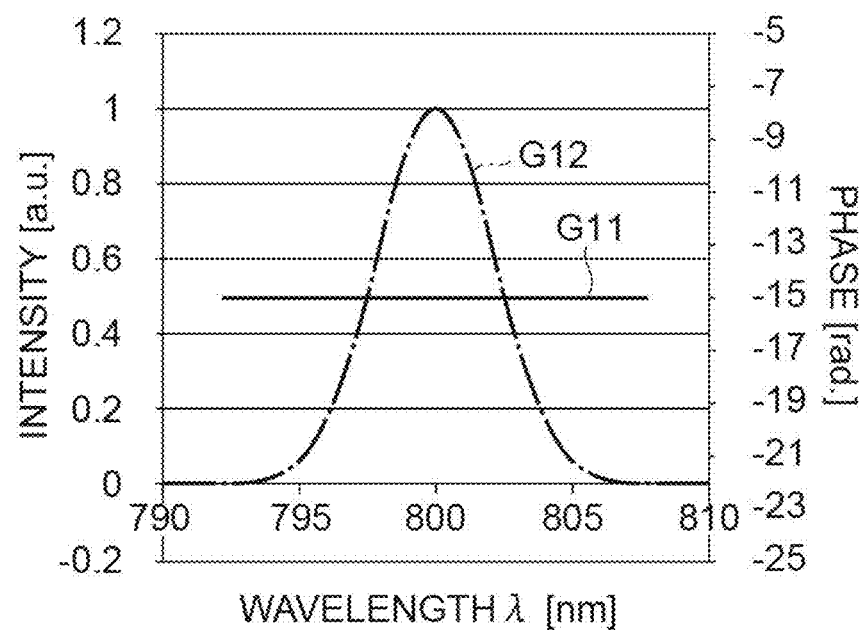
FIG. 13A and FIG. 13B are (A) a diagram showing a spectrum waveform of a light pulse of a single pulse shape, and (B) a diagram showing a temporal intensity waveform of the light pulse.
Figure 13B:
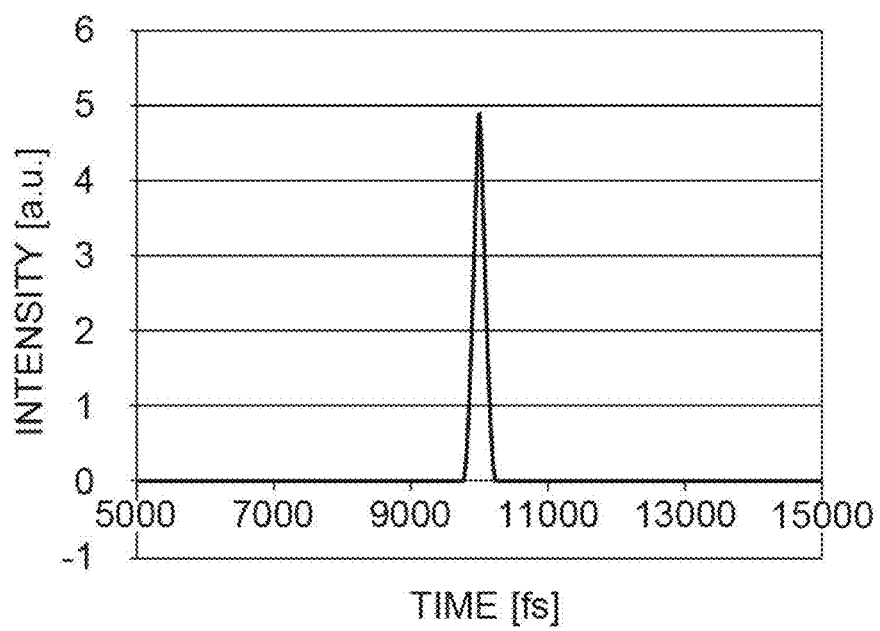
Figure 14A:
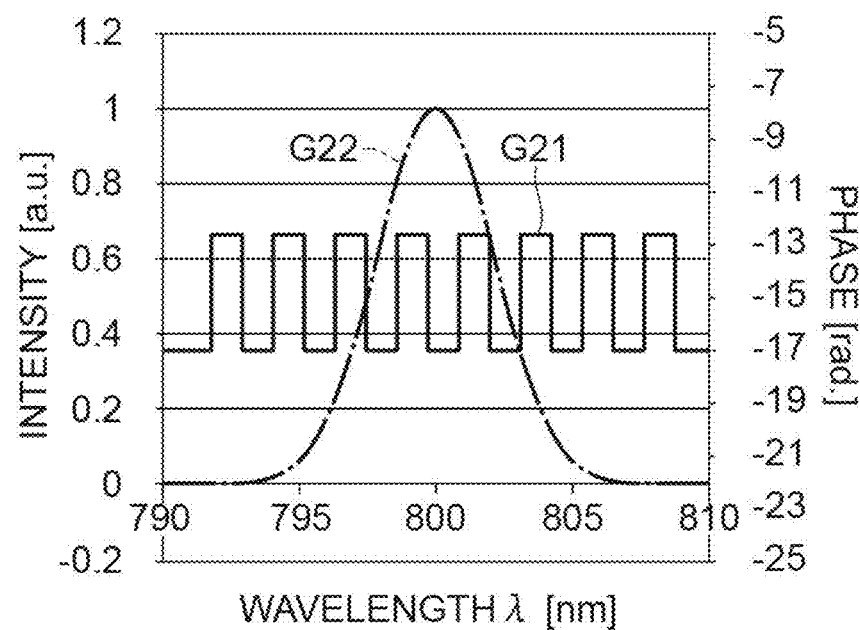
FIG. 14A and FIG. 14B are (A) a diagram showing a spectrum waveform of output light from the pulse forming unit when a phase spectrum modulation of a rectangular wave shape is applied by the spatial light modulator, and (B) a diagram showing a temporal intensity waveform of the output light.
Figure 14B:
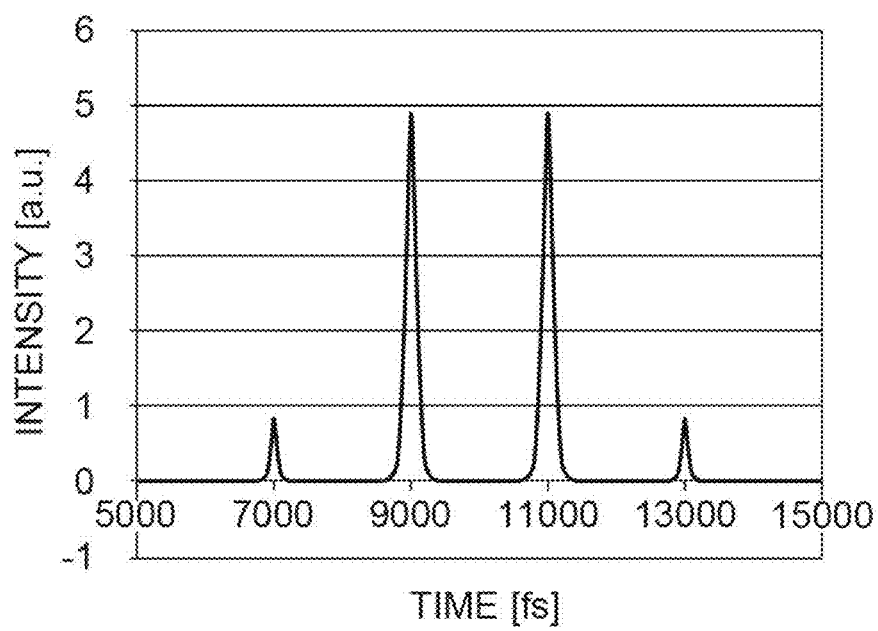

FIG. 13A shows, as an example, a spectrum waveform (spectrum phase G11 and spectrum intensity G12) of the light pulse Pa of a single pulse shape, and FIG. 13B shows a temporal intensity waveform of the light pulse Pa. Further, FIG. 14A shows, as an example, a spectrum waveform (spectrum phase G21 and spectrum intensity G22) of the output light from the pulse forming unit 3 when a phase spectrum modulation of a rectangular wave shape is applied in the SLM 14, and FIG. 14B shows a temporal intensity waveform of the output light. In FIG. 13A and FIG. 14A, the horizontal axis indicates the wavelength (nm), the left vertical axis indicates the intensity value (arb. unit) of the intensity spectrum, and the right vertical axis indicates the phase value (rad) of the phase spectrum. Further, in FIG. 13B and FIG. 14B, the horizontal axis indicates the time (femtosecond), and the vertical axis indicates the light intensity (arb. unit).

In this example, the single pulse of the light pulse Pa is converted into the double pulse with high-order light by applying the phase spectrum waveform of the rectangular wave shape to the output light. In addition, the spectrum and the waveform shown in FIG. 14A and FIG. 14B are only examples, and the temporal intensity waveform of the output light from the pulse forming unit 3 can be set into various shapes by combining various phase spectrums and intensity spectrums.

Figure 15:
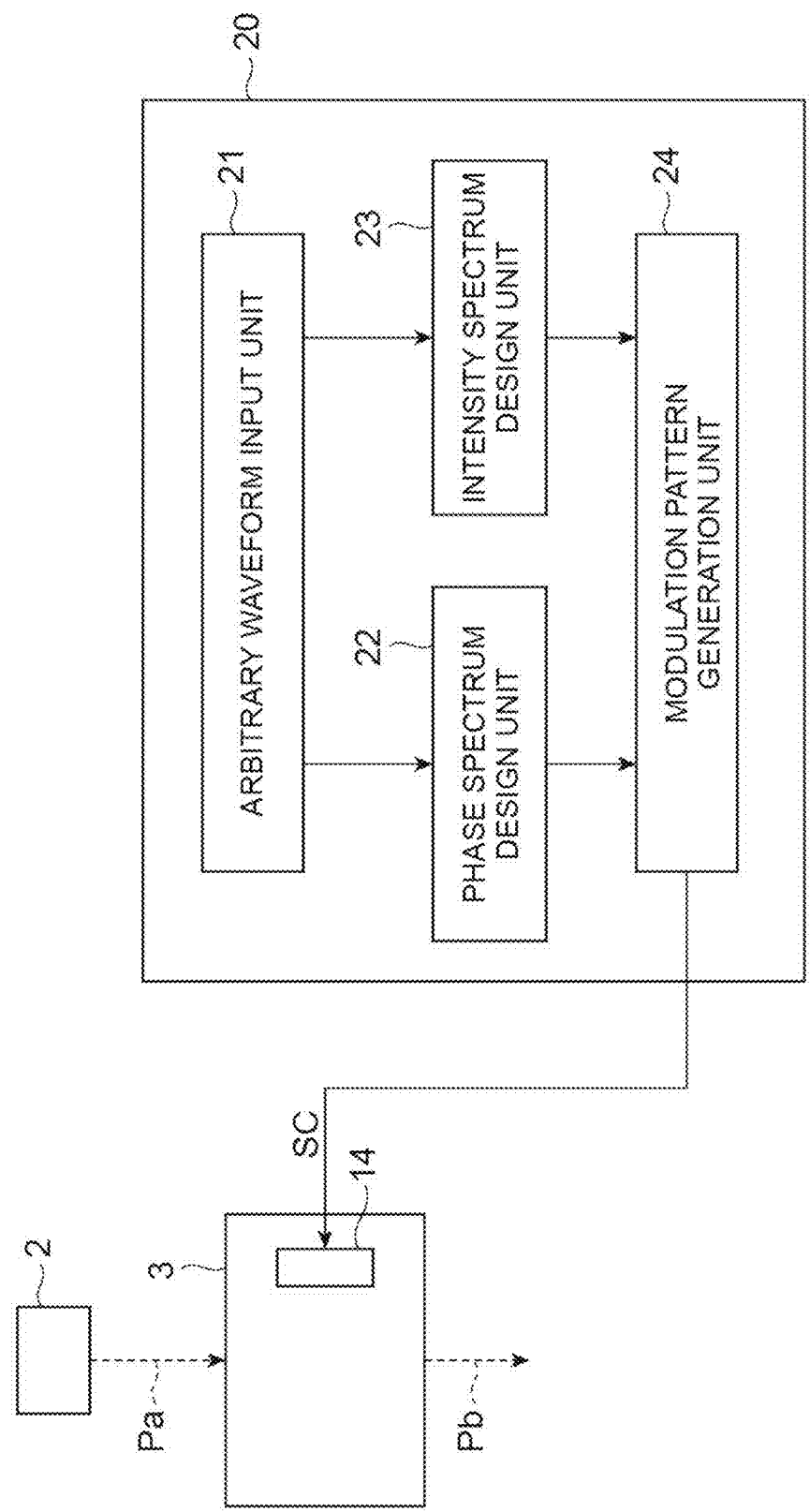
FIG. 15 is a diagram illustrating a configuration of a modulation pattern calculation apparatus for calculating a modulation pattern of the spatial light modulator.

FIG. 15 is a diagram illustrating a configuration of a modulation pattern calculation apparatus 20 for calculating the modulation pattern of the SLM 14. The modulation pattern calculation apparatus 20 is a computer having a processor including, for example, a personal computer, a smart device such as a smartphone and a tablet terminal, and a cloud server. In addition, the operation unit 6 illustrated in FIG. 1 may also serve as the modulation pattern calculation apparatus 20.

The modulation pattern calculation apparatus 20 is electrically coupled to the SLM 14, calculates a phase modulation pattern for approximating the temporal intensity waveform of the output light of the pulse forming unit 3 to a desired waveform, and provides a control signal including the phase modulation pattern to the SLM 14. The modulation pattern is data for controlling the SLM 14, and includes a table of the intensity of the complex amplitude distribution or the intensity of the phase distribution. The modulation pattern is, for example, a computer-generated hologram (CGH).

The modulation pattern calculation apparatus 20 of the present embodiment causes the SLM 14 to present a phase pattern including a phase modulation phase pattern that gives a phase spectrum for obtaining the desired waveform to the output light and an intensity modulation phase pattern that gives an intensity spectrum for obtaining the desired waveform to the output light. For this purpose, as illustrated in FIG. 15, the modulation pattern calculation apparatus 20 includes an arbitrary waveform input unit 21, a phase spectrum design unit 22, an intensity spectrum design unit 23, and a modulation pattern generation unit 24.

That is, the processor of the computer provided in the modulation pattern calculation apparatus 20 implements the functions of the arbitrary waveform input unit 21, the phase spectrum design unit 22, the intensity spectrum design unit 23, and the modulation pattern generation unit 24. The respective functions may be realized by the same processor, or may be realized by different processors.

The processor of the computer can implement the above respective functions by a modulation pattern calculation program. Therefore, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information on the desired temporal intensity waveform (for example, pulse interval, pulse width, pulse number, and the like) to the arbitrary waveform input unit 21. The information on the desired temporal intensity waveform is provided to the phase spectrum design unit 22 and the intensity spectrum design unit 23. The phase spectrum design unit 22 calculates a phase spectrum of the output light of the pulse forming unit 3 suitable for realizing the given desired temporal intensity waveform. The intensity spectrum design unit 23 calculates an intensity spectrum of the output light of the pulse forming unit 3 suitable for realizing the given desired temporal intensity waveform.

The modulation pattern generation unit 24 calculates a phase modulation pattern (for example, computer-generated hologram) for applying the phase spectrum obtained in the phase spectrum design unit 22 and the intensity spectrum obtained in the intensity spectrum design unit 23 to the output light of the pulse forming unit 3. Then, the control signal SC including the calculated phase modulation pattern is provided to the SLM 14. The SLM 14 is controlled based on the control signal SC.

Figure 16:
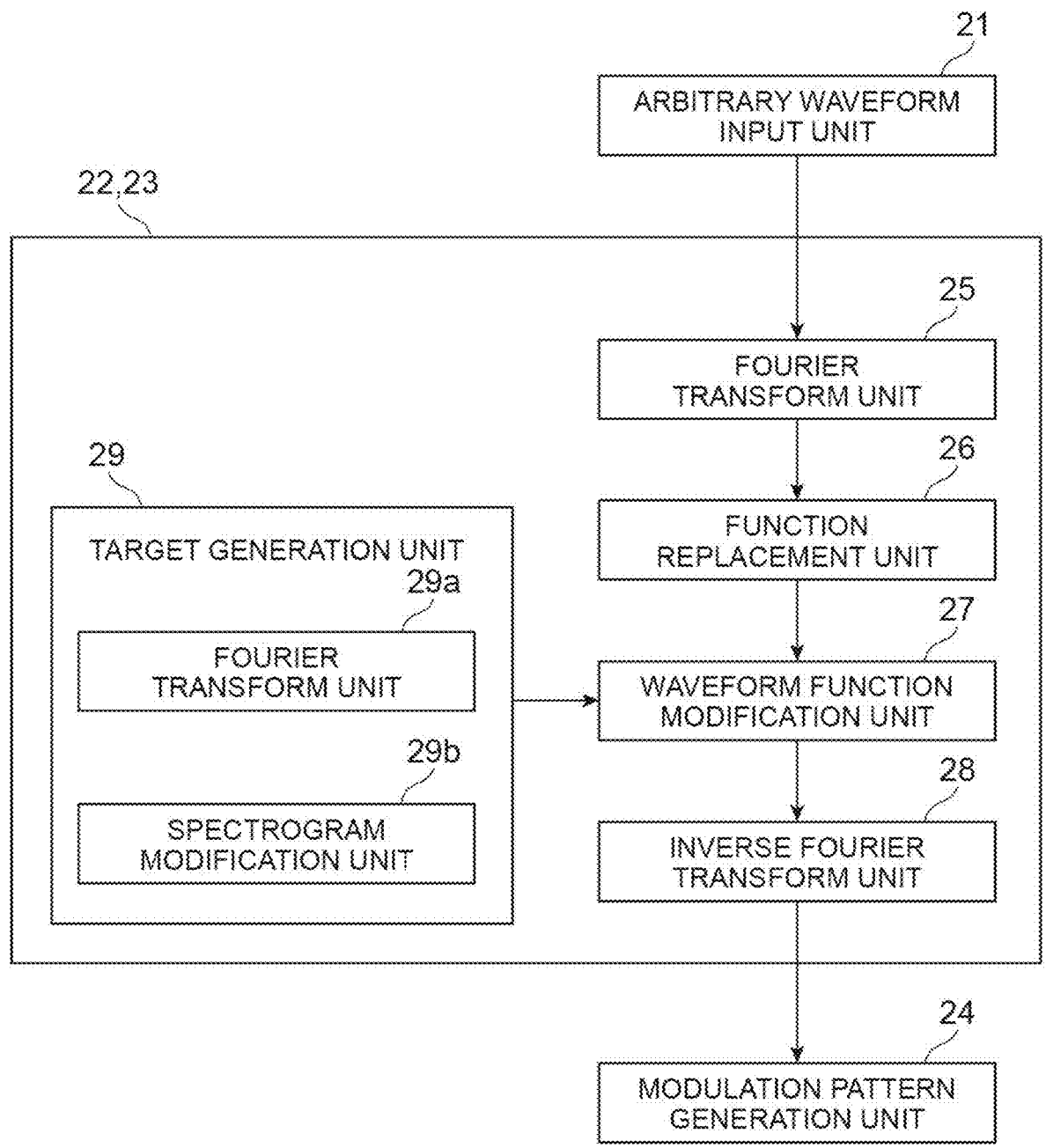
FIG. 16 is a block diagram illustrating an internal configuration of a phase spectrum design unit and an intensity spectrum design unit.

FIG. 16 is a block diagram illustrating an internal configuration of the phase spectrum design unit 22 and the intensity spectrum design unit 23. As illustrated in FIG. 16, each of the phase spectrum design unit 22 and the intensity spectrum design unit 23 includes a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. The functions of these components will be described in detail later.

Figure 17:
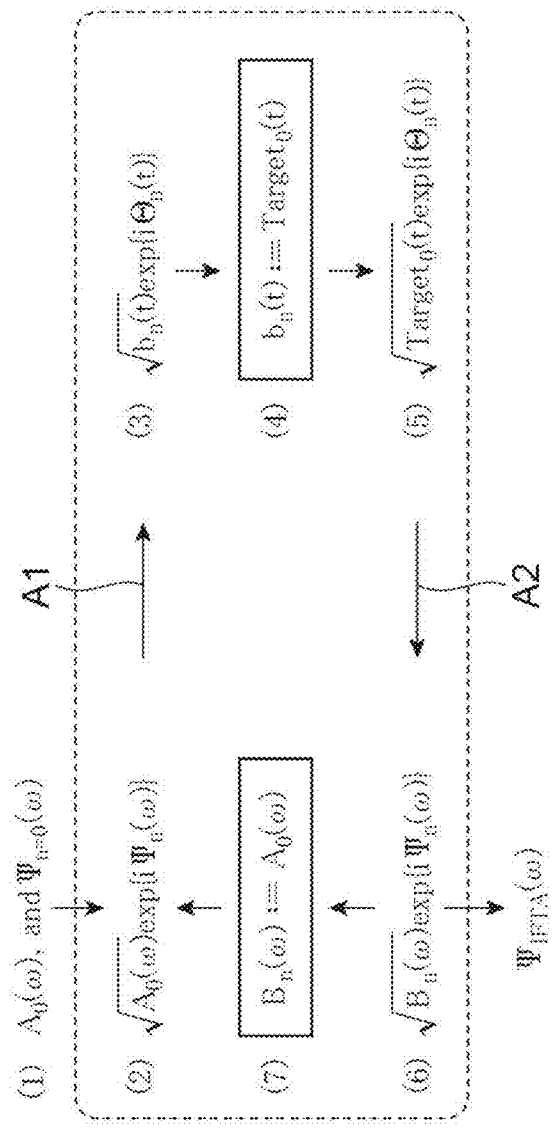
FIG. 17 is a diagram illustrating a calculation procedure of a phase spectrum using an iterative Fourier transform method.

Here, the desired temporal intensity waveform is expressed as a function in the time domain, and the phase spectrum is expressed as a function in the frequency domain. Therefore, the phase spectrum corresponding to the desired temporal intensity waveform is obtained by, for example, an iterative Fourier transform based on the desired temporal intensity waveform. FIG. 17 is a diagram illustrating a calculation procedure of the phase spectrum using the iterative Fourier transform method.

First, an initial intensity spectrum function $A_0(\omega)$ and a phase spectrum function $\Psi_0(\omega)$ to be functions of a frequency co are prepared (process number (1) in the drawing). In one example, the intensity spectrum function $A_0(\omega)$ and the phase spectrum function $\Psi_0(\omega)$ represent the spectrum intensity and the spectrum phase of the input light, respectively. Next, a waveform function (a) in the frequency domain including the intensity spectrum function $A_0(\omega)$ and the phase spectrum function $\Psi_n(\omega)$ is prepared (process number (2) in the drawing).

$$A_0(\omega)\exp\{i\Psi_n(\omega)\} \quad (a)$$

A subscript n represents after an n-th Fourier transform process. Before a first Fourier transform process, the initial phase spectrum function $\Psi_0(\omega)$ described above is used as the phase spectrum function $\Psi_n(\omega)$. i is an imaginary number.

Next, a Fourier transform from the frequency domain to the time domain is performed on the function (a) (arrow A1 in the drawing). As a result, a waveform function (b) in the time domain including a temporal intensity waveform function $b_n(t)$ and a temporal phase waveform function $\Theta_n(t)$ is obtained (process number (3) in the drawing).

$$\sqrt{b_n(t)}\exp\{i\Theta_n(t)\} \quad (b)$$

Next, the temporal intensity waveform function 1340 included in the function (b) is replaced by a temporal intensity waveform function $\text{Target}_0(t)$ based on the desired waveform (process numbers (4) and (5) in the drawing).

$$b_n(t):=\text{Target}_0(t) \quad (c)$$

$$\sqrt{\text{Target}_0(t)}\exp\{i\Theta_n(t)\} \quad (d)$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

$$\sqrt{B_n(\omega)}\exp\{i\Psi_n(\omega)\} \quad (e)$$

Next, to constrain the intensity spectrum function $B_n(\omega)$ included in the function (e), it is replaced by the initial intensity spectrum function $A_0(\omega)$ (process number (7) in the drawing).

$$B_n(\omega):=A_0(\omega) \quad (f)$$

Subsequently, the above processes (2) to (7) are repeatedly performed a plurality of times, so that the phase spectrum shape represented by the phase spectrum function $\Psi_n(\omega)$ in the waveform function can be brought close to a phase spectrum shape corresponding to the desired temporal intensity waveform. A phase spectrum function $\Psi_{IFTA}(\omega)$ to be finally obtained becomes a basis of a modulation pattern for obtaining the desired temporal intensity waveform.

Figure 18:
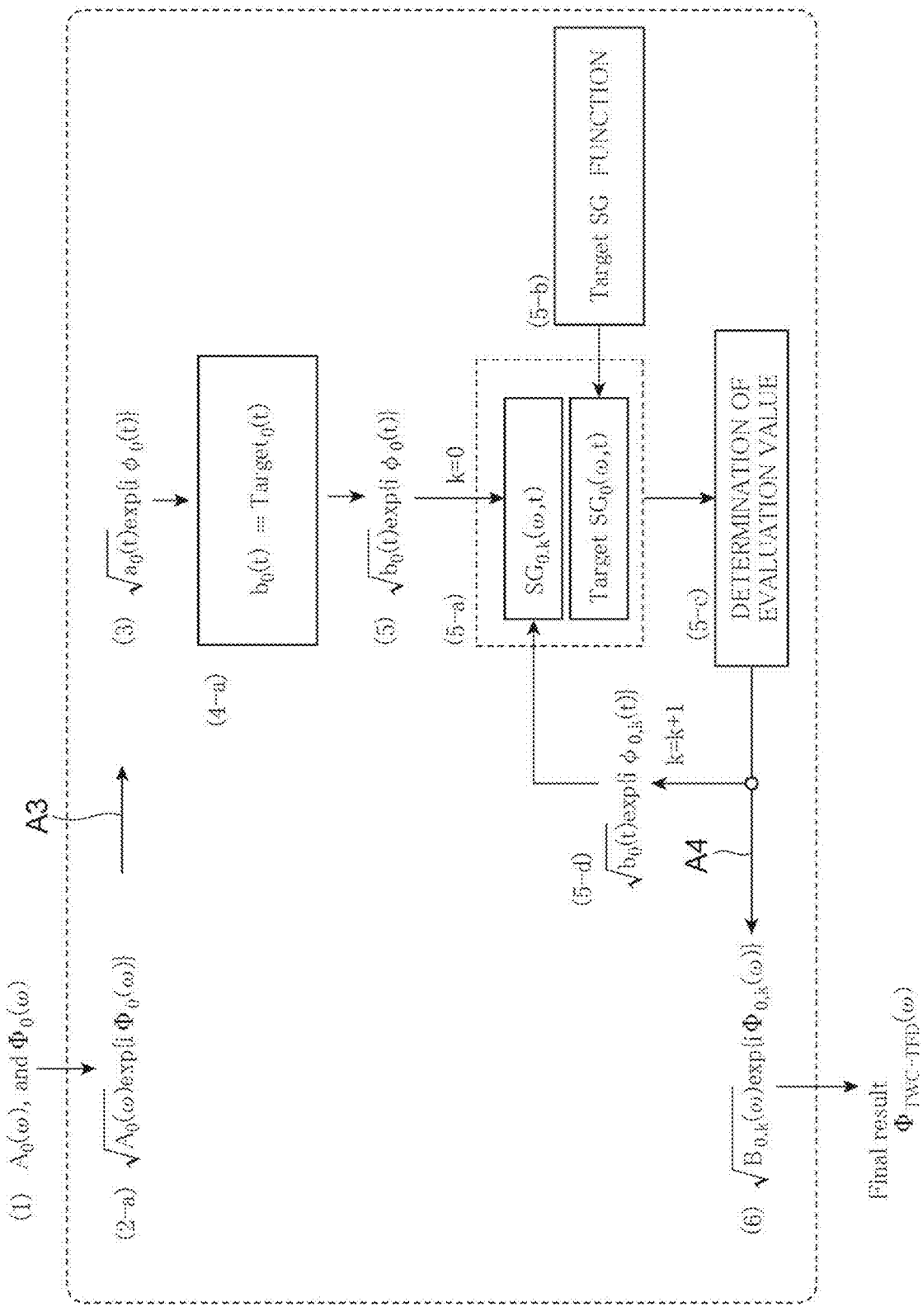
FIG. 18 is a diagram illustrating a calculation procedure of a phase spectrum function in the phase spectrum design unit.

However, in the iterative Fourier method described above, although it is possible to control the temporal intensity waveform, there is a problem in that it is not possible to control a frequency component (band wavelength) constituting the temporal intensity waveform. Therefore, the modulation pattern calculation apparatus 20 according to the present embodiment calculates the phase spectrum function and the intensity spectrum function on which the modulation pattern is based, using a calculation method described below. FIG. 18 is a diagram illustrating a calculation procedure of the phase spectrum function in the phase spectrum design unit 22.

First, an initial intensity spectrum function $A_0(\omega)$ and a phase spectrum function $\Phi_0(\omega)$ to be functions of a frequency co are prepared (process number (1) in the drawing). In one example, the intensity spectrum function $A_0(w)$ and the phase spectrum function $\Phi_0(\omega)$ represent the spectrum intensity and the spectrum phase of the input light, respectively. Next, a first waveform function (g) in the frequency domain including the intensity spectrum function $A_0(\omega)$ and the phase spectrum function $\Phi_0(\omega)$ is prepared (process number (2-a)). Here, i is an imaginary number.

$$\sqrt{A_0(\omega)}\exp\{i\Phi_0(\omega)\} \quad (g)$$

Next, the Fourier transform unit 25 of the phase spectrum design unit 22 performs the Fourier transform from the frequency domain to the time domain on the function (g) (arrow A3 in the drawing). As a result, a second waveform function (h) in the time domain including a temporal intensity waveform function $a_0(t)$ and a temporal phase waveform function $\phi_0(t)$ is obtained (Fourier transform step, process number (3)).

$$\sqrt{a_0(t)}\exp\{i\varphi_0(t)\} \quad (h)$$

Next, as shown in the following Formula (i), the function replacement unit 26 of the phase spectrum design unit 22 inputs the temporal intensity waveform function $\text{Target}_0(t)$ based on the desired waveform input in the arbitrary waveform input unit 21 to a temporal intensity waveform function $b_0(t)$ (process number (4-a)).

$$b_0(t)=\text{Target}_0(t) \quad (i)$$

Next, as shown in the following Formula (j), the function replacement unit 26 of the phase spectrum design unit 22 replaces the temporal intensity waveform function $a_0(t)$ by the temporal intensity waveform function $b_0(t)$. That is, the temporal intensity waveform function $a_0(t)$ included in the function (h) is replaced by the temporal intensity waveform function $\text{Target}_0(t)$ based on the desired waveform (function replacement step, process number (5)).

$$\sqrt{b_0(t)}\exp\{i\varphi_0(t)\} \quad (j)$$

Next, the waveform function modification unit 27 of the phase spectrum design unit 22 modifies the second waveform function so as to bring a spectrogram of the second waveform function (j) after the replacement close to a target spectrogram generated in advance according to a desired wavelength band. First, the second waveform function (j) is transformed into a spectrogram $SG_{0,k}(\omega,t)$ by performing a time-frequency transform on the second waveform function (j) after the replacement (process number (5-a) in the drawing). A subscript k represents a k-th transform process.

Here, the time-frequency transform refers to performing frequency filter processing or numerical calculation processing (processing of multiplying a window function while shifting the window function and deriving a spectrum for each time) on a composite signal such as a temporal waveform, and transforming it into three-dimensional information including a time, a frequency, and an intensity (spectrum intensity) of a signal component. Further, in the present embodiment, the transform result (time, frequency, spectrum intensity) is defined as a "spectrogram".

Examples of the time-frequency transform include a short-time Fourier transform (STFT), a wavelet transform (Haar wavelet transform, Gabor wavelet transform, Mexican hat wavelet transform, Morlet wavelet transform), and the like.

Further, a target spectrogram TargetSG$_0$($\omega$,t) generated in advance according to the desired wavelength band is read from the target generation unit 29. The target spectrogram TargetSG$_0$($\omega$,t) is roughly equivalent to a target temporal waveform (temporal intensity waveform and frequency components constituting it), and is generated in a target spectrogram function of a process number (5-b).

Next, the waveform function modification unit 27 of the phase spectrum design unit 22 performs pattern matching between the spectrogram SG$_{0,k}$($\omega$,t) and the target spectrogram TargetSG$_0$($\omega$,t) to check a similarity degree (matching degree). In the present embodiment, an evaluation value is calculated as an index representing the similarity degree. Then, in a subsequent process number (5-c), it is determined whether or not the obtained evaluation value satisfies a predetermined end condition. When the condition is satisfied, the process proceeds to a process number (6), and when the condition is not satisfied, the process proceeds to a process number (5-d). In the process number (5-d), the temporal phase waveform function $\phi_0$(t) included in the second waveform function is changed to an arbitrary temporal phase waveform function $\phi_{0,k}$(t). The second waveform function after changing the temporal phase waveform function is again transformed into a spectrogram by the time-frequency transform such as STFT.

Subsequently, the above process numbers (5-a) to (5-d) are repeatedly performed. In this way, the second waveform function is modified so as to bring the spectrogram SG$_{0,k}$($\omega$,t) gradually close to the target spectrogram TargetSG$_0$($\omega$,t) (waveform function modification step).

Thereafter, the inverse Fourier transform unit 28 of the phase spectrum design unit 22 performs the inverse Fourier transform on the second waveform function after the modification (arrow A4 in the drawing) to generate a third waveform function (k) in the frequency domain (inverse Fourier transform step, process number (6)).

$$\sqrt{b_{0,k}(\omega)}\exp\{i\Phi_{0,k}(\omega)\} \tag{k}$$

A phase spectrum function $\Phi_{0,k}$($\omega$) included in the third waveform function (k) becomes a desired phase spectrum function $\Phi_{TWC\text{-}TFD}$($\omega$) to be finally obtained. The phase spectrum function $\Phi_{TWC\text{-}TFD}$($\omega$) is provided to the modulation pattern generation unit 24.

Figure 19:
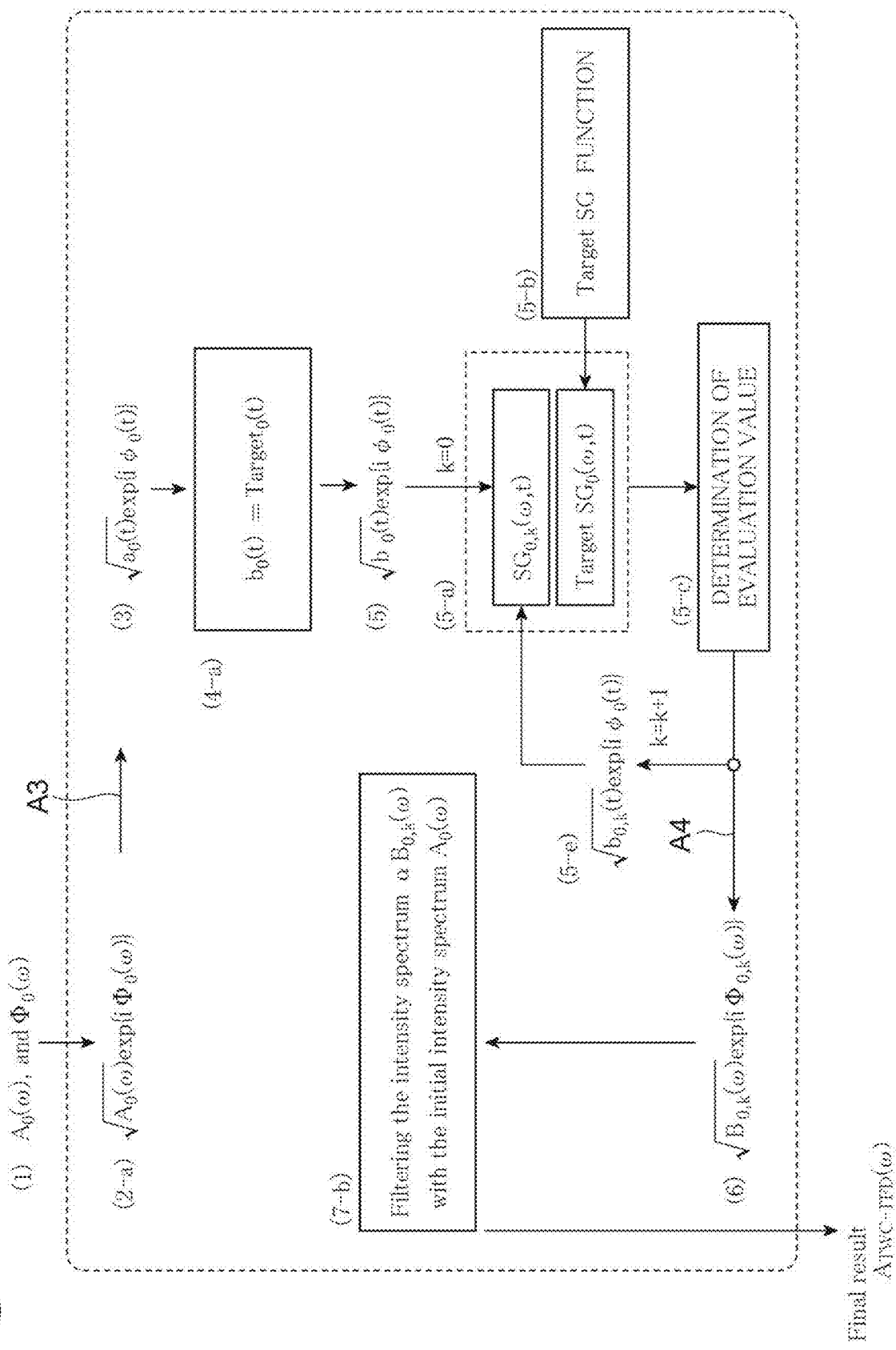
FIG. 19 is a diagram illustrating a calculation procedure of a spectrum intensity in the intensity spectrum design unit.

FIG. 19 is a diagram illustrating a calculation procedure of the spectrum intensity in the intensity spectrum design unit 23. In addition, since the process number (1) to the process number (5-c) are the same as the above-described calculation procedure of the spectrum phase in the phase spectrum design unit 22, the description thereof will be omitted.

When the evaluation value indicating the similarity degree between the spectrogram SG$_{0,k}$($\omega$,t) and the target spectrogram TargetSG$_0$($\omega$,t) does not satisfy the predetermined end condition, the waveform function modification unit 27 of the intensity spectrum design unit 23 changes the temporal intensity waveform function b$_0$(t) to the arbitrary temporal intensity waveform function b$_{0,k}$(t) while constraining the temporal phase waveform function $\phi_0$(t) included in the second waveform function by the initial value (process number (5-e)). The second waveform function after changing the temporal intensity waveform function is transformed again into a spectrogram by the time-frequency transform such as STFT.

Subsequently, the process numbers (5-a) to (5-c) are repeatedly performed. In this way, the second waveform function is modified so as to bring the spectrogram SG$_{0,k}$($\omega$,t) gradually close to the target spectrogram TargetSG$_0$($\omega$,t) (waveform function modification step).

Thereafter, the inverse Fourier transform unit 28 of the intensity spectrum design unit 23 performs the inverse Fourier transform on the second waveform function after the modification (arrow A4 in the drawing) to generate a third waveform function (in) in the frequency domain (inverse Fourier transform step, process number (6)).

$$\sqrt{B_{0,k}(\omega)}\exp\{i\Phi_{0,k}(\omega)\} \tag{m}$$

Next, in a process number (7-b), a filter processing unit of the intensity spectrum design unit 23 performs filter processing based on the intensity spectrum of the input light on the intensity spectrum function B$_{0,k}$($\omega$) included in the third waveform function (in) (filter processing step). Specifically, a portion exceeding a cutoff intensity for each wavelength, which is determined on the basis of the intensity spectrum of the input light, is cut from the intensity spectrum obtained by multiplying the intensity spectrum function B$_{0,k}$($\omega$) by a coefficient $\alpha$. This is because the intensity spectrum function $\alpha$B$_{0,k}$($\omega$) is required to be prevented from exceeding the spectrum intensity of the input light in all wavelength regions.

In one example, the cutoff intensity for each wavelength is set to be matched with the intensity spectrum of the input light (initial intensity spectrum function A$_0$($\omega$) in the present embodiment). In this case, as shown in the following Formula (n), at a frequency where the intensity spectrum function $\alpha$B$_{0,k}$($\omega$) is larger than the intensity spectrum function A$_0$($\omega$), a value of the intensity spectrum function A$_0$($\omega$) is taken as the value of the intensity spectrum function A$_{TWC\text{-}TFD}$($\omega$). Further, at a frequency where the intensity spectrum function $\alpha$B$_{0,k}$($\omega$) is equal to or smaller than the intensity spectrum function A$_0$($\omega$), a value of the intensity spectrum function $\alpha$B$_{0,k}$($\omega$) is taken as the value of the intensity spectrum function A$_{TWC\text{-}TFD}$($\omega$) (process number (7-b) in the drawing).

$$A_{TWC\text{-}TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \tag{n}$$

The intensity spectrum function A$_{TWC\text{-}TFD}$($\omega$) is provided to the modulation pattern generation unit 24 as a desired spectrum intensity to be finally obtained.

The modulation pattern generation unit 24 calculates a phase modulation pattern (for example, a computer-generated hologram) to give the spectrum phase indicated by the phase spectrum function $\Phi_{TWC\text{-}TFD}$($\omega$) calculated in the phase spectrum design unit 22 and the spectrum intensity indicated by the intensity spectrum function A$_{TWC\text{-}TFD}$($\omega$) calculated in the intensity spectrum design unit 23 to the output light (data generation step).

Figure 20:
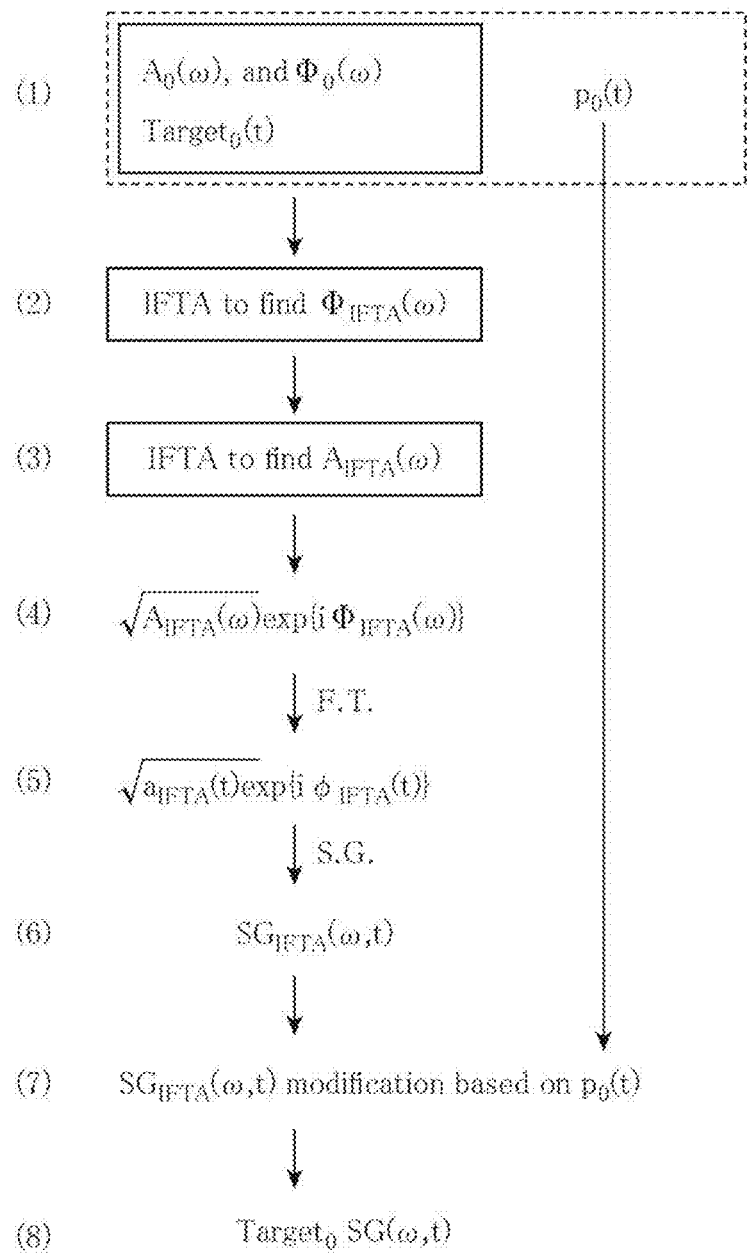
FIG. 20 is a diagram illustrating an example of a generation procedure of a target spectrogram in a target generation unit.

Here, FIG. 20 is a diagram illustrating an example of a generation procedure of the target spectrogram TargetSG$_0$($\omega$,t) in the target generation unit 29. Since the target spectrogram TargetSG$_0$($\omega$,t) indicates a target temporal waveform (temporal intensity waveform and frequency component (wavelength band component) constituting it), the creation of the target spectrogram is a very important process for controlling the frequency component (wavelength band component).

As illustrated in FIG. 20, the target generation unit 29 first inputs the spectrum waveform (the initial intensity spectrum function $A_0(\omega)$ and the initial phase spectrum function $\Phi_0(\omega)$) and the desired temporal intensity waveform function $Target_0(t)$. Further, a temporal function $p_0(t)$ including desired frequency (wavelength) band information is input (process number (1)).

Next, the target generation unit 29 uses, for example, the iterative Fourier transform method illustrated in FIG. 17 to calculate a phase spectrum function $\Phi_{IFTA}(\omega)$ for realizing the temporal intensity waveform function $Target_0(t)$ (process number (2)).

Figure 21:
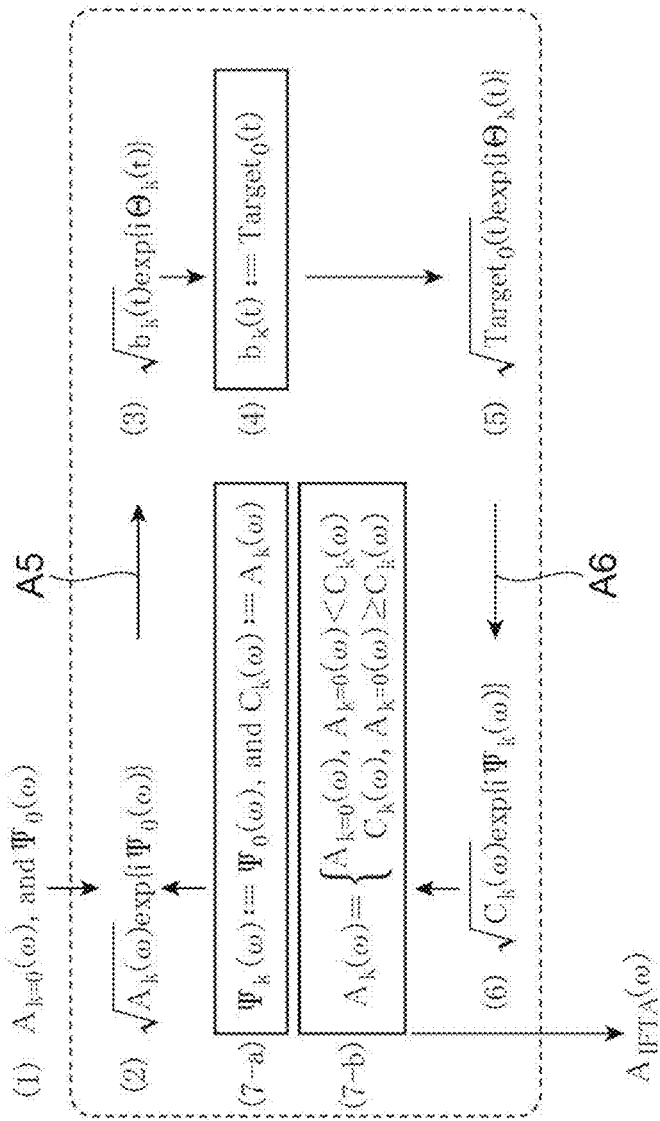
FIG. 21 is a diagram illustrating an example of a procedure for calculating an intensity spectrum function.

Next, the target generation unit 29 calculates an intensity spectrum function $A_{IFTA}(\omega)$ for realizing the temporal intensity waveform function $Target_0(t)$, by the iterative Fourier transform method using the above obtained phase spectrum function $\Phi_{IFTA}(\omega)$ (process number (3)). Here, FIG. 21 is a diagram illustrating an example of a calculation procedure of the intensity spectrum function $A_{IFTA}(\omega)$.

First, the initial intensity spectrum function $A_{k=0}(\omega)$ and the phase spectrum function $\Psi_0(\omega)$ are prepared (process number (1) in the drawing). Next, a waveform function (o) in the frequency domain including the intensity spectrum function $A_k(\omega)$ and the phase spectrum function $\Psi_0(\omega)$ is prepared (process number (2) in the drawing).

$$\sqrt{A_k(\omega)}\exp\{i\Psi_0(\omega)\} \tag{o}$$

A subscript k represents after a k-th Fourier transform process. Before the first Fourier transform process, the initial intensity spectrum function $A_{k=0}(\omega)$ described above is used as the intensity spectrum function $A_k(\omega)$. i is an imaginary number.

Next, a Fourier transform from the frequency domain to the time domain is performed on the function (o) (arrow A5 in the drawing). As a result, a waveform function (p) in the frequency domain including a temporal intensity waveform function $b_k(t)$ is obtained (process number (3) in the drawing).

$$\sqrt{b_k(t)}\exp\{i\Theta_k(t)\} \tag{p}$$

Next, the temporal intensity waveform function $b_k(t)$ included in the function (p) is replaced by the temporal intensity waveform function $Target_0(t)$ based on the desired waveform (process numbers (4) and (5) in the drawing).

$$b_k(t) := Target_0(t) \tag{q}$$

$$\sqrt{Target_0(t)}\exp\{i\Theta_k(t)\} \tag{r}$$

Next, an inverse Fourier transform from the time domain to the frequency domain is performed on the function (r) (arrow A6 in the drawing). As a result, a waveform function (s) in the frequency domain including an intensity spectrum function $C_k(W)$ and a phase spectrum function $\Psi_k(\omega)$ is obtained (process number (6) in the drawing).

$$\sqrt{C_n(\omega)}\exp\{i\Psi_k(\omega)\} \tag{s}$$

Next, to constrain the phase spectrum function $\Psi_k(W)$ included in the function (s), it is replaced by the initial phase spectrum function $\Psi_0(w)$ (process number (7-a) in the drawing).

$$\Psi_k(\omega) := \Psi_0(\omega) \tag{t}$$

Further, filter processing based on the intensity spectrum of the input light is performed on the intensity spectrum function $C_k(\omega)$ in the frequency domain after the inverse Fourier transform. Specifically, a portion exceeding a cutoff intensity for each wavelength, which is determined on the basis of the intensity spectrum of the input light, is cut from the intensity spectrum represented by the intensity spectrum function $C_k(\omega)$.

In one example, the cutoff intensity for each wavelength is set to be matched with the intensity spectrum (for example, the initial intensity spectrum function $A_{k=0}(\omega)$) of the input light. In this case, as shown in the following Formula (u), at a frequency where the intensity spectrum function $C_k(\omega)$ is larger than the intensity spectrum function $A_{k=0}(\omega)$, a value of the intensity spectrum function $A_{k=0}(\omega)$ is taken as the value of the intensity spectrum function $A_k(\omega)$. Further, at a frequency where the intensity spectrum function $C_k(\omega)$ is equal to or smaller than the intensity spectrum function $A_{k=0}(\omega)$, a value of the intensity spectrum function $C_k(\omega)$ is taken as the value of the intensity spectrum function $A_k(\omega)$ (process number (7-b) in the drawing).

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \tag{u}$$

The intensity spectrum function $C_k(\omega)$ included in the function (s) is replaced by the intensity spectrum function $A_k(\omega)$ after the filter processing by the above Formula (u).

Subsequently, the above processes (2) to (7-b) are repeatedly performed, so that the intensity spectrum shape represented by the intensity spectrum function $A_k(\omega)$ in the waveform function can be brought close to the intensity spectrum shape corresponding to the desired temporal intensity waveform. Finally, an intensity spectrum function $A_{IFTA}(\omega)$ is obtained.

Referring again to FIG. 20. By calculating the phase spectrum function $\Phi_{IFTA}(\omega)$ and the intensity spectrum function $A_{IFTA}(\omega)$ in the process numbers (2) and (3) described above, a third waveform function (v) in the frequency domain including these functions is obtained (process number (4)).

$$\sqrt{A_{IFTA}(\omega)}\exp\{i\Phi_{IFTA}(\omega)\} \tag{v}$$

The Fourier transform unit 29a of the target generation unit 29 performs the Fourier transform on the above waveform function (v). As a result, a fourth waveform function (w) in the time domain is obtained (process number (5)).

$$\sqrt{a_{IFTA}(t)}\exp\{i\varphi_{IFTA}(t)\} \tag{w}$$

The spectrogram modification unit 29b of the target generation unit 29 transforms the fourth waveform function (w) into a spectrogram $SG_{IFTA}(\omega,t)$ by the time-frequency transform (process number (6)). Then, in a process number (7), the spectrogram $SG_{IFTA}(\omega,t)$ is modified on the basis of the temporal function $p_0(t)$ including the desired frequency (wavelength) band information, so that the target spectrogram $TargetSG_0(\omega,t)$ is generated. For example, a characteristic pattern appearing in the spectrogram $SG_{IFTA}(\omega,t)$ constituted by two-dimensional data is partially cut out, and the frequency component of the corresponding portion is operated on the basis of the temporal function $p_0(t)$. A specific example thereof will be described in detail below.

Figure 22A:
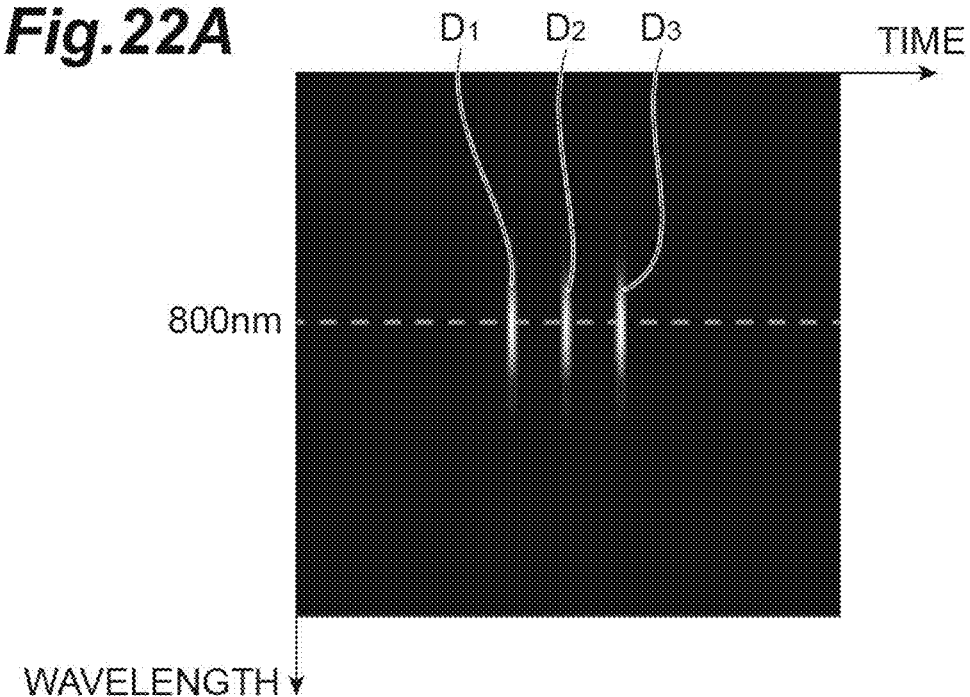
FIG. 22A and FIG. 22B are (A) a diagram showing a spectrogram $SG_{IFTA}(\omega,t)$, and (B) a diagram showing a target spectrogram $TargetSG_0(\omega,t)$ in which the spectrogram $SG_{IFTA}(\omega,t)$ is changed.

For example, the case where triple pulses having time intervals of 2 picoseconds are set as the desired temporal intensity waveform function $Target_0(t)$ is considered. At this time, the spectrogram $SG_{IFTA}(\omega,t)$ has a result as shown in FIG. 22A. In addition, in FIG. 22A, the horizontal axis indicates the time (unit: femtosecond), and the vertical axis indicates the wavelength (unit: nm). Further, a value of the spectrogram is indicated by light and dark in the drawing, and the value of the spectrogram is larger when the brightness is larger. In the spectrogram $SG_{IFTA}(\omega,t)$, the triple pulses appear as domains $D_1$, $D_2$, and $D_3$ divided on the time axis at intervals of 2 picoseconds. A center (peak) wavelength of the domains $D_1$, $D_2$, and $D_3$ is 800 nm.

Figure 22B:
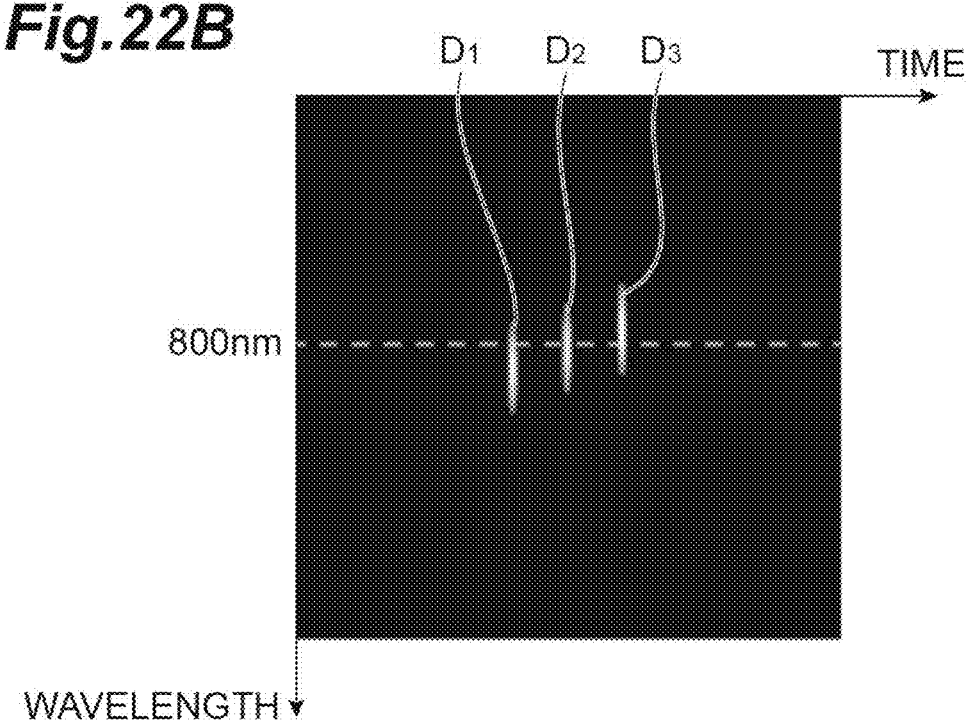

When it is desired to control only the temporal intensity waveform of the output light (it is simply desired to obtain triple pulses), it is not necessary to operate these domains $D_1$, $D_2$, and $D_3$. However, when it is desired to control the frequency (wavelength) band of each pulse, it is necessary to operate these domains $D_1$, $D_2$, and $D_3$. That is, as shown in FIG. 22B, moving the respective domains $D_1$, $D_2$, and $D_3$ independently in the direction along the wavelength axis (vertical axis) means changing the constituent frequency (wavelength band) of each pulse. The change of the constituent frequency (wavelength band) of each pulse is performed on the basis of the temporal function $p_0(t)$.

For example, when the temporal function $p_0(t)$ is described so that the peak wavelength of the domain $D_2$ is fixed at 800 nm and the peak wavelengths of the domains $D_1$ and $D_3$ are moved in parallel by −2 nm and +2 nm, respectively, the spectrogram $SG_{IFTA}(\omega,t)$ changes to the target spectrogram $TargetSG_0(\omega,t)$ shown in FIG. 22B. For example, by performing such processing on the spectrogram, it is possible to create a target spectrogram in which the constituent frequency (wavelength band) of each pulse is arbitrarily controlled without changing the shape of the temporal intensity waveform.

Effects obtained by the dispersion measurement apparatus 1 and the dispersion measurement method of the present embodiment described above will be described.

In the dispersion measurement apparatus 1 and the dispersion measurement method of the present embodiment, in the pulse forming unit 3 (pulse forming step S11), the light pulse train Pb including the plurality of light pulses $Pb_1$ to $Pb_3$ having time differences and center wavelengths different from each other is generated from the light pulse Pa output from the pulsed laser light source 2. Further, the light pulse train Pb is branched after passing through the measurement object B. The light pulses $Pb_1$ to $Pb_3$ of the one light pulse train Pb after the branching are spatially separated from each other by being dispersed, individually imaged, and converted into imaging data. As described above, by spectrally dispersing the light pulse train Pb and performing imaging for each of the light pulses $Pb_1$ to $Pb_3$, it is possible to perform imaging at a higher speed than the frame rate of the image sensor 72.

Further, the other light pulse train Pb after the branching is converted into the correlation light Pc including the cross-correlation or the autocorrelation, and then the temporal waveform of the correlation light Pc is detected. For example, when the correlation light Pc including the cross-correlation or the autocorrelation of the light pulse train Pb is generated using the nonlinear optical crystal or the like, various feature values (for example, peak intensities $PE_1$ to $PE_3$, full widths at half maximum $W_1$ to $W_3$, peak time intervals $G_{1,2}$, $G_{2,3}$, and the like) in the temporal waveform of the correlation light Pc have significant correlation with the wavelength dispersion amount of the measurement object B. Therefore, the wavelength dispersion amount in the measurement object B can be accurately estimated based on the feature value of the detected temporal waveform.

Further, when the temporal waveform is detected, the temporal waveform of the one or plurality of partial regions Pbc in the cross section intersecting with the traveling direction of the other light pulse train Pb after the branching is detected. In this case, the temporal waveform of the correlation light Pc including the high-speed light pulses $Pc_1$ to $Pc_3$ can be preferably detected by, for example, providing the photodetector 91 (photodiode or the like) for each partial region Pbc. Further, the spatial position of the partial region Pbc can be changed, and thus, the magnitude of the local wavelength dispersion in the desired position of the measurement object B can be accurately known.

Figure 23:
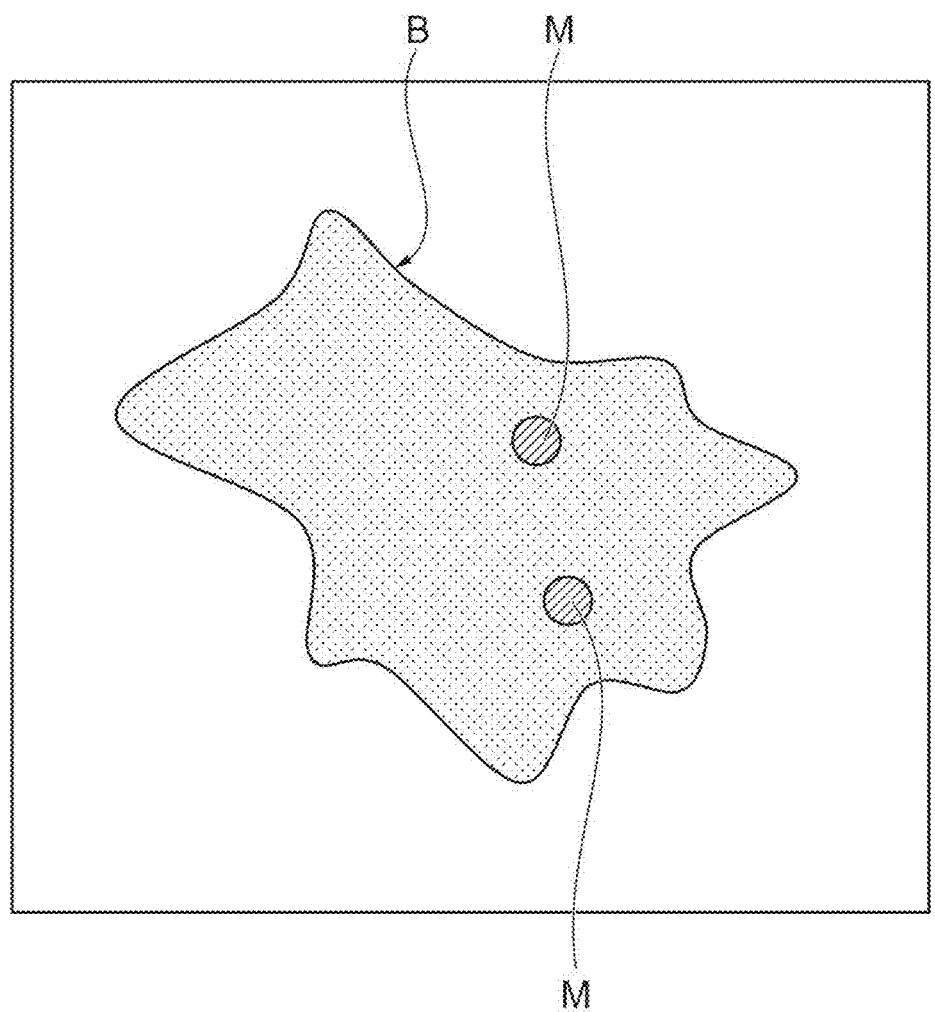
FIG. 23 is a diagram illustrating imaging data related to a measurement object obtained by an image sensor and a mark indicating a portion of the measurement object corresponding to a partial region in an overlapping manner.

In this way, according to the dispersion measurement apparatus 1 and the dispersion measurement method of the present embodiment, the magnitude of the wavelength dispersion in the measurement object B can be known simultaneously with high-speed imaging of the measurement object B. FIG. 23 is a diagram illustrating imaging data related to the measurement object B obtained by the image sensor 72 and marks M indicating portions of the measurement object B corresponding to the partial regions Pbc in an overlapping manner. As illustrated in the diagram, the imaging data related to the measurement object B and the mark M may be displayed on a display or the like in an overlapping manner. In this case, the wavelength dispersion amount (or a value calculated from the wavelength dispersion amount such as a refractive index, a reflectance, an absorptance, or a thickness) of the portion of the measurement object B may be represented by the color of the mark M or the like.

In addition, according to the present embodiment, it is not necessary to measure the emission spectrum, and thus, the optical system can be simplified, and the wavelength dispersion of the measurement object B can be measured by a simple configuration.

As in the present embodiment, the spatial filter unit 8 may have the spatial filter 84 disposed on the optical path between the beam splitter 5 and the correlation optical system 4. Further, as in the present embodiment, the dispersion measurement method may include the spatial filter step S16 between the optical branching step S13 and the correlation light generation step S17. For example by the above configuration, the light of the one or plurality of the partial regions Pbc in the light pulse train Pb output from the beam splitter 5 can be extracted, and the temporal waveform thereof can be detected.

In the above case, the spatial filter 84 may include the pinhole 84a configured to pass only the light of the partial region Pbc. Further, in the spatial filter step S16, the pinhole 84a configured to pass only the light of the partial region Pbc may be used. Thus, the light in the partial region Pbc in the cross section intersecting with the traveling direction of the other light pulse train Pb after the branching can be extracted by a simple configuration.

As in the present embodiment, the operation unit 6 may calculate at least one value of a refractive index, a reflectance, an absorptance, and a thickness of a part of the measurement object B based on the estimated wavelength dispersion amount. Further, as in the present embodiment, in the operation step S19, at least one value of a refractive index, a reflectance, an absorptance, and a thickness of a part of the measurement object B may be calculated based on the estimated wavelength dispersion amount. In this case, an optical property, an outer shape, or both of the measurement object B can be measured in a short time.

As in the present embodiment, the operation unit 6 (in the operation step S19) may determine the wavelength dispersion amount of the light pulse Pa based on the peak time intervals $G_{1,2}$, $G_{2,3}$ of the light pulse train Pb. As shown in the examples described below, the present inventors have found that, in various feature values in the temporal waveform, particularly the peak time intervals $G_{1,2}$, $G_{2,3}$ have a significant correlation with the wavelength dispersion amount of the measurement object B. Therefore, by estimating the wavelength dispersion amount of the light pulse Pa based on the peak time intervals $G_{1,2}$, $G_{2,3}$ of the light pulse train Pb, the wavelength dispersion amount of the measurement object B can be estimated more accurately.

As illustrated in FIG. 2, the pulse forming unit 3 may include the diffraction grating 12 for spatially separating the plurality of wavelength components included in the light pulse Pa for each wavelength, the SLM 14 for shifting the phases of the plurality of wavelength components output from the diffraction grating 12 from each other, and the lens 15 for focusing the plurality of wavelength components output from the SLM 14. Similarly, in the pulse forming step S11, the plurality of wavelength components included in the light pulse Pa may be spatially separated for each wavelength, the phases of the plurality of wavelength components may be shifted from each other using the SLM 14, and then the plurality of wavelength components may be focused. In this case, it is possible to easily form the light pulse train Pb including the plurality of light pulses $Pb_1$ to $Pb_3$ having time differences and center wavelengths different from each other.

As in the present embodiment, the correlation optical system 4 may include at least one of the nonlinear optical crystal and the fluorescent material. Similarly, in the correlation light generation step S17, the correlation light Pc may be generated using at least one of the nonlinear optical crystal and the fluorescent material. In this case, the correlation light Pc including the cross-correlation or the auto-correlation of the light pulse train Pb can be easily generated.

As in the present embodiment, the operation unit 6 (in the operation step S19) may compare the feature value of the temporal waveform of the correlation light Pc calculated in advance on the assumption that the wavelength dispersion of the measurement object B is zero and the feature value of the temporal waveform of the correlation light Pc detected by the photodetection unit 9 to obtain the wavelength dispersion amount of the light pulse Pa. In this case, the wavelength dispersion amount of the measurement object B can be estimated more accurately.

Example

As an example of the above embodiment, the present inventors performed simulations by numerical calculations. As the light pulse Pa, a single pulse having a bandwidth of 10 nm and a center wavelength of 1030 nm was assumed. For converting the light pulse Pa into the light pulse train Pb including the three light pulses $Pb_1$ to $Pb_3$ shown in FIG. 4A to FIG. 4C, the modulation pattern to be presented on the SLM 14 was calculated using the method described in the above embodiment. At this time, the peak time intervals $G_{1,2}$ and $G_{2,3}$ were set to 2000 fs, and the center wavelengths were set to 1025 nm, 1030 nm, and 1035 nm, respectively.

Figure 24A:
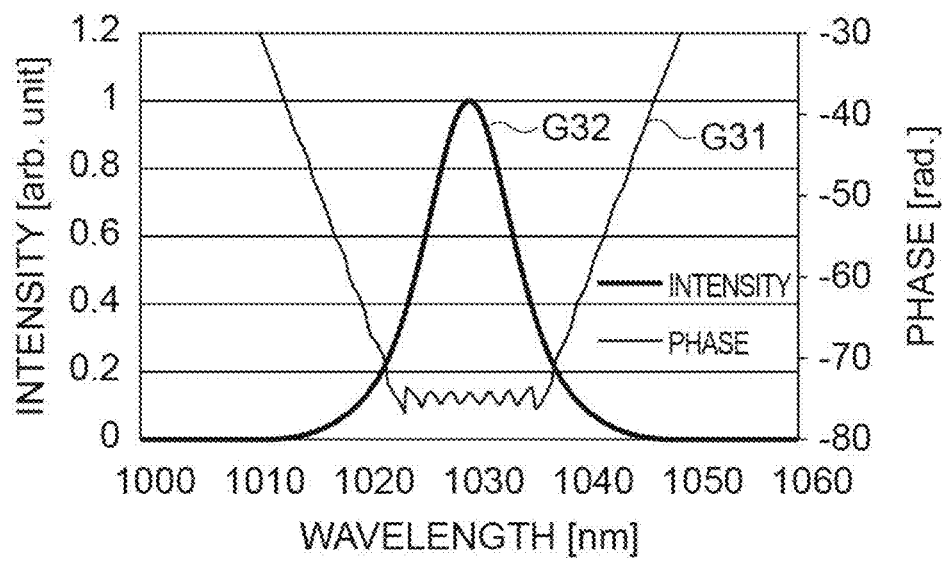
FIG. 24A and FIG. 24B are (A) a graph showing a calculated modulation pattern, and (B) a graph showing a temporal waveform of a light pulse train generated by a simulation.

FIG. 24A is a graph showing the calculated modulation pattern. In this diagram, the horizontal axis indicates the wavelength (unit: nm), the left vertical axis indicates the light intensity (arb. unit), and the right vertical axis indicates the phase (rad). Further, a graph G31 in the diagram shows the modulation pattern of the spectrum phase, and a graph G32 in the diagram shows the modulation pattern of the spectrum intensity.

Figure 24B:
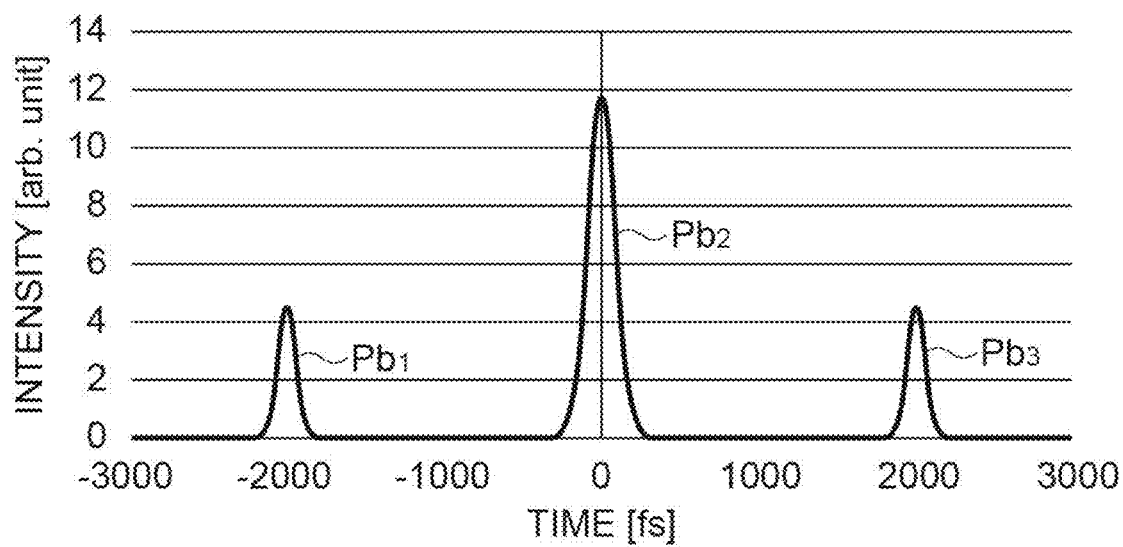
Figure 25:
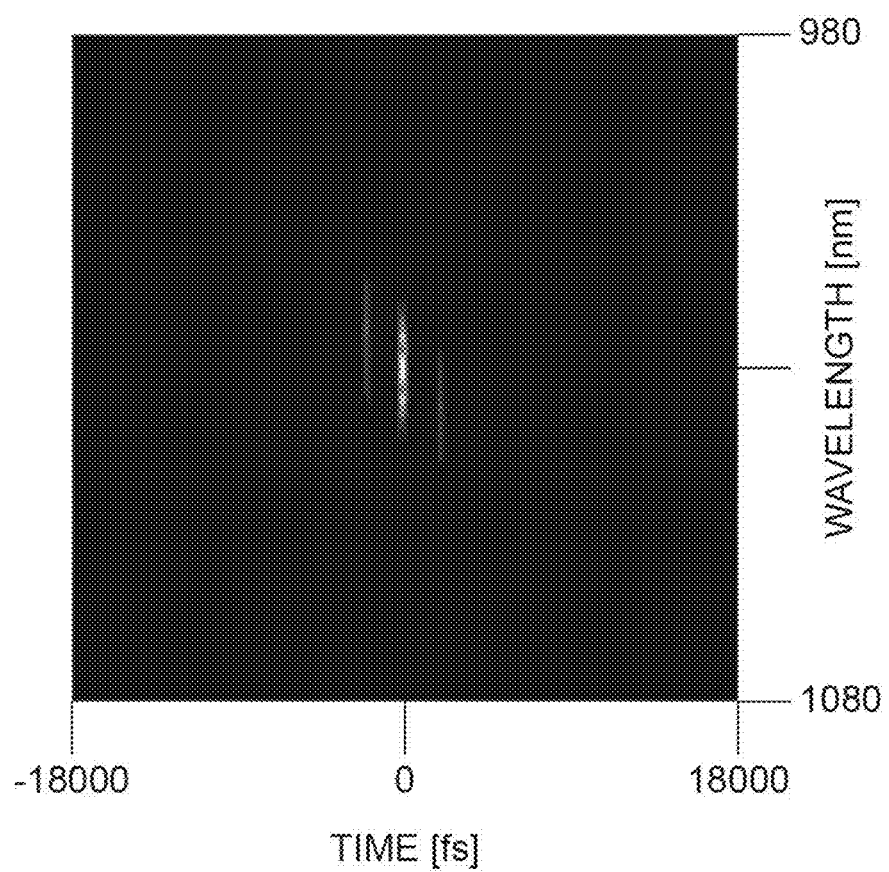
FIG. 25 is a spectrogram of the light pulse train generated by the simulation.

FIG. 24B is a graph showing the temporal waveform of the light pulse train Pb generated by the present simulation. FIG. 25 is a spectrogram of the light pulse train Pb generated by the present simulation. In FIG. 24B, the horizontal axis indicates the time (unit: fs), and the vertical axis indicates the light intensity (arb. unit). Further, in FIG. 25, the horizontal axis indicates the time, the vertical axis indicates the wavelength, and the light intensity is represented by light and shade of color. As shown in these diagrams, the light pulse train Pb including the three light pulses $Pb_1$ to $Pb_3$ having time differences and center wavelengths different from each other was obtained.

Further, in the present simulation, for comparison, for converting the light pulse Pa into the light pulse train Pd including the three light pulses $Pd_1$ to $Pd_3$ shown in FIG. 5A to FIG. 5C, the modulation pattern to be presented on the SLM 14 was calculated by using the method described in the above embodiment. The peak time intervals were set to be the same as those of the light pulses $Pb_1$ to $Pb_3$, and the center wavelength of each of the light pulses $Pd_1$ to $Pd_3$ was set to 1030 nm.

Figure 26A:
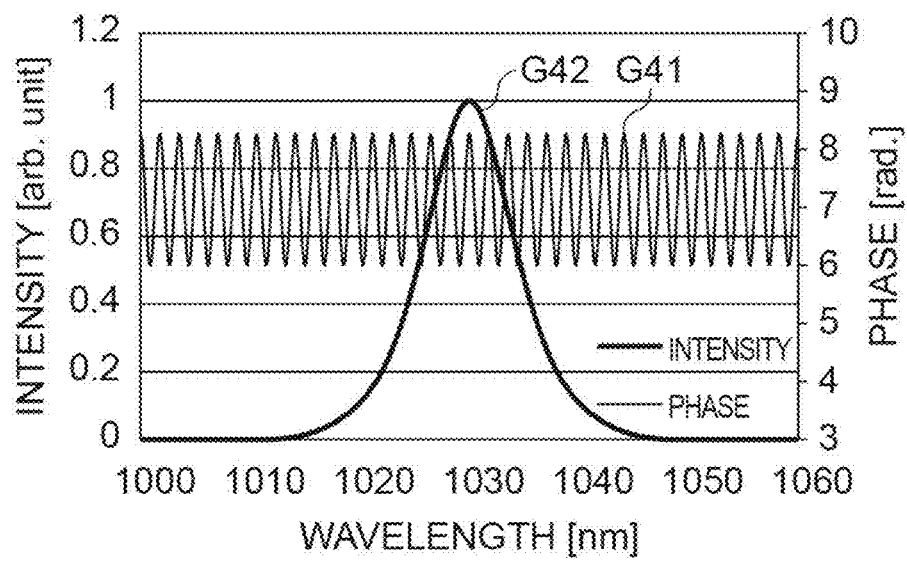
FIG. 26A and FIG. 26B are (A) a graph showing a calculated modulation pattern, and (B) a graph showing a temporal waveform of a light pulse train generated by a simulation.
Figure 26B:
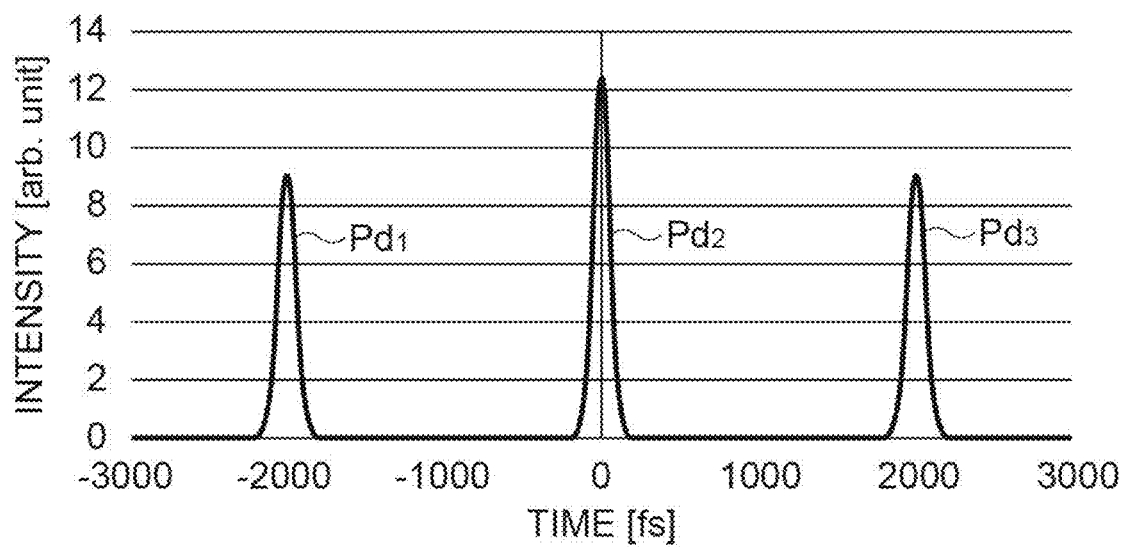
Figure 27:
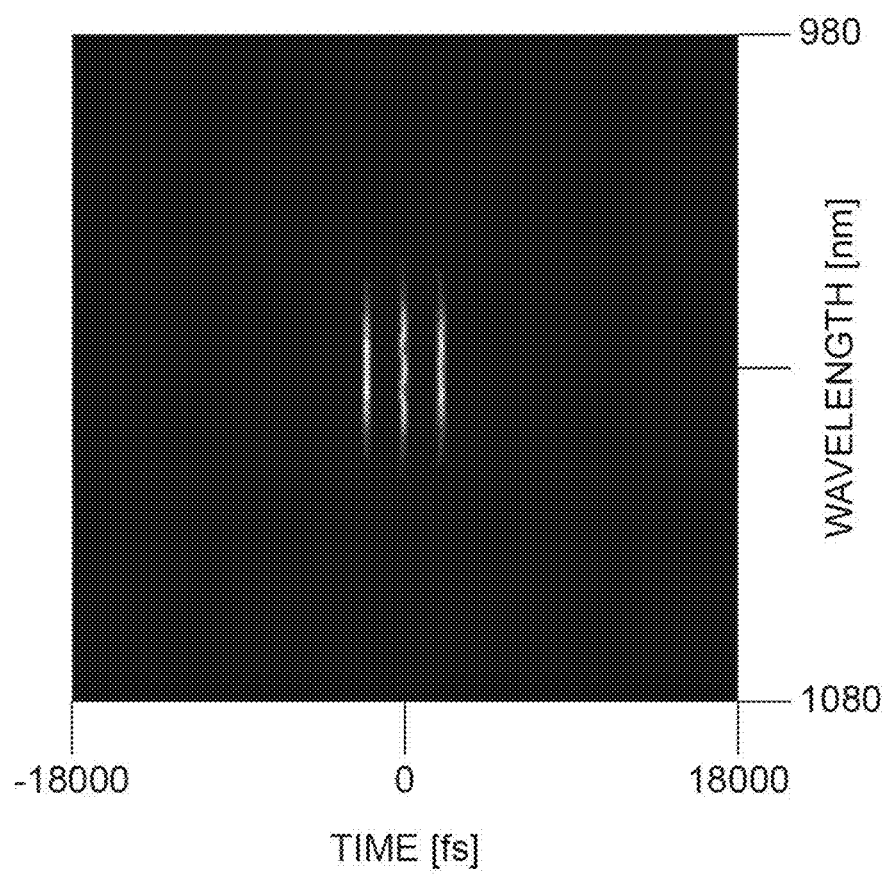
FIG. 27 is a spectrogram of the light pulse train generated by the simulation.

FIG. 26A is a graph showing the calculated modulation pattern. A graph G41 in the diagram shows the modulation pattern of the spectrum phase, and a graph G42 in the diagram shows the modulation pattern of the spectrum intensity. FIG. 26B is a graph showing the temporal waveform of the light pulse train Pd generated by the present simulation. FIG. 27 is a spectrogram of the light pulse train Pd generated by the present simulation. As shown in these diagrams, the light pulse train Pd including the three light pulses $Pd_1$ to $Pd_3$ having time differences and the same center wavelength was obtained.

[Change in Feature Value of Pulse Train Due to Second-Order Dispersion]

Figure 28A:
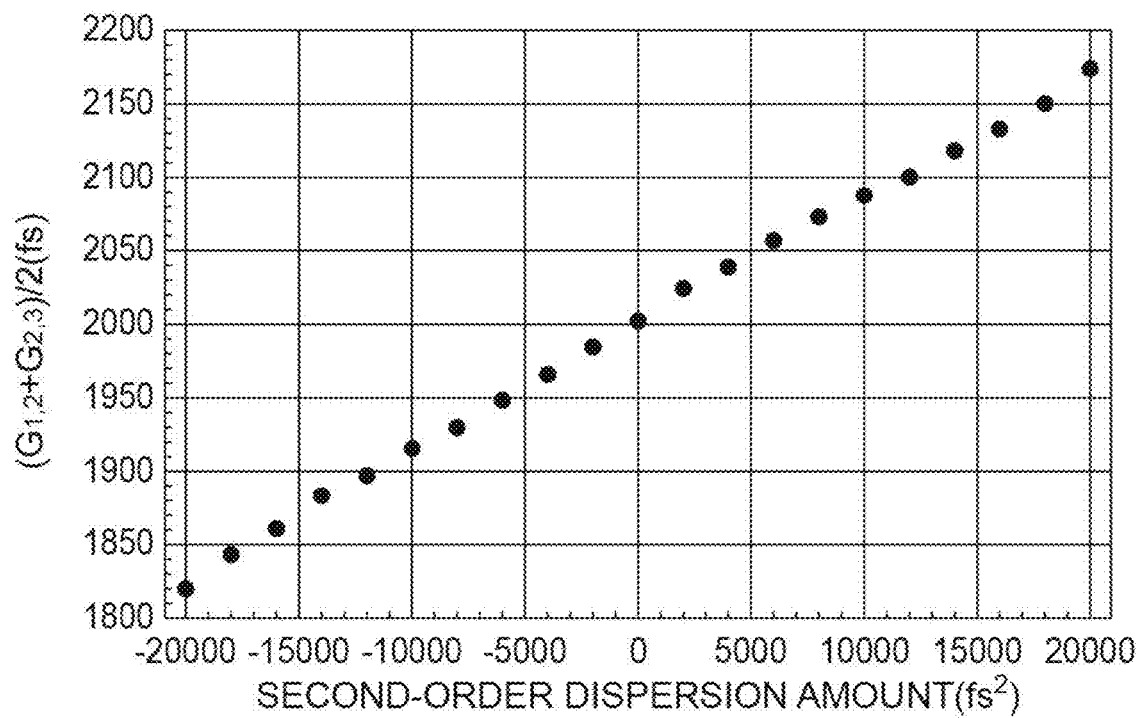
FIG. 28A and FIG. 28B are graphs plotting a relationship between a second-order dispersion amount of a light pulse and an average value of peak time intervals.
Figure 28B:
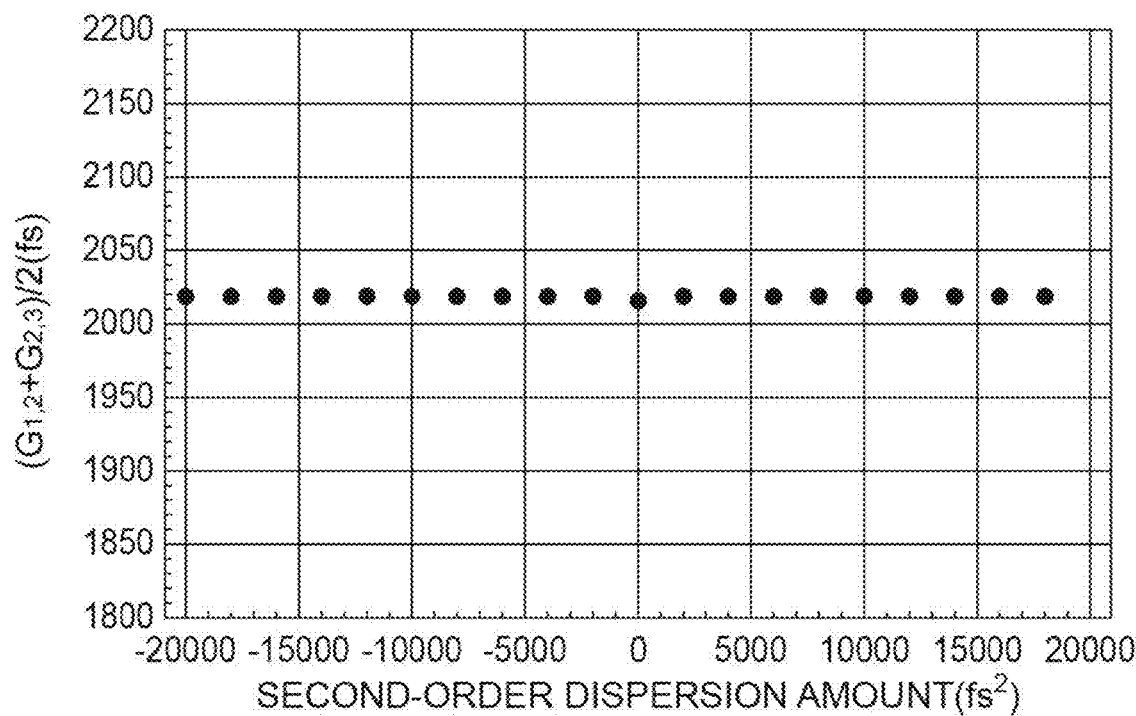

In order to examine the influence of the second-order dispersion of the measurement object B on the feature value of the pulse train, changes of the temporal waveforms of the light pulse trains Pb and Pd were examined by simulatively changing the second-order dispersion amount of the light pulse Pa. FIG. 28A and FIG. 28B are graphs plotting the relationship between the second-order dispersion amount of the light pulse Pa and the average value $(G_{1,2}+G_{2,3})/2$ of the peak time intervals $G_{1,2}$ and $G_{2,3}$. FIG. 28A shows the case of the light pulse train Pb in which the center wavelengths of the respective pulses are different, and FIG. 28B shows the case of the light pulse train Pd in which the center wavelengths of the respective pulses are equal. In these diagrams, the horizontal axis indicates the second-order dispersion amount of the light pulse Pa (unit: $fs^2$), and the vertical axis indicates the average value of the peak time intervals $G_{1,2}$, $G_{2,3}$ (unit: fs).

Referring to FIG. 28A, in the case of the light pulse train Pb in which the center wavelengths of the respective pulses are different, it can be seen that the average value of the peak time intervals $G_{1,2}$, $G_{2,3}$ monotonously (substantially linearly) increases or decreases with the increase or decrease of the second-order dispersion amount. When the data is examined in more detail, it is confirmed that the peak times of the left and right light pulses $Pb_1$ and $Pb_3$ tend to move symmetrically with respect to the peak time of the center light pulse $Pb_2$ according to the dispersion amount. In this example, an increase (or decrease) of 50 fs of the peak time intervals $G_{1,2}$, $G_{2,3}$ corresponds to an increase (or decrease) of the second-order dispersion amount of 5000 $fs^2$.

On the other hand, referring to FIG. 28B, in the case of the light pulse train Pd in which the center wavelengths of the respective pulses are equal, it can be seen that the average value of the peak time intervals $G_{1,2}$, $G_{2,3}$ is substantially constant regardless of the increase or decrease of the second-order dispersion amount. From this, it can be seen that the second-order dispersion amount of the measurement object B can be accurately and easily estimated based on the peak time intervals $G_{1,2}$, $G_{2,3}$ of the light pulse train Pb in which the center wavelengths of the respective pulses are different.

Figure 29:
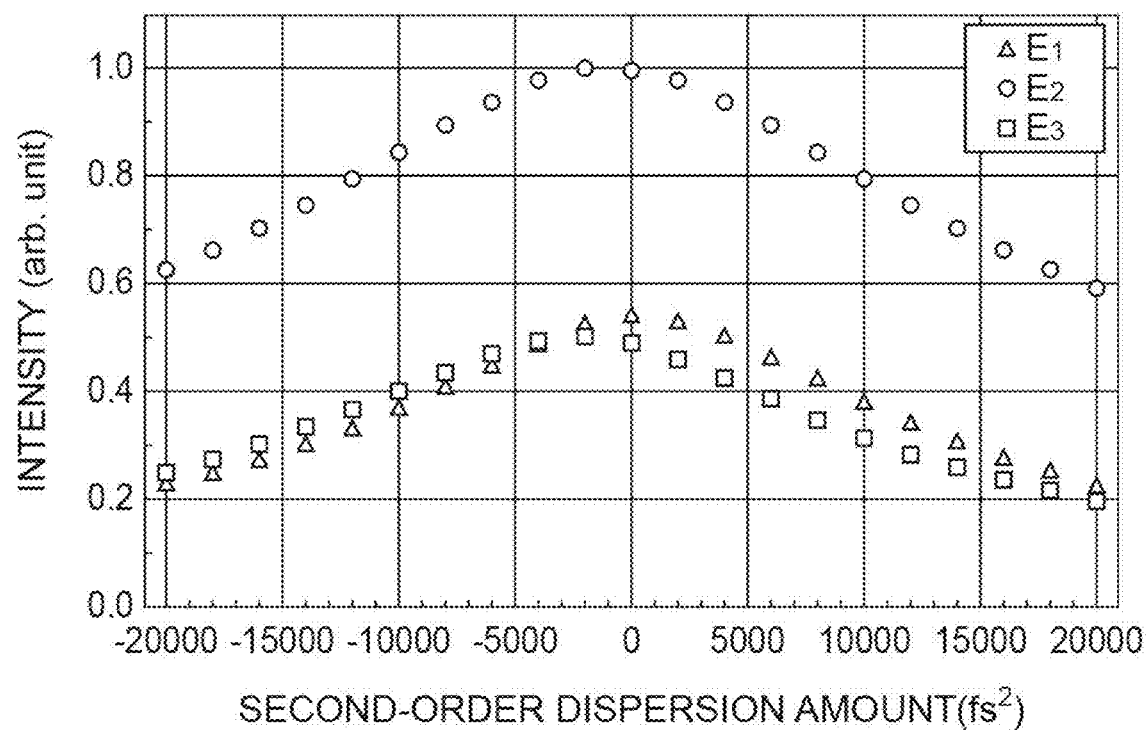
FIG. 29 is a graph plotting a relationship between the second-order dispersion amount of the light pulse and a peak intensity in the case of the light pulse train in which center wavelengths of respective pulses are different.

FIG. 29 is a graph plotting the relationship between the second-order dispersion amount of the light pulse Pa and the peak intensities $E_1$ to $E_3$, and shows the case of the light pulse train Pb in which the center wavelengths of the respective pulses are different. Triangular plots show the peak intensity $E_1$, circular plots show the peak intensity $E_2$, and square plots show the peak intensity $E_3$. In this diagram, the horizontal axis indicates the second-order dispersion amount of the light pulse Pa (unit: $fs^2$), and the vertical axis indicates the peak intensity (arb. unit).

Referring to FIG. 29, in the light pulse train Pb in which the center wavelengths of the respective pulses are different, it can be seen that the peak intensities $E_1$ to $E_3$ also increase or decrease as the second-order dispersion amount increases or decreases. From this, it can be seen that the second-order dispersion amount of the measurement object B can be accurately and easily estimated based on the peak intensities $E_1$ to $E_3$ of the light pulse train Pb in which the center wavelengths of the respective pulses are different.

Figure 30:
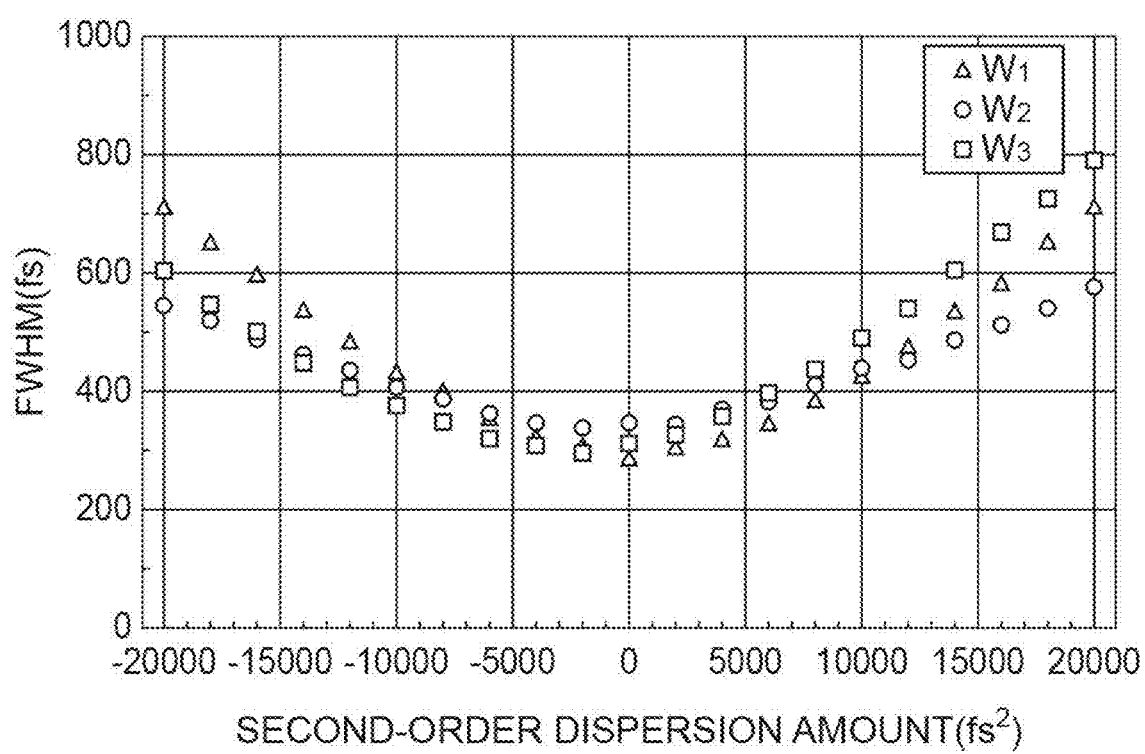
FIG. 30 is a graph plotting a relationship between the second-order dispersion amount of the light pulse and a full width at half maximum in the case of the light pulse train in which center wavelengths of respective pulses are different.

FIG. 30 is a graph plotting the relationship between the second-order dispersion amount of the light pulse Pa and the full widths at half maximum $W_1$ to $W_3$, and shows the case of the light pulse train Pb in which the center wavelengths of the respective pulses are different. Triangular plots show the full width at half maximum $W_1$, circular plots show the full width at half maximum $W_2$, and square plots show the full width at half maximum $W_3$. In this diagram, the horizontal axis indicates the second-order dispersion amount of the light pulse Pa (unit: $fs^2$), and the vertical axis indicates the full width at half maximum (unit: fs).

Referring to FIG. 30, in the light pulse train Pb in which the center wavelengths of the respective pulses are different, it can be seen that the full widths at half maximum $W_1$ to $W_3$ also increase or decrease as the second-order dispersion amount increases or decreases. From this, it can be seen that the second-order dispersion amount of the measurement object B can be accurately and easily estimated based on the full widths at half maximum $W_1$ to $W_3$ of the light pulse train Pb in which the center wavelengths of the respective pulses are different.

[Change in Feature Value of Pulse Train Due to Third-Order Dispersion]

Figure 31A:
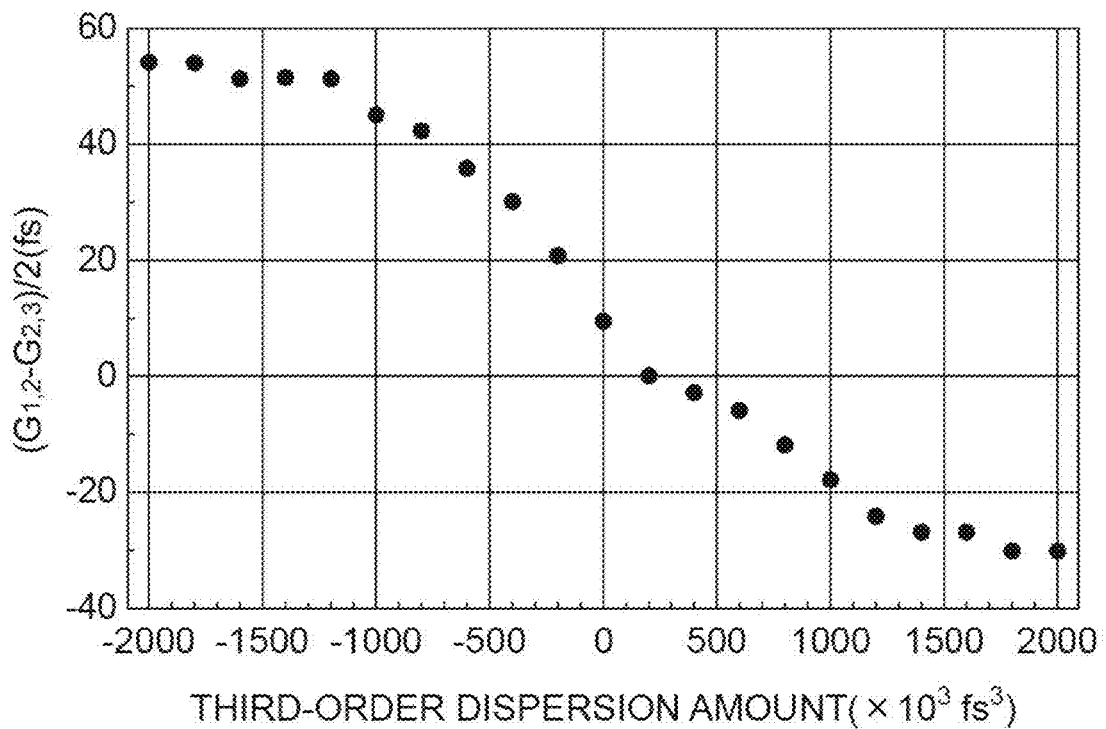
FIG. 31A and FIG. 31B are graphs plotting a relationship between a third-order dispersion amount of a light pulse Pa and a difference of peak time intervals.
Figure 31B:
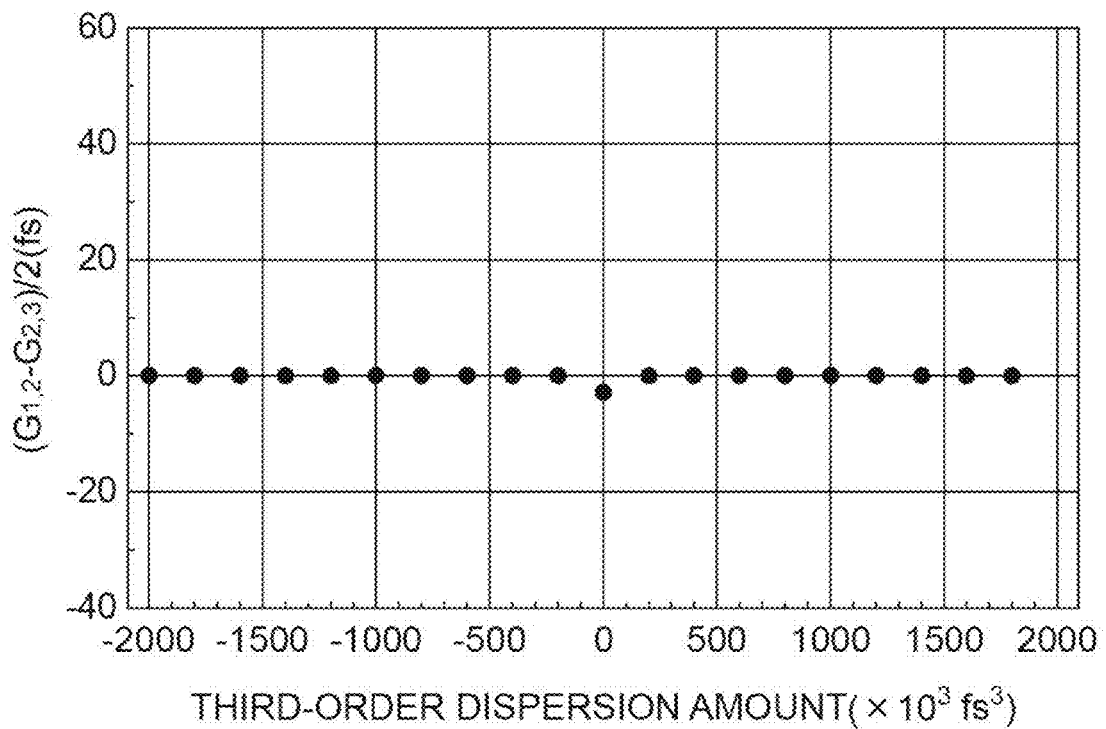

In order to examine the influence of the third-order dispersion of the measurement object B on the feature value of the pulse train, changes of the temporal waveforms of the light pulse trains Pb and Pd were examined by simulatively changing the third-order dispersion amount of the light pulse Pa. FIG. 31A and FIG. 31B are graphs plotting the relationship between the third-order dispersion amount of the light pulse Pa and the difference $(G_{1,2}-G_{2,3})/2$ of the peak time intervals $G_{1,2}$, $G_{2,3}$. FIG. 31A shows the case of the light pulse train Pb in which the center wavelengths of the respective pulses are different, and FIG. 31B shows the case of the light pulse train Pd in which the center wavelengths of the respective pulses are equal. In these diagrams, the horizontal axis indicates the third-order dispersion amount of the light pulse Pa (unit: $fs^3$), and the vertical axis indicates the difference between the peak time intervals $G_{1,2}$, $G_{2,3}$ (unit: fs).

Referring to FIG. 31A, in the case of the light pulse train Pb in which the center wavelengths of the respective pulses are different, it can be seen that the difference between the peak time intervals $G_{1,2}$, $G_{2,3}$ monotonously increases or decreases with the increase or decrease of the third-order dispersion amount. On the other hand, referring to FIG. 31B, in the case of the light pulse train Pd in which the center wavelengths of the respective pulses are equal, it can be seen that the difference between the peak time intervals $G_{1,2}$, $G_{2,3}$ is substantially constant regardless of the increase or decrease of the third-order dispersion amount. From this, it can be seen that the third-order dispersion amount of the measurement object B can be accurately and easily estimated based on the peak time intervals $G_{1,2}$, $G_{2,3}$ of the light pulse train Pb in which the center wavelengths of the respective pulses are different.

When the data is examined in more detail, in the case of the light pulse train Pb in which the center wavelengths of the respective pulses are different, it is confirmed that the peak times of the left and right light pulses $Pb_1$ and $Pb_3$ tend to move asymmetrically with respect to the peak time of the center light pulse $Pb_2$ according to the dispersion amount. Such a feature is different from the case of the second-order dispersion amount, and it is possible to distinguish the dispersion order based on the difference, that is, the tendency of the relative change of the peak time intervals $G_{1,2}$ and $G_{2,3}$.

Figure 32:
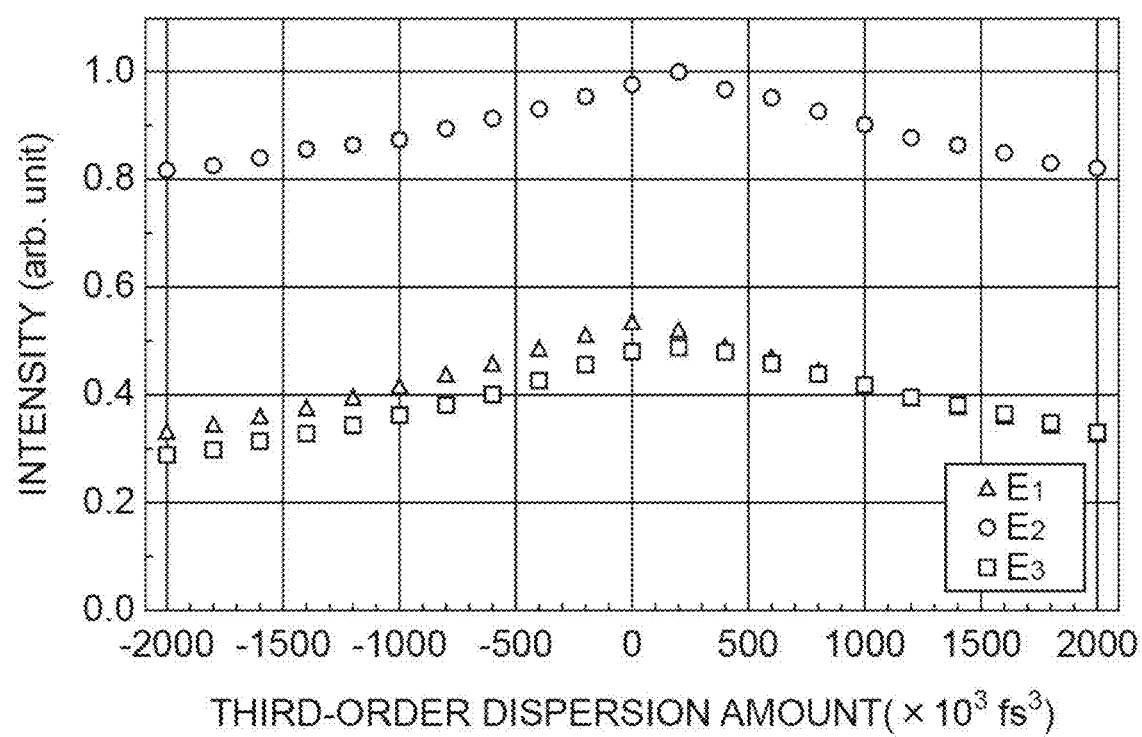
FIG. 32 is a graph plotting a relationship between the third-order dispersion amount of the light pulse and a peak intensity in the case of the light pulse train in which center wavelengths of respective pulses are different.

FIG. 32 is a graph plotting the relationship between the third-order dispersion amount of the light pulse Pa and the peak intensities $E_1$ to $E_3$, and shows the case of the light pulse train Pb in which the center wavelengths of the respective pulses are different. Triangular plots show the peak intensity $E_1$, circular plots show the peak intensity $E_2$, and square plots show the peak intensity $E_3$. In this diagram, the horizontal axis indicates the third-order dispersion amount of the light pulse Pa (unit: $fs^3$), and the vertical axis indicates the peak intensity (arb. unit).

Referring to FIG. 32, in the light pulse train Pb in which the center wavelengths of the respective pulses are different, it can be seen that the peak intensities $E_1$ to $E_3$ also increase or decrease as the third-order dispersion amount increases or decreases. From this, it can be seen that the third-order dispersion amount of the measurement object B can be accurately and easily estimated based on the peak intensities $E_1$ to $E_3$ of the light pulse train Pb in which the center wavelengths of the respective pulses are different.

Figure 33:
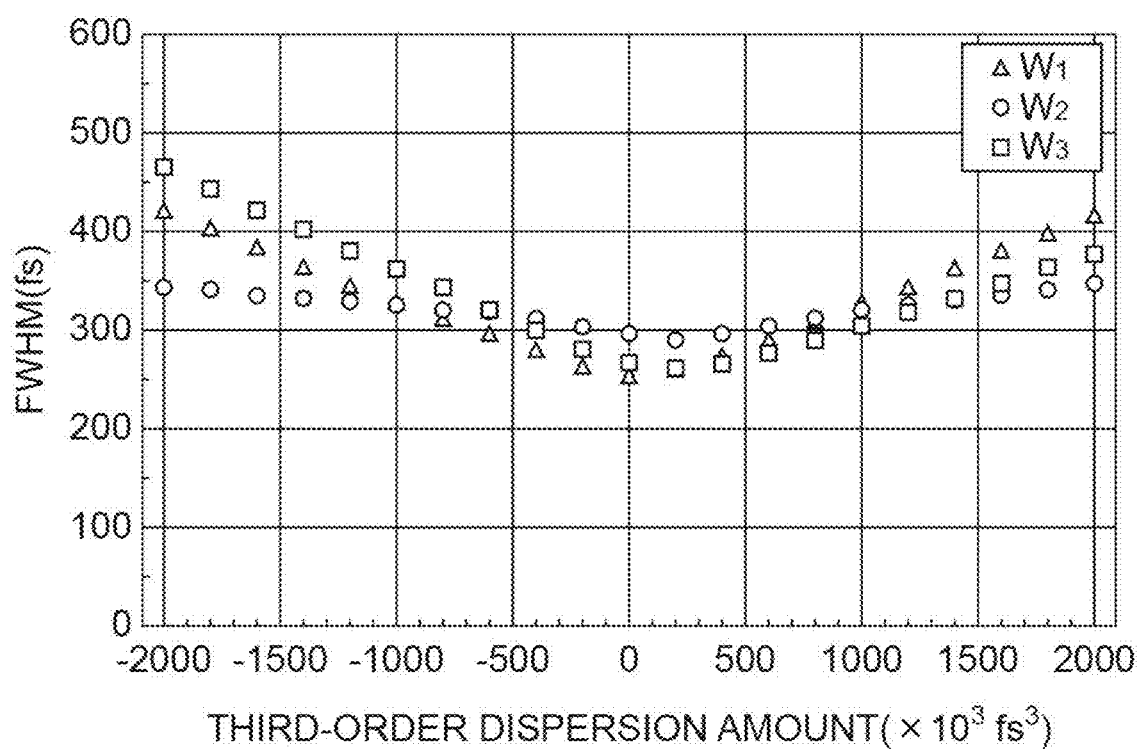
FIG. 33 is a graph plotting a relationship between the third-order dispersion amount of the light pulse and a full width at half maximum in the case of the light pulse train in which center wavelengths of respective pulses are different.

FIG. 33 is a graph plotting the relationship between the third-order dispersion amount of the light pulse Pa and the full widths at half maximum $W_1$ to $W_3$, and shows the case of the light pulse train Pb in which the center wavelengths of the respective pulses are different. Triangular plots show the full width at half maximum $W_1$, circular plots show the full width at half maximum $W_2$, and square plots show the full width at half maximum $W_3$. In this diagram, the horizontal axis indicates the third-order dispersion amount of the light pulse Pa (unit: $fs^3$), and the vertical axis indicates the full width at half maximum (unit: fs).

Referring to FIG. 33, in the light pulse train Pb in which the center wavelengths of the respective pulses are different, it can be seen that the full widths at half maximum $W_1$ to $W_3$ also increase or decrease as the third-order dispersion amount increases or decreases. From this, it can be seen that the third-order dispersion amount of the measurement object B can be accurately and easily estimated based on the full widths at half maximum $W_1$ to $W_3$ of the light pulse train Pb in which the center wavelengths of the respective pulses are different.

First Modification

Figure 34:
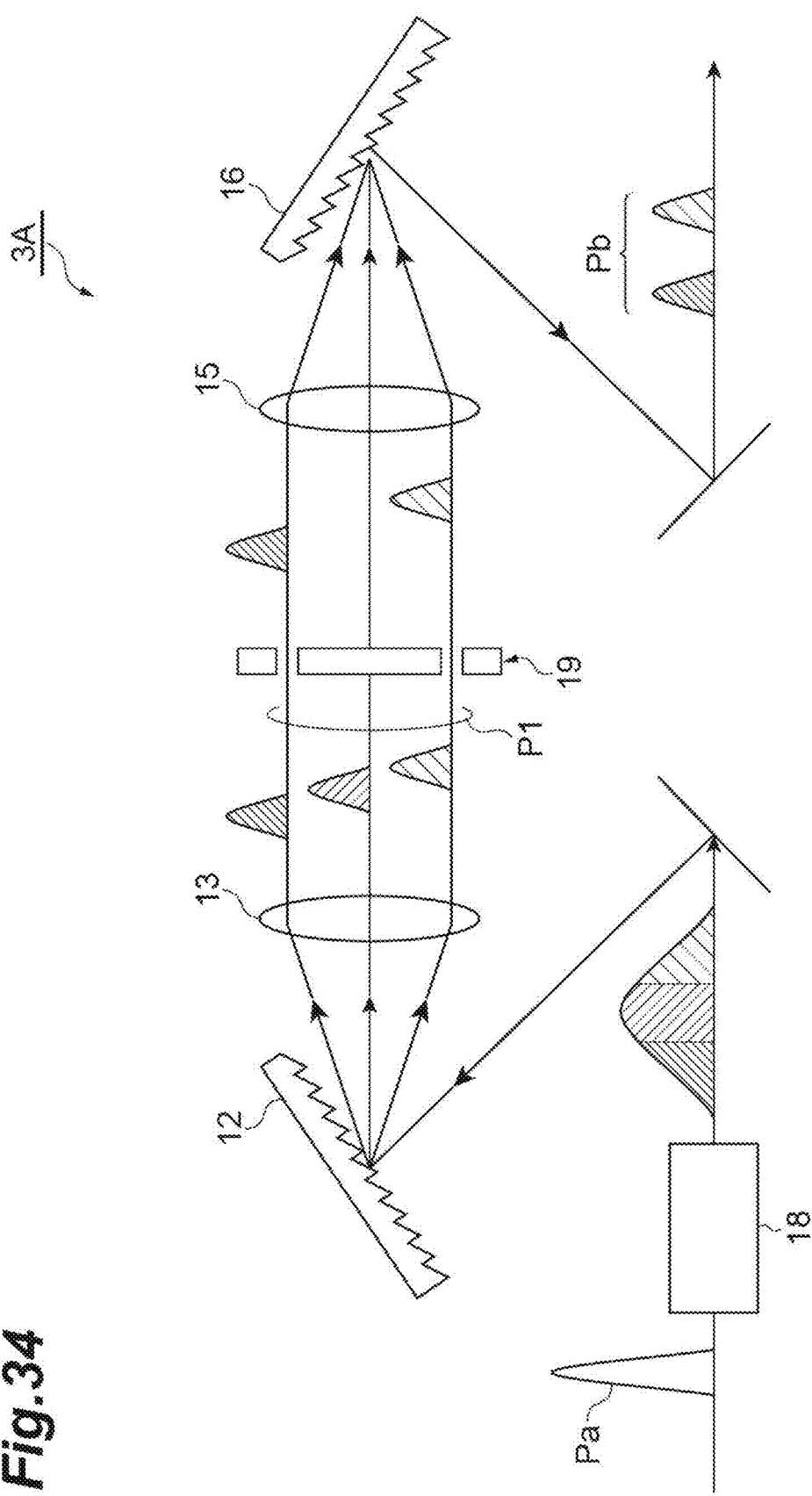
FIG. 34 is a diagram illustrating a configuration of the pulse forming unit as a first modification.

FIG. 34 is a diagram illustrating a configuration of a pulse forming unit 3A as a first modification of the above embodiment. The pulse forming unit 3A includes a pulse stretcher 18, and further, a filter 19 instead of the SLM 14 (see FIG. 2). The pulse stretcher 18 is provided on an optical path between the pulsed laser light source 2 and the diffraction grating 12, and expands the pulse width of the light pulse Pa. Examples of the pulse stretcher 18 include a glass block, a diffraction grating pair, and a prism pair.

The filter 19 is a light intensity filter, and is optically coupled to the diffraction grating 12 through the lens 13. The light P1 spectrally dispersed by the diffraction grating 12 is focused by the lens 13 for each wavelength component, and reaches the filter 19. The filter 19 has an optical aperture corresponding to each wavelength component (or a filter whose absorptance or reflectance is different from that of the surroundings), and selectively passes a plurality of wavelength components from the wavelength band constituting the light pulse Pa. In addition, the propagation timings of the plurality of wavelength components are shifted from each other by the pulse stretcher 18. Each wavelength component passing through the filter 19 is focused at one point on the diffraction grating 16 by the lens 15. The plurality of wavelength components passing through the filter 19 are focused and combined by the lens 15 and the diffraction grating 16, and become the multi pulse with band control (light pulse train Pb).

The dispersion measurement apparatus 1 of the above embodiment may include the pulse forming unit 3A of the present modification instead of the pulse forming unit 3. Even in this case, the same effects as those of the above embodiment can be preferably achieved.

The dispersion measurement apparatus and the dispersion measurement method are not limited to the embodiments and configuration examples described above, and various modifications are possible.

In the above embodiment, as illustrated in FIG. 2, the method of forming the light pulse train Pb using the diffraction grating 12 and the SLM 14 is exemplified, and in the first modification, the method of forming the light pulse train Pb using the pulse stretcher 18 and the filter 19 is exemplified, and further, the method of forming the light pulse train Pb in the pulse forming unit 3 and the pulse forming step S11 is not limited thereto. For example, a variable mirror may be used instead of the SLM 14. Further, instead of the SLM 14, a liquid crystal display, an acousto-optical modulator, or the like that can electronically control the phase may be used.

Further, in the above embodiment, the method of generating the correlation light Pc using the nonlinear optical crystal or the fluorescent material is exemplified, but the method of generating the correlation light Pc in the correlation optical system 4 and the correlation light generation step S17 is not limited thereto.

Further, as for the design method of the spectrum waveform in the phase spectrum design unit 22 and the intensity spectrum design unit 23 of the modulation pattern calculation apparatus 20 illustrated in FIG. 15 and the generation method of the multi pulse with band control according to the above, in the above embodiment, the configuration of calculating the spectrum waveform using the Fourier transform unit 25, the function replacement unit 26, the waveform function modification unit 27, the inverse Fourier transform unit 28, and the target generation unit 29 illustrated in FIG. 16 is exemplified.

According to the above configuration, the temporal waveform of the multi pulse constituting the light pulse train can be approximated to the desired shape, and the band component of each light pulse included in the light pulse train can be controlled with high accuracy. However, the generation method of the multi pulse with band control is not limited thereto, and for example, as described below, the spectrum waveform (spectrum modulation pattern) for generating the multi pulse may be obtained by a simpler method without using a complicated optimization algorithm.

Specifically, as the generation method of the multi pulse with band control, a method of combining linear phase modulation patterns (linear phase patterns) based on information of the number of light pulses in the multi pulse to be generated, a band component constituting each light pulse, and an interval of the light pulses may be used. FIG. 35A, FIG. 35B and FIG. 36A, FIG. 36B described below illustrate conceptual diagrams for describing such a generation method of the multi pulse.

Figure 35A:
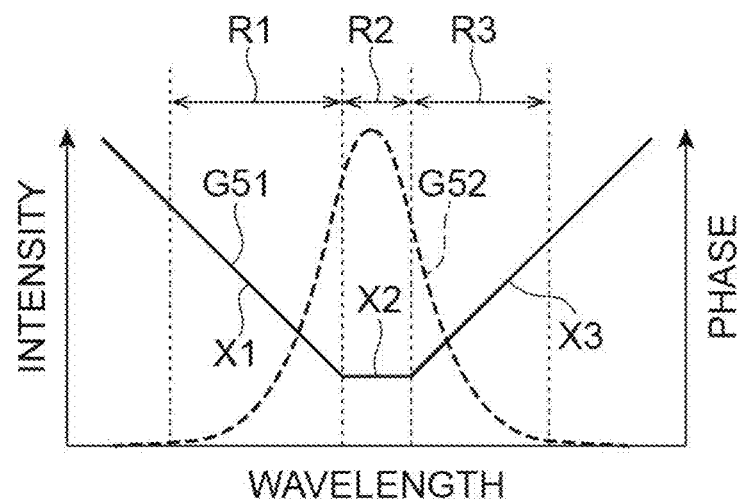
FIG. 35A and FIG. 35B are (A) a graph showing an example of a spectrum waveform for generating a multi pulse with band control, and (B) a graph showing a temporal waveform of a light pulse train corresponding to the spectrum waveform shown in FIG. 35A.

FIG. 35A is a graph showing an example of the spectrum waveform for generating the multi pulse with band control. In this graph, the horizontal axis indicates the wavelength, the left vertical axis indicates the light intensity, and the right vertical axis indicates the phase. Further, a graph G51 in the diagram shows the spectrum phase, and a graph G52 shows the spectrum intensity. Further, regions R1, R2, R3 in the diagram indicate wavelength regions set for the spectrum intensity waveform of the graph G52. Further, in the spectrum phase pattern of the graph G51, a phase pattern X1 indicates a phase pattern in the wavelength region R1, a phase pattern X2 indicates a phase pattern in the wavelength region R2, and a phase pattern X3 indicates a phase pattern in the wavelength region R3. The phase patterns X1, X2, X3 are linear phase patterns having different slopes.

Figure 35B:
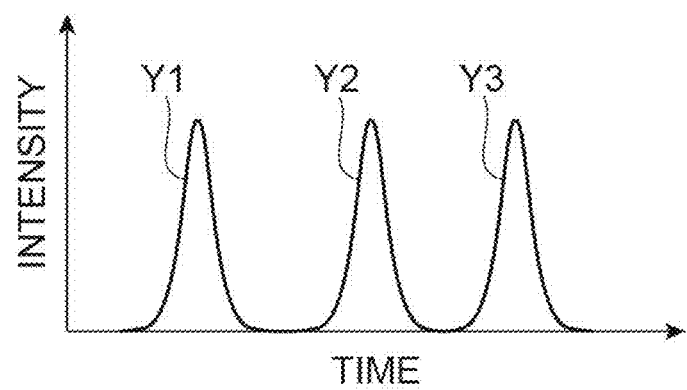

FIG. 35B is a graph showing the temporal waveform of the light pulse train corresponding to the spectrum waveform shown in FIG. 35A. In this graph, the horizontal axis indicates the time, and the vertical axis indicates the light intensity. In this method, in the temporal waveform of the light pulse train, the light pulses are generated according to the number of linear phase patterns having different slopes included in the spectrum phase. In the example shown in FIG. 35A and FIG. 35B, by providing the above linear phase patterns X1, X2, X3 in the wavelength regions R1, R2, R3, the multi pulse with band control including three light pulses Y1, Y2, Y3 is generated.

In the above method, the magnitude of the slope of the linear phase pattern Xi corresponds to the moving amount of the corresponding light pulse Yi in the temporal waveform. Further, the band component constituting the light pulse Yi can be controlled by the setting of the wavelength region Ri for the spectrum waveform. In the example shown in FIG. 35A and FIG. 35B, the light pulse Y1 is generated by the spectrum intensity component of the wavelength region R1, the light pulse Y2 is generated by the spectrum intensity component of the wavelength region R2, and the light pulse Y3 is generated by the spectrum intensity component of the wavelength region R3.

In addition, in the above method, as for the control of the spectrum intensity component, for example, unnecessary intensity components may be subjected to filter processing (intensity cut by intensity modulation) in advance. Further, when the difference between the slopes of the phase patterns X1, X2, X3 is small, the light pulses may not be sufficiently separated in the obtained temporal waveform, and thus it is preferable to set the phase pattern in consideration of such a point. Further, the phase pattern in the spectrum phase is a continuous pattern in the example shown in FIG. 35A, but may be a discontinuous pattern.

Figure 36A:
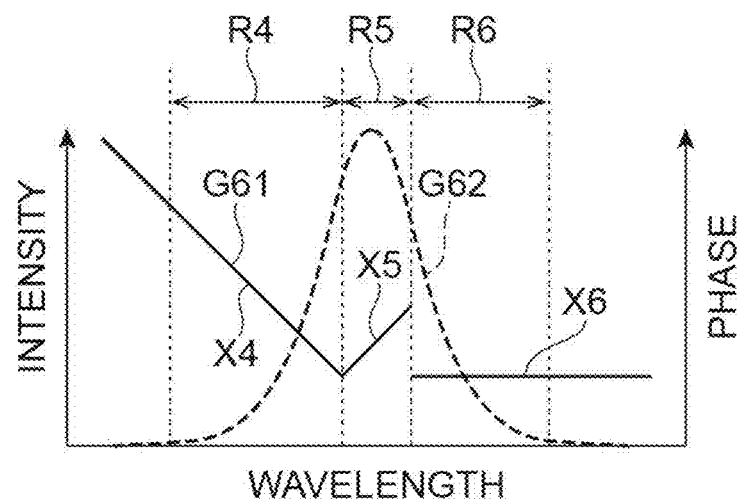
FIG. 36A and FIG. 36B are (A) a graph showing another example of a spectrum waveform for generating a multi pulse with band control, and (B) a graph showing a temporal waveform of a light pulse train corresponding to the spectrum waveform shown in FIG. 36A.

FIG. 36A is a graph showing another example of the spectrum waveform for generating the multi pulse with band control. A graph G61 in the diagram shows the spectrum phase, and a graph G62 shows the spectrum intensity. Further, regions R4, R5, R6 in the diagram indicate wavelength regions set for the spectrum intensity waveform of the graph G62. Further, in the spectrum phase pattern of the graph G61, a phase pattern X4 indicates a phase pattern in the wavelength region R4, a phase pattern X5 indicates a phase pattern in the wavelength region R5, and a phase pattern X6 indicates a phase pattern in the wavelength region R6. The phase patterns X4, X5, X6 are linear phase patterns having different slopes, and are discontinuous at the boundary between the phase patterns X5 and X6.

Figure 36B:
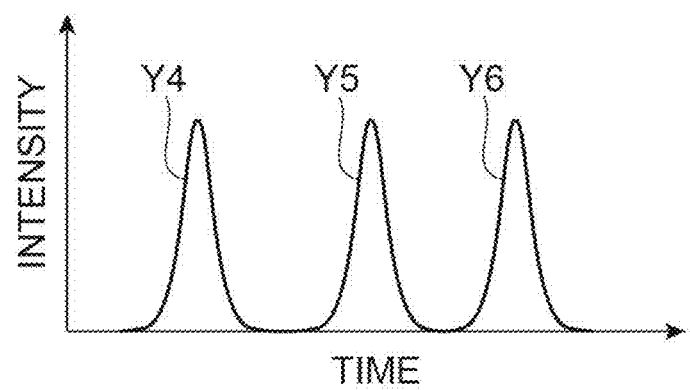

FIG. 36B is a graph showing the temporal waveform of the light pulse train corresponding to the spectrum waveform shown in FIG. 36A. In the example shown in FIG. 36A and FIG. 36B, by the setting of the above discontinuous phase pattern in the spectrum phase, the light pulse Y4 is generated by the spectrum intensity component of the wavelength region R4, the light pulse Y6 is generated by the spectrum intensity component of the wavelength region R5, and the light pulse Y5 is generated by the spectrum intensity component of the wavelength region R6. As described above, by the setting of the phase pattern in the spectrum phase, it is possible to arbitrarily replace and set the band components constituting the light pulses in the temporal waveform.

The dispersion measurement apparatus of the above embodiment includes a pulse forming unit for forming a light pulse train including a plurality of second light pulses having time differences and center wavelengths different from each other from a first light pulse output from a light source; an optical branching unit for branching the light pulse train output from the pulse forming unit and passed through a measurement object; an imaging unit for dispersing and imaging one light pulse train branched by the optical branching unit, and generating imaging data for each second light pulse included in the one light pulse train; a spatial filter unit for receiving the other light pulse train branched by the optical branching unit, and extracting light of one or a plurality of partial regions in a cross section intersecting with a traveling direction of the other light pulse train; a correlation optical system for outputting correlation light including a cross-correlation or an autocorrelation of the light of the one or plurality of partial regions extracted by the spatial filter unit; a photodetection unit (photodetector) for detecting a temporal waveform of the correlation light output from the correlation optical system; and an operation unit (processor) for estimating a wavelength dispersion amount of the measurement object based on a feature value of the temporal waveform, and in the spatial filter unit, a spatial position of the partial region in the cross section is changeable.

The dispersion measurement method of the above embodiment includes a pulse forming step of forming a light pulse train including a plurality of second light pulses having time differences and center wavelengths different from each other from a first light pulse output from a light source; an optical branching step of branching the light pulse train passed through a measurement object; an imaging step of dispersing and imaging one light pulse train branched by the optical branching step, and generating imaging data for each second light pulse included in the one light pulse train; a spatial filter step of extracting light of one or a plurality of partial regions in a cross section intersecting with a traveling direction of the other light pulse train branched by the optical branching step; a correlation light generation step of generating correlation light including a cross-correlation or an autocorrelation of the light of the one or plurality of partial regions; a photodetection step of detecting a temporal waveform of the correlation light; and an operation step of estimating a wavelength dispersion amount of the measurement object based on a feature value of the temporal waveform, and the pulse forming step, the optical branching step, the imaging step, the spatial filter step, the correlation light generation step, the photodetection step, and the operation step are repeatedly performed while changing a spatial position of the partial region in the cross section.

In the above dispersion measurement apparatus, the spatial filter unit may include a spatial filter disposed on an optical path of the other light pulse train, and the spatial filter may pass the light of the partial region in the cross section and block light of other regions. Further, in the above dispersion measurement method, in the spatial filter step, the light of the partial region in the cross section may be allowed to pass and light of other regions may be blocked.

For example by the above configuration, the light of the partial region in the cross section can be extracted, and the temporal waveform of the light can be detected.

In the above dispersion measurement apparatus, the spatial filter may include a pinhole configured to pass only the light of the partial region. Further, in the above dispersion measurement method, in the spatial filter step, a pinhole configured to pass only the light of the partial region may be used.

In this case, the light of the partial region in the cross section can be extracted by a simple configuration.

In the above dispersion measurement apparatus, the operation unit may calculate at least one value of a refractive index, a reflectance, an absorptance, and a thickness of a part of the measurement object based on the estimated wavelength dispersion amount. Further, in the above dispersion measurement method, in the operation step, at least one value of a refractive index, a reflectance, an absorptance, and a thickness of a part of the measurement object may be calculated based on the estimated wavelength dispersion amount.

In this case, an optical property, an outer shape, or both of the measurement object can be measured in a short time.

In the above dispersion measurement apparatus and dispersion measurement method, the feature value of the temporal waveform may include a time interval of a plurality of light pulses included in the correlation light.

The present inventors have found that, in various feature values of the temporal waveform, the pulse interval in particular has a significant correlation with the wavelength dispersion amount of the measurement object. Therefore, according to the above apparatus and method, the wavelength dispersion amount of the measurement object can be estimated more accurately.

In the above dispersion measurement apparatus, the pulse forming unit may include a dispersive element for spatially separating a plurality of wavelength components included in the first light pulse for each wavelength, a spatial light modulator for shifting phases of the plurality of wavelength components output from the dispersive element from each other, and a focusing optical system for focusing the plurality of wavelength components output from the spatial light modulator. Further, in the above dispersion measurement method, in the pulse forming step, a plurality of wavelength components included in the first light pulse may be spatially separated for each wavelength, phases of the plurality of wavelength components may be shifted from each other using a spatial light modulator, and the plurality of wavelength components may be focused.

For example by the above apparatus and method, the light pulse train including the plurality of second light pulses having time differences and center wavelengths different from each other can be easily formed.

In the above dispersion measurement apparatus, the operation unit may estimate the wavelength dispersion amount in the measurement object by comparing the feature value of the temporal waveform calculated in advance on the assumption that the wavelength dispersion of the measurement object is zero and the feature value of the detected temporal waveform. Further, in the above dispersion measurement method, in the operation step, the wavelength dispersion amount in the measurement object may be estimated by comparing the feature value of the temporal waveform calculated in advance on the assumption that the wavelength dispersion of the measurement object is zero and the feature value of the detected temporal waveform.

According to the above apparatus and method, the wavelength dispersion amount of the measurement object can be estimated more accurately.

The embodiments can be used as a dispersion measurement apparatus and a dispersion measurement method capable of knowing a magnitude of wavelength dispersion in an object simultaneously with high-speed imaging.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion measurement apparatus comprising:
   a pulse forming unit including a spatial light modulator, and configured to form a light pulse train including a plurality of second light pulses having time differences and center wavelengths different from each other from a first light pulse output from a light source, the spatial light modulator being used to form the light pulse train;
   a beam splitter configured to branch the light pulse train output from the pulse forming unit and passed through a measurement object into a first light pulse train and a second light pulse train;
   an imaging unit including an image sensor, and configured to disperse and image the first light pulse train branched by the beam splitter, and generate imaging data by the image sensor for each second light pulse included in the first light pulse train;
   a spatial filter unit configured to receive the second light pulse train branched by the beam splitter, and extract light of one or a plurality of partial regions in a cross section intersecting with a traveling direction of the second light pulse train;
   a correlation optical system including an optical element, and configured to output correlation light including a cross-correlation or an autocorrelation of the light of the one or plurality of partial regions extracted by the spatial filter unit, the optical element being configured to generate the correlation light;
   a photodetector configured to detect a temporal waveform of the correlation light output from the correlation optical system; and
   a processor configured to estimate a wavelength dispersion amount in the measurement object based on a feature value of the temporal waveform, wherein
   in the spatial filter unit, a spatial position of the partial region in the cross section is changeable.

2. The dispersion measurement apparatus according to claim 1, wherein the spatial filter unit includes a spatial filter disposed on an optical path of the second light pulse train, and
   the spatial filter is configured to pass the light of the partial region in the cross section and block light of other regions.

3. The dispersion measurement apparatus according to claim 2, wherein the spatial filter includes a pinhole configured to pass only the light of the partial region.

4. The dispersion measurement apparatus according to claim 1, wherein the processor is configured to calculate at least one value of a refractive index, a reflectance, an absorptance, and a thickness of a part of the measurement object based on the estimated wavelength dispersion amount.

5. The dispersion measurement apparatus according to claim 1, wherein the feature value of the temporal waveform includes a time interval of a plurality of light pulses included in the correlation light.

6. The dispersion measurement apparatus according to claim 1, wherein the pulse forming unit includes:
   a dispersive element configured to spatially separate a plurality of wavelength components included in the first light pulse for each wavelength,
   the spatial light modulator configured to shift phases of the plurality of wavelength components output from the dispersive element from each other, and
   a focusing lens configured to focus the plurality of wavelength components output from the spatial light modulator.

7. The dispersion measurement apparatus according to claim 1, wherein the processor is configured to estimate the wavelength dispersion amount in the measurement object by comparing the feature value of the temporal waveform calculated in advance on the assumption that the wavelength dispersion of the measurement object is zero and the feature value of the detected temporal waveform.

8. A dispersion measurement method comprising:
   performing a pulse forming of forming a light pulse train including a plurality of second light pulses having time differences and center wavelengths different from each other from a first light pulse output from a light source;
   performing an optical branching of branching the light pulse train passed through a measurement object into a first light pulse train and a second light pulse train;
   performing an imaging of dispersing and imaging the first light pulse train branched by the optical branching, and generating imaging data for each second light pulse included in the first light pulse train;
   performing a spatial filter of extracting light of one or a plurality of partial regions in a cross section intersecting with a traveling direction of the second light pulse train branched by the optical branching;
   performing a correlation light generation of generating correlation light including a cross-correlation or an autocorrelation of the light of the one or plurality of partial regions;

performing a photodetection of detecting a temporal waveform of the correlation light; and performing an operation of estimating a wavelength dispersion amount in the measurement object based on a feature value of the temporal waveform, wherein the pulse forming, the optical branching, the imaging, the spatial filter, the correlation light generation, the photodetection, and the operation are repeatedly performed while changing a spatial position of the partial region in the cross section.

9. The dispersion measurement method according to claim 8, wherein in the spatial filter, the light of the partial region in the cross section is allowed to pass and light of other regions is blocked.

10. The dispersion measurement method according to claim 9, wherein in the spatial filter, a pinhole configured to pass only the light of the partial region is used.

11. The dispersion measurement method according to claim 8, wherein in the operation, at least one value of a refractive index, a reflectance, an absorptance, and a thickness of a part of the measurement object is calculated based on the estimated wavelength dispersion amount.

12. The dispersion measurement method according to claim 8, wherein the feature value of the temporal waveform includes a time interval of a plurality of light pulses included in the correlation light.

13. The dispersion measurement method according to claim 8, wherein in the pulse forming, a plurality of wavelength components included in the first light pulse are spatially separated for each wavelength, phases of the plurality of wavelength components are shifted from each other using a spatial light modulator, and the plurality of wavelength components are focused.

14. The dispersion measurement method according to claim 8, wherein in the operation, the wavelength dispersion amount in the measurement object is estimated by comparing the feature value of the temporal waveform calculated in advance on the assumption that the wavelength dispersion of the measurement object is zero and the feature value of the detected temporal waveform.

\* \* \* \* \*